US012754030B2

(12) United States Patent
Williams et al.

(10) Patent No.: US 12,754,030 B2
(45) **Date of Patent: *Oct. 6, 2026**

(54) SYSTEMS AND METHODS FOR DYNAMICALLY GENERATING OPTIMAL ROUTES FOR MANAGEMENT OF MULTIPLE VEHICLES

(71) Applicant: State Farm Mutual Automobile Insurance Company, Bloomington, IL (US)

(72) Inventors: Aaron Williams, Congerville, IL (US); Ryan Michael Gross, Normal, IL (US); Joseph Robert Brannan, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 14 days.

This patent is subject to a terminal disclaimer.

(21) Appl. No.: 18/953,986

(22) Filed: Nov. 20, 2024

(65) Prior Publication Data

US 2025/0076065 A1 Mar. 6, 2025

Related U.S. Application Data

(63) Continuation of application No. 18/045,052, filed on Oct. 7, 2022, now Pat. No. 12,174,033, which is a
(Continued)

(51) Int. Cl.
*G06Q 10/047* (2023.01)
*B64C 39/02* (2023.01)
(Continued)

(52) U.S. Cl.
CPC ........ *G01C 21/3492* (2013.01); *B64C 39/024* (2013.01); *G01C 21/20* (2013.01);
(Continued)

(58) Field of Classification Search
CPC ................ G06Q 50/40; G06Q 10/047; G06Q 10/06316; G06Q 10/0635; G06Q 10/0639;
(Continued)

(56) References Cited

U.S. PATENT DOCUMENTS 4,741,163 A 5/1988 Hidaka et al.
6,600,991 B1 7/2003 Jardin
(Continued)

FOREIGN PATENT DOCUMENTS

EP 3239686 A1 11/2017
EP 3578433 B1 8/2020
(Continued)

OTHER PUBLICATIONS

Ehmke, Jan Fabian, and Dirk Christian Mattfeld. "Vehicle routing for attended home delivery in city logistics." Procedia-Social and Behavioral Sciences 39 (2012): 622-632 (Year: 2012).
(Continued)

*Primary Examiner* — Calvin Cheung
(74) *Attorney, Agent, or Firm* — Armstrong Teasdale LLP

(57) ABSTRACT

A vehicle routing system includes a vehicle routing and analytics (VRA) computing device, one or more databases, and one or more vehicles communicatively coupled to the VRA computing device. The VRA computing device is configured to generate an optimal route for a vehicle to travel that maximizes potential revenue for operation of the vehicle, the optimal route including a schedule of a plurality of tasks, and generate analytics associated with operation of the vehicle. The VRA computing device is further configured to provide a management hub software application accessible by vehicle users associated with vehicles, tasks sources, and other users.

20 Claims, 14 Drawing Sheets

Related U.S. Application Data continuation of application No. 16/544,324, filed on Aug. 19, 2019, now Pat. No. 11,466,998.

(60) Provisional application No. 62/843,729, filed on May 6, 2019, provisional application No. 62/806,258, filed on Feb. 15, 2019.

(51) Int. Cl.

| | |
|---|---|
| ***G01C 21/20*** | (2006.01) |
| ***G01C 21/34*** | (2006.01) |
| ***G05D 1/00*** | (2006.01) |
| ***G05D 1/227*** | (2024.01) |
| ***G06Q 10/0631*** | (2023.01) |
| ***G06Q 10/0635*** | (2023.01) |
| ***G06Q 10/0639*** | (2023.01) |
| ***G06Q 10/083*** | (2023.01) |
| ***G06Q 50/40*** | (2024.01) |
| ***G08G 1/123*** | (2006.01) |
| *B64U 101/60* | (2023.01) |
| *B64U 101/64* | (2023.01) |
| *G05D 101/10* | (2024.01) |

(52) U.S. Cl.

CPC ..... *G01C 21/3438* (2013.01); *G01C 21/3453* (2013.01); *G05D 1/00* (2013.01); *G05D 1/0088* (2013.01); *G05D 1/227* (2024.01); *G06Q 10/047* (2013.01); *G06Q 10/06316* (2013.01); *G06Q 10/0635* (2013.01); *G06Q 10/0639* (2013.01); *G06Q 10/08355* (2013.01); *G06Q 50/40* (2024.01); *B64U 2101/60* (2023.01); *B64U 2101/64* (2023.01); *B64U 2201/104* (2023.01); *G05D 2101/10* (2024.01)

(58) Field of Classification Search

CPC ............ G01C 21/3492; G01C 21/3438; G01C 21/3453; H04W 4/024; H04W 4/44; B64U 2101/64; B64U 2101/60; B64U 2201/104; G05D 1/227; G05D 2101/10; G05D 1/00; G05D 1/0088; B64C 39/024; G08G 1/0112; G08G 1/0129; G08G 1/0145; G08G 1/096716; G08G 1/096816; G08G 1/096844; G08G 1/202

See application file for complete search history.

(56) References Cited

U.S. PATENT DOCUMENTS

| | | | | |
|---|---|---|---|---|
| 7,363,126 | B1 * | 4/2008 | Zhong | G01C 21/3484 701/25 |
| 8,112,300 | B2 | 2/2012 | Harper | |
| 8,275,508 | B1 * | 9/2012 | Adams | G07C 5/008 715/810 |
| 8,738,289 | B2 | 5/2014 | Ghoting et al. | |
| 9,035,479 | B1 | 5/2015 | Gates | |
| 9,037,406 | B2 * | 5/2015 | Mason | G06Q 10/04 701/482 |
| 9,068,852 | B2 | 6/2015 | Mason et al. | |
| 9,368,026 | B1 | 6/2016 | Herbach et al. | |
| 9,557,183 | B1 | 1/2017 | Ross et al. | |
| 9,792,575 | B2 | 10/2017 | Khasis | |
| 9,830,748 | B2 | 11/2017 | Rosenbaum | |
| 9,990,782 | B2 | 6/2018 | Rosenbaum | |
| 10,269,190 | B2 | 4/2019 | Rosenbaum | |
| 10,467,824 | B2 | 11/2019 | Rosenbaum | |
| 10,573,184 | B1 | 2/2020 | Pandit et al. | |
| 10,648,823 | B2 | 5/2020 | Bagchi | |
| 10,671,961 | B2 | 6/2020 | Cao | |
| 10,697,784 | B1 | 6/2020 | Li | |
| 10,787,315 | B2 | 9/2020 | Hance et al. | |
| 10,789,567 | B1 | 9/2020 | Ur | |
| 10,852,152 | B2 | 12/2020 | Mitchell et al. | |
| 11,227,452 | B2 | 1/2022 | Rosenbaum | |
| 11,407,410 | B2 | 8/2022 | Rosenbaum | |
| 11,466,997 | B1 | 10/2022 | Williams et al. | |
| 11,524,707 | B2 | 12/2022 | Rosenbaum | |
| 11,594,083 | B1 | 2/2023 | Rosenbaum | |
| 2003/0078802 | A1 | 4/2003 | Yonezawa | |
| 2005/0021745 | A1 | 1/2005 | Bookman et al. | |
| 2005/0216182 | A1 * | 9/2005 | Hussain | G01C 21/20 701/532 |
| 2008/0077464 | A1 | 3/2008 | Gottlieb et al. | |
| 2008/0275643 | A1 | 11/2008 | Yaqub et al. | |
| 2009/0048890 | A1 | 2/2009 | Burgh | |
| 2009/0055270 | A1 | 2/2009 | Magdon-Ismail et al. | |
| 2009/0187450 | A1 | 7/2009 | Kocis et al. | |
| 2009/0326991 | A1 | 12/2009 | Wei et al. | |
| 2009/0327011 | A1 * | 12/2009 | Petroff | G08G 1/202 705/5 |
| 2010/0094769 | A1 | 4/2010 | Davidson et al. | |
| 2010/0106603 | A1 * | 4/2010 | Dey | G08G 1/096811 705/14.63 |
| 2010/0287073 | A1 | 11/2010 | Kocis et al. | |
| 2010/0299175 | A1 | 11/2010 | Marchildon et al. | |
| 2011/0130905 | A1 | 6/2011 | Mayer | |
| 2012/0053993 | A1 | 3/2012 | Huberman et al. | |
| 2012/0226548 | A1 | 9/2012 | Hanna | |
| 2012/0310691 | A1 | 12/2012 | Carlsson et al. | |
| 2013/0069803 | A1 | 3/2013 | McCormick et al. | |
| 2013/0132140 | A1 | 5/2013 | Amin et al. | |
| 2013/0224721 | A1 | 8/2013 | Gilling | |
| 2013/0339266 | A1 | 12/2013 | Looman et al. | |
| 2014/0011522 | A1 | 1/2014 | Lin et al. | |
| 2014/0046585 | A1 | 2/2014 | Morris, IV et al. | |
| 2014/0129139 | A1 | 5/2014 | Ellison et al. | |
| 2014/0330576 | A1 | 11/2014 | Bauer | |
| 2015/0051941 | A1 | 2/2015 | Bell | |
| 2015/0248639 | A1 | 9/2015 | Maney et al. | |
| 2015/0260531 | A1 | 9/2015 | Ehsani et al. | |
| 2015/0285652 | A1 * | 10/2015 | Peri | G01C 21/3476 701/438 |
| 2016/0063435 | A1 | 3/2016 | Shah et al. | |
| 2016/0196701 | A1 | 7/2016 | Strother et al. | |
| 2016/0210591 | A1 | 7/2016 | Lafrance | |
| 2016/0379168 | A1 | 12/2016 | Foerster et al. | |
| 2017/0046644 | A1 | 2/2017 | Zhang et al. | |
| 2017/0090478 | A1 | 3/2017 | Blayvas et al. | |
| 2017/0123421 | A1 | 5/2017 | Kentley et al. | |
| 2017/0132934 | A1 | 5/2017 | Kentley et al. | |
| 2017/0192437 | A1 | 7/2017 | Bier et al. | |
| 2017/0199045 | A1 | 7/2017 | George et al. | |
| 2017/0200197 | A1 | 7/2017 | Brubaker | |
| 2017/0294060 | A1 | 10/2017 | Lonski et al. | |
| 2017/0323249 | A1 | 11/2017 | Khasis | |
| 2018/0124319 | A1 | 5/2018 | Jo | |
| 2018/0129999 | A1 | 5/2018 | Zhang et al. | |
| 2018/0184245 | A1 | 6/2018 | Park | |
| 2018/0240288 | A1 | 8/2018 | Samper et al. | |
| 2018/0260740 | A1 | 9/2018 | Namineni et al. | |
| 2018/0268359 | A1 | 9/2018 | Soubhagya | |
| 2018/0276586 | A1 | 9/2018 | Treasure | |
| 2018/0336510 | A1 | 11/2018 | DaCosta et al. | |
| 2018/0356239 | A1 | 12/2018 | Marco | |
| 2018/0356823 | A1 | 12/2018 | Cooper | |
| 2018/0364061 | A1 | 12/2018 | Chen et al. | |
| 2019/0011931 | A1 | 1/2019 | Selvam et al. | |
| 2019/0019146 | A1 | 1/2019 | Chraibi et al. | |
| 2019/0066041 | A1 | 2/2019 | Hance et al. | |
| 2019/0073611 | A1 | 3/2019 | Sahota et al. | |
| 2019/0121338 | A1 | 4/2019 | Cella et al. | |
| 2019/0147399 | A1 | 5/2019 | O'Block | |
| 2019/0164432 | A1 | 5/2019 | Quitoriano et al. | |
| 2019/0179336 | A1 | 6/2019 | Colijn et al. | |
| 2019/0195638 | A1 | 6/2019 | Tajammul et al. | |
| 2019/0196503 | A1 | 6/2019 | Abari et al. | |
| 2019/0197438 | A1 | 6/2019 | Meredith et al. | |
| 2019/0212753 | A1 | 7/2019 | Sarkar et al. | |
| 2019/0220785 | A1 | 7/2019 | Tanno et al. | |
| 2019/0236165 | A1 | 8/2019 | Nickerson | |

(56) References Cited

U.S. PATENT DOCUMENTS

| | | | |
|---|---|---|---|
| 2019/0244318 | A1 | 8/2019 | Rajcok et al. |
| 2019/0251509 | A1 | 8/2019 | Simpson |
| 2019/0370922 | A1 | 12/2019 | Asghari et al. |
| 2020/0020015 | A1 | 1/2020 | Anders et al. |
| 2020/0034791 | A1 | 1/2020 | Lee et al. |
| 2020/0116508 | A1 | 4/2020 | Dashti et al. |
| 2020/0133306 | A1 | 4/2020 | Chadha et al. |
| 2020/0160709 | A1 | 5/2020 | Ramot et al. |
| 2020/0209002 | A1 | 7/2020 | Hou et al. |
| 2020/0219407 | A1 | 7/2020 | Priest |
| 2020/0258018 | A1 | 8/2020 | Brady |
| 2020/0300644 | A1 | 9/2020 | Tian et al. |
| 2020/0394617 | A1 | 12/2020 | Fornell et al. |
| 2021/0163021 | A1 | 6/2021 | Frazzoli et al. |
| 2022/0092893 | A1 | 3/2022 | Rosenbaum |
| 2022/0129849 | A1 | 4/2022 | Mimassi |
| 2022/0340148 | A1 | 10/2022 | Rosenbaum |
| 2023/0060300 | A1 | 3/2023 | Rosenbaum |

FOREIGN PATENT DOCUMENTS

| | | | |
|---|---|---|---|
| EP | 3730375 | B1 | 10/2021 |
| EP | 3960576 | A1 | 3/2022 |
| EP | 4190659 | A1 | 6/2023 |
| EP | 4190660 | A1 | 6/2023 |
| JP | H10134300 | A | 5/1998 |
| WO | 2011066468 | A1 | 6/2011 |
| WO | 2019203816 | A1 | 10/2019 |

OTHER PUBLICATIONS

Gray, Felix, “The Future Begins (in December)”, The Hustle, Nov. 14, 2018, https://thehustle.co/the-future-begins-in-december/.

Keerthisinghe. Schedule optimization of freight vehicle fleet using data analytics. Diss. 2018.

Rahili et al., “Optimal Routing for Autonomous Taxis using Distributed Reinforcement Learning,” 2018 IEEE International Conference on Data Mining Workshops (ICDMW), IEEE, 2018.

Lin, Kaixiang, et al. “Efficient large-scale fleet management via multi-agent deep reinforcement learning.” Proceedings of the 24th ACM SIGKDD International Conference on Knowledge Discovery & Data Mining. 2018 (Year: 2018).

Billhardt, Holger, et al. “Dynamic coordination in fleet management systems: Toward smart cyber fleets.” IEEE Intelligent Systems 29.3 (2014): 70-76 (Year: 2014).

Waiyaki, Edward Chege, and Anton Brits. “Leveraging Telematics for Optimal Fleet Performance.” International Journal of Business 1.1 (2015) (Year: 2015).

* cited by examiner

450

| | |
|---|---|
| 7:30 AM | Location 3<br>Pick up Package B |
| 8 AM | Location 1<br>Pick up Passenger A |
| 9 AM | Location 2<br>Drop off Passenger A |
| 9:15 AM | Location 4<br>Drop off Package B<br>Pick up Package C |
| 9:30 AM | Location 5<br>Drop off Package C |
| 9:35 AM | Location 6<br>Pick up Passengers D, E<br>•<br>•<br>• |
| 1:30 PM | Location 7<br>Pick up Passenger E |
| 1:50 PM | Location 8<br>Drop off Passenger E |
| 2:05 PM | Location 4<br>Pick up Package F<br>•<br>•<br>• |

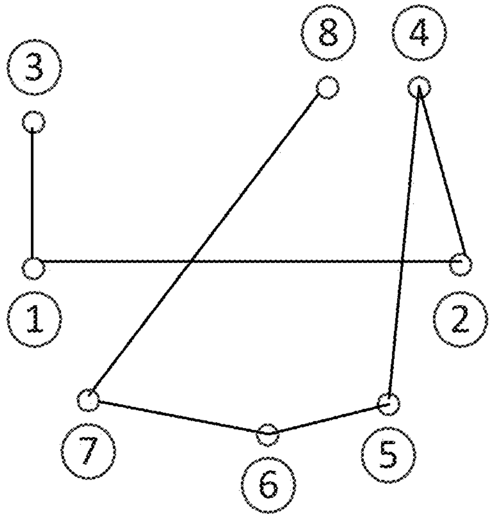

FIGURE 4B

SYSTEMS AND METHODS FOR DYNAMICALLY GENERATING OPTIMAL ROUTES FOR MANAGEMENT OF MULTIPLE VEHICLES

CROSS-REFERENCE TO RELATED APPLICATIONS

The present application is a continuation application of U.S. patent application Ser. No. 18/045,052, filed Oct. 7, 2022, which is a continuation application of U.S. patent application Ser. No. 16/544,324, filed on Aug. 19, 2019, now U.S. Pat. No. 11,466,998, which claims the benefit of priority to U.S. Provisional Patent Application No. 62/806,258, filed on Feb. 15, 2019, entitled "SYSTEMS AND METHODS FOR DYNAMICALLY GENERATING OPTIMAL ROUTES FOR VEHICLE DELIVERY MANAGEMENT," and to U.S. Provisional Patent Application No. 62/843,729, filed on May 6, 2019, entitled "SYSTEMS AND METHODS FOR DYNAMICALLY GENERATING OPTIMAL ROUTES FOR VEHICLE DELIVERY MANAGEMENT," the entire contents of each of which are hereby incorporated by reference herein.

FIELD OF THE DISCLOSURE

The present disclosure generally relates to vehicle routing, and, more particularly, to intelligent and dynamic routing of unautomated and autonomous vehicles for maximizing cargo delivery revenue.

BACKGROUND

It is well known to use vehicles for delivery of cargo, including persons and items. Newer methods of transporting such cargo are being implemented, such as ride-sharing and businesses contracting with third parties for package delivery. However, current systems require users to pick and choose discrete jobs. For example, a driver for a ride-share service seeks individual persons (or groups thereof) to provide rides to. Likewise, third-party delivery contractors accept individual delivery jobs. Current systems do not provide users with any strategies for maximizing revenue. Accordingly, it is left up to users to attempt to maximize their revenue, time, and/or other resources as they choose individual jobs or tasks. Moreover, many known systems may limit or place restrictions on concurrent jobs, such that users accept consecutive jobs and may be deprived of the advantages (in time and revenue) of concurrent jobs.

BRIEF SUMMARY

The present embodiments may relate to, inter alia, systems and methods for optimizing delivery routing for a plurality of vehicles. Vehicle users (e.g., owners, lessors, fleet managers, etc.) may register with a vehicle routing system to receive vehicle routing services therefrom. The vehicle users may submit "definitions" of their vehicle that describe how they want their vehicle to be used (e.g., the times and locations that the vehicle is available to make deliveries). The vehicle routing system may receive a plurality of tasks (e.g., delivering cargo including person(s) and/or object(s)) to be completed, and may analyze the vehicle definitions and the plurality of tasks to generate an optimal route for each vehicle that maximizes the vehicle's profit generation. In the exemplary embodiment, the vehicle routing system may include artificial intelligence and/or deep learning functionality to generate the optimal routes.

In addition, the vehicle routing system may collect and process sensor data from the plurality of vehicles, as the vehicle operate according to the optimal routes (e.g., performing delivery tasks). The sensor data may characterize use/performance of the vehicle, an ambient environment around the vehicle (e.g., weather, traffic), local infrastructure, and more. The vehicle routing system may process the sensor data (e.g., using the artificial intelligence and/or deep learning functionality) to generate vehicle analytics for each vehicle, identify trends, update optimal routes, and/or make recommendations.

In the exemplary embodiment, the vehicle routing system maintains a management hub software application ("app") that enables users to view vehicle analytics and recommendations made by the vehicle routing system. The management hub may additionally enable users to update their user preferences or vehicle definitions of registered vehicles. Additionally or alternatively, the management hub app provides users access to a plurality of other services provided by the vehicle routing system, including maintenance/repair services, financial services, marketing services, and the like.

In one aspect, a vehicle routing and analytics (VRA) computing device includes at least one processor in communication with a memory, the VRA computing device communicatively coupled to a fleet of vehicles. The at least one processor is programmed to: (i) control each vehicle of the fleet of vehicles to travel along a respective optimal route, the optimal route including a scheduled list of tasks for the vehicle to perform; (ii) detect one vehicle of the fleet of vehicles has deviated from the respective optimal route; (iii) execute at least one at least one of artificial intelligence and deep learning functionality to assign any remaining tasks assigned to the one vehicle to one or more other vehicles of the fleet of vehicle; (iv) automatically update each respective optimal route of the one or more other vehicles to generate an updated optimal route including an updated scheduled list of tasks including at least one task previously assigned to the one vehicle; and (v) control the one or more vehicles of the fleet of vehicles to travel along the respective updated optimal route according to the updated scheduled list of tasks. The VRA computing device may include additional, less, and/or alternative functionality, including that described herein.

In another aspect, a computer-implemented method for generating a route for each vehicle of a fleet of vehicles is implemented using a vehicle routing analytics (VRA) computing device communicatively coupled to the fleet of vehicles, wherein the VRA computing device includes at least one processor in communication with a memory. The method includes: (i) controlling each vehicle of the fleet of vehicles to travel along a respective optimal route, the optimal route including a scheduled list of tasks for the vehicle to perform; (ii) detecting one vehicle of the fleet of vehicles has deviated from the respective optimal route; (iii) executing at least one at least one of artificial intelligence and deep learning functionality to assign any remaining tasks assigned to the one vehicle to one or more other vehicles of the fleet of vehicle; (iv) automatically updating each respective optimal route of the one or more other vehicles to generate an updated optimal route including an updated scheduled list of tasks including at least one task previously assigned to the one vehicle; and (v) controlling the one or more vehicles of the fleet of vehicles to travel along the respective updated optimal route according to the updated scheduled list of tasks. The method may include additional, fewer, and/or alternative steps, including those described herein.

In a further aspect, at least one non-transitory computer-readable storage medium has stored thereon computer-executable instructions. When executed by at least one processor of a vehicle routing and analytics (VRA) computing device communicatively coupled to a fleet of vehicles, the computer-executable instructions cause the at least one processor to: (i) control each vehicle of the fleet of vehicles to travel along a respective optimal route, the optimal route including a scheduled list of tasks for the vehicle to perform; (ii) detect one vehicle of the fleet of vehicles has deviated from the respective optimal route; (iii) execute at least one at least one of artificial intelligence and deep learning functionality to assign any remaining tasks assigned to the one vehicle to one or more other vehicles of the fleet of vehicle; (iv) automatically update each respective optimal route of the one or more other vehicles to generate an updated optimal route including an updated scheduled list of tasks including at least one task previously assigned to the one vehicle; and (v) control the one or more vehicles of the fleet of vehicles to travel along the respective updated optimal route according to the updated scheduled list of tasks. The instructions may cause additional, less, and/or alternative functionality, including that described herein.

In one aspect, a vehicle routing and analytics (VRA) computing device for generating a respective optimal route for each vehicle of a fleet of vehicles to travel that maximizes potential revenue for operation of the fleet of vehicles is provided. The VRA computing device is communicatively coupled to a plurality of vehicles, each vehicle having a plurality of sensors disposed thereon and configured to collect sensor data during operation of the respective vehicle, and the VRA computing device includes at least one processor in communication with a memory. The at least one processor is programmed to: (i) retrieve a vehicle definition for each vehicle of the plurality of vehicles, each vehicle definition including availability parameters and delivery preferences associated with the respective vehicle; (ii) retrieve a plurality of task definitions defining a respective plurality of tasks, each task including a respective cargo to be delivered, pick-up time, delivery time, pick-up location, delivery location, and task value; (iii) generate, by executing at least one of artificial intelligence and deep learning functionality using the vehicle definition and the plurality of task definitions, the respective optimal route for each vehicle of the fleet of vehicles, each optimal route including a scheduled list of a subset of the plurality of tasks for the vehicle to perform, wherein each optimal route maximizes the potential revenue for operation of the respective vehicle within a period of time associated with the optimal route, and wherein each task of the plurality of tasks is assigned to one vehicle of the fleet of vehicles; and (iv) transmit each optimal route to the corresponding vehicle of the fleet of vehicles, for operation of the corresponding vehicle according to that optimal route. The VRA computing device may include additional, less, and/or alternative functionality, including that described herein.

In another aspect, a computer-implemented method for generating a respective optimal route for each vehicle of a fleet of vehicles to travel that maximizes potential revenue for operation of the fleet of vehicles is provided. The method is implemented using a vehicle routing analytics (VRA) computing device communicatively coupled to a plurality of vehicles, each vehicle having a plurality of sensors disposed thereon and configured to collect sensor data during operation of the respective vehicle, wherein the VRA computing device includes at least one processor in communication with a memory. The method includes: (i) retrieving a vehicle definition for each vehicle of the plurality of vehicles, each vehicle definition including availability parameters and delivery preferences associated with the respective vehicle; (ii) retrieving a plurality of task definitions defining a respective plurality of tasks, each task including a respective cargo to be delivered, pick-up time, delivery time, pick-up location, delivery location, and task value; (iii) generating, by executing at least one of artificial intelligence and deep learning functionality using the vehicle definition and the plurality of task definitions, the respective optimal route for each vehicle of the fleet of vehicles, each optimal route including a scheduled list of a subset of the plurality of tasks for the vehicle to perform, wherein each optimal route maximizes the potential revenue for operation of the respective vehicle within a period of time associated with the optimal route, and wherein each task of the plurality of tasks is assigned to one vehicle of the fleet of vehicles; and (iv) transmitting each optimal route to the corresponding vehicle of the fleet of vehicles, for operation of the corresponding vehicle according to that optimal route. The method may include additional, fewer, and/or alternative steps, including those described herein.

In a further aspect, a vehicle routing and analytics (VRA) computing device for generating an optimal route for a vehicle that maximizes potential revenue for operation of the vehicle may be provided. The VRA computing device may include at least one processor in communication with a memory, wherein the at least one processor may be programmed to retrieve a vehicle definition for the vehicle, the vehicle definition including availability parameters and delivery preferences associated with the vehicle. The at least one processor may also be programmed to retrieve, based in part on the vehicle definition, a plurality of task definitions defining a respective plurality of tasks, each task including a respective cargo to be delivered, pick-up time, delivery time, pick-up location, delivery location, and task value. The at least one processor may be further programmed to generate, by executing at least one of artificial intelligence and deep learning functionality using the vehicle definition and the plurality of task definitions, an optimal route for the vehicle that includes a scheduled list of a subset of the plurality of tasks for the vehicle to perform, wherein the optimal route maximizes the potential revenue for operation of the vehicle within a period of time associated with the optimal route, and to transmit the optimal route to the vehicle for operation of the vehicle according to the optimal route. The VRA computing device may include additional, less, and/or alternative functionality, including that described herein.

In another aspect, a computer-implemented method for generating an optimal route for a vehicle to travel that maximizes potential revenue for operation of the vehicle may be provided. The method may be implemented by a vehicle routing and analytics (VRA) computing device including at least one processor. The method may include retrieving a vehicle definition for the vehicle, the vehicle definition including availability parameters and delivery preferences associated with the vehicle. The method may also include retrieving, based in part on the vehicle definition, a plurality of task definitions defining a respective plurality of tasks, each task including a respective cargo to be delivered, pick-up time, delivery time, pick-up location, delivery location, and task value. The method may further include generating, by executing at least one of artificial intelligence and deep learning functionality using the vehicle definition and the plurality of task definitions, an optimal route for the vehicle that includes a scheduled list of a subset of the plurality of tasks for the vehicle to perform, wherein the optimal route maximizes the potential revenue for operation of the vehicle within a period of time associated with the optimal route, and transmitting the optimal route to the vehicle for operation of the vehicle according to the optimal route. The method may include additional, fewer, and/or alternative steps, including those described herein.

In a further aspect, at least one non-transitory computer-readable storage media having computer-executable instructions embodied thereon for generating an optimal route for a vehicle to travel that maximizes potential revenue for operation of the vehicle may be provided. When executed at least one processor of a vehicle routing and analytics (VRA) computing device, the computer-executable instructions may cause the at least one processor to retrieve a vehicle definition for the vehicle, the vehicle definition including availability parameters and delivery preferences associated with the vehicle. The computer-executable instructions may also cause the at least one processor to retrieve, based in part on the vehicle definition, a plurality of task definitions defining a respective plurality of tasks, each task including a respective cargo to be delivered, pick-up time, delivery time, pick-up location, delivery location, and task value. The computer-executable instructions may further cause the at least one processor to generate, by executing at least one of artificial intelligence and deep learning functionality using the vehicle definition and the plurality of task definitions, an optimal route for the vehicle that includes a scheduled list of a subset of the plurality of tasks for the vehicle to perform, wherein the optimal route maximizes the potential revenue for operation of the vehicle within a period of time associated with the optimal route, and transmit the optimal route to the vehicle for operation of the vehicle according to the optimal route. The computer-executable instructions may cause additional, less, and/or alternative functionality, including that described herein.

In yet another aspect, a vehicle routing and analytics (VRA) computing device for generating an optimal route for a vehicle to travel that maximizes potential revenue for operation of the vehicle may be provided. The VRA computing device may be communicatively coupled to a plurality of vehicles, each vehicle having a plurality of sensors disposed thereon and configured to collect sensor data during operation of the respective vehicle. The VRA computing device may include at least one processor in communication with a memory, wherein the at least one processor may be programmed to retrieve a vehicle definition for a first vehicle of the plurality of vehicles, the vehicle definition including availability parameters and delivery preferences associated with the first vehicle. The at least one processor may also be programmed to retrieve, based in part on the vehicle definition, a plurality of task definitions defining a respective plurality of tasks, each task including a respective cargo to be delivered, pick-up time, delivery time, pick-up location, delivery location, and task value. The at least one processor may be further programmed to generate, by executing at least one of artificial intelligence and deep learning functionality using the vehicle definition and the plurality of task definitions, an optimal route for the vehicle that includes a scheduled list of a subset of the plurality of tasks for the vehicle to perform, wherein the optimal route maximizes the potential revenue for operation of the vehicle within a period of time associated with the optimal route. The at least one processor may still further be programmed to transmit the optimal route to the first vehicle for operation of the vehicle according to the optimal route, and receive, from the first vehicle, sensor data during operation of the first vehicle according to the optimal route. The VRA computing device may include additional, less, and/or alternative functionality, including that described herein.

In another aspect, a computer-implemented method for generating an optimal route for a vehicle to travel that maximizes potential revenue for operation of the vehicle may be provided. The method may be implemented by a vehicle routing and analytics (VRA) computing device including at least one processor and a memory, the VRA computing device communicatively coupled to a plurality of vehicles, each vehicle having a plurality of sensors disposed thereon and configured to collect sensor data during operation of the respective vehicle. The method may include retrieving a vehicle definition for a first vehicle of the plurality of vehicles, the vehicle definition including availability parameters and delivery preferences associated with the first vehicle. The method may also include retrieving, based in part on the vehicle definition, a plurality of task definitions defining a respective plurality of tasks, each task including a respective cargo to be delivered, pick-up time, delivery time, pick-up location, delivery location, and task value. The method may further include generating, by executing at least one of artificial intelligence and deep learning functionality using the vehicle definition and the plurality of task definitions, an optimal route for the vehicle that includes a scheduled list of a subset of the plurality of tasks for the vehicle to perform, wherein the optimal route maximizes the potential revenue for operation of the vehicle within a period of time associated with the optimal route. The method may still further include transmitting the optimal route to the first vehicle for operation of the vehicle according to the optimal route, and receiving, from the first vehicle, sensor data during operation of the first vehicle according to the optimal route. The method may include additional, fewer, and/or alternative steps, including those described herein.

In a further aspect, at least one non-transitory computer-readable storage media having computer-executable instructions embodied thereon for generating an optimal route for a vehicle to travel that maximizes potential revenue for operation of the vehicle may be provided. When executed by at least one processor of a vehicle routing and analytics (VRA) computing device communicatively coupled to a plurality of vehicles, each vehicle having a plurality of sensors disposed thereon and configured to collect sensor data during operation of the respective vehicle, the computer-executable instructions may cause the at least one processor to retrieve a vehicle definition for a first vehicle of the plurality of vehicles, the vehicle definition including availability parameters and delivery preferences associated with the first vehicle. The computer-executable instructions may also cause the at least one processor to retrieve, based in part on the vehicle definition, a plurality of task definitions defining a respective plurality of tasks, each task including a respective cargo to be delivered, pick-up time, delivery time, pick-up location, delivery location, and task value. The computer-executable instructions may further cause the at least one processor to generate, by executing at least one of artificial intelligence and deep learning functionality using the vehicle definition and the plurality of task definitions, an optimal route for the vehicle that includes a scheduled list of a subset of the plurality of tasks for the vehicle to perform, wherein the optimal route maximizes the potential revenue for operation of the vehicle within a period of time associated with the optimal route. The computer-executable instructions may also cause the at least one processor to transmit the optimal route to the first vehicle for operation of the vehicle according to the optimal route, and receive, from the first vehicle, sensor data during operation of the first vehicle according to the optimal route. The computer-executable instructions may cause additional, less, and/or alternative functionality, including that described herein.

In yet another aspect, a vehicle routing and analytics (VRA) computing device for generating an optimal route for a vehicle to travel that maximizes potential revenue for operation of the vehicle and generating analytics associated with operation of the vehicle may be provided. The VRA computing device may be communicatively coupled to the vehicle, the vehicle having a plurality of sensors disposed thereon and configured to collect sensor data during operation thereof. The VRA computing device may include at least one processor in communication with a memory, wherein the at least one processor may be programmed to receive, from a vehicle user associated with the vehicle, a vehicle definition for a first vehicle of the plurality of vehicles, the vehicle definition including availability parameters and delivery preferences associated with the first vehicle. The at least one processor may also be programmed to generate, based in part on the vehicle definition, an optimal route for the first vehicle that includes a scheduled list of a plurality of tasks for the vehicle to perform, each task having an associated respective cargo to be delivered, pick-up time, delivery time, pick-up location, delivery location, and task value, wherein the optimal routes maximizes the potential revenue for operation of the first vehicle within a period of time associated with the optimal route. The at least one processor may be further programmed to transmit the optimal route to the first vehicle for operation of the vehicle according to the optimal route, and receive, from the first vehicle, sensor data during operation of the first vehicle according to the optimal route. The at least one processor may still further be programmed to process the received sensor data to generate vehicle analytics associated with a performance of the vehicle, generate one or more visual representations of the vehicle analytics, and transmit the one or more visual representations of the vehicle analytics to a computing device of the vehicle user for display within a user interface of a management hub application executed on the user computing device. The VRA computing device may include additional, less, and/or alternative functionality, including that described herein.

In a further aspect, a computer-implemented method for generating an optimal route for a vehicle to travel that maximizes potential revenue for operation of the vehicle and generating analytics associated with operation of the vehicle may be provided. The method may be implemented by a vehicle routing and analytics (VRA) computing device including at least one processor and communicatively coupled to the vehicle, the vehicle having a plurality of sensors disposed thereon and configured to collect sensor data during operation thereof. The method may include receiving, from a vehicle user associated with the vehicle, a vehicle definition for a first vehicle of the plurality of vehicles, the vehicle definition including availability parameters and delivery preferences associated with the first vehicle. The method may also include generating, based in part on the vehicle definition an optimal route, for the first vehicle that includes a scheduled list of a plurality of tasks for the vehicle to perform, each task having an associated respective cargo to be delivered, pick-up time, delivery time, pick-up location, delivery location, and task value, wherein the optimal routes maximizes the potential revenue for operation of the first vehicle within a period of time associated with the optimal route. The method may further include transmitting the optimal route to the first vehicle for operation of the vehicle according to the optimal route, and receiving, from the first vehicle, sensor data during operation of the first vehicle according to the optimal route. The method may still further include processing the received sensor data to generate vehicle analytics associated with a performance of the vehicle, generating one or more visual representations of the vehicle analytics, and transmitting the one or more visual representations of the vehicle analytics to a computing device of the vehicle user for display within a user interface of a management hub application executed on the user computing device. The method may include additional, fewer, and/or alternative steps, including those described herein.

In a still further aspect, at least one non-transitory computer-readable storage media having computer-executable instructions embodied thereon for generating an optimal route for a vehicle to travel that maximizes potential revenue for operation of the vehicle and generating analytics associated with operation of the vehicle may be provided. When executed by a processor of a vehicle routing and analytics (VRA) computing device communicatively coupled to the vehicle, the vehicle having a plurality of sensors disposed thereon and configured to collect sensor data during operation thereof, the computer-executable instructions may cause the processor to receive, from a vehicle user associated with the vehicle, a vehicle definition for a first vehicle of the plurality of vehicles, the vehicle definition including availability parameters and delivery preferences associated with the first vehicle. The computer-executable instructions may also cause the processor to generate, based in part on the vehicle definition an optimal route for the first vehicle that includes a scheduled list of a plurality of tasks for the vehicle to perform, each task having an associated respective cargo to be delivered, pick-up time, delivery time, pick-up location, delivery location, and task value, wherein the optimal routes maximizes the potential revenue for operation of the first vehicle within a period of time associated with the optimal route. The computer-executable instructions may further cause the processor to transmit the optimal route to the first vehicle for operation of the vehicle according to the optimal route, and receive, from the first vehicle, sensor data during operation of the first vehicle according to the optimal route. The computer-executable instructions may still further cause the processor to process the received sensor data to generate vehicle analytics associated with a performance of the vehicle, generate one or more visual representations of the vehicle analytics, and transmit the one or more visual representations of the vehicle analytics to a computing device of the vehicle user for display within a user interface of a management hub application executed on the user computing device. The computer-executable instructions may cause additional, less, and/or alternative functionality, including that described herein.

In another aspect, a computer-implemented method of directing an autonomously floating delivery autonomous vehicle may be provided. The method may include receiving, via one or more processors, servers, and/or transceivers, autonomous vehicle (AV) condition data from multiple autonomous vehicles and other sources (such as smart infrastructure or intelligent homes) via wireless communication and/or data transmission over one or more radio frequency links, the condition data being generated by autonomous vehicle-mounted sensors and indicating weather, road, traffic, congestion, and/or accident conditions. The method may also include retrieving from a memory unit or receiving via wireless communication or data transmission over one or more radio links, via one or more processors, servers, and/or transceivers, multiple service requests generated by multiple customer computing devices. Each service request may include a pick-up and drop-off address, location, or coordinates, and information identifying one or more passengers or type and weight of one or more packages. The method may further include calculating, via one or more processors or servers, an overall route that the floating delivery autonomous vehicle will travel from an origination point to a final destination. The overall route may include each pick-up and drop-off point of the passengers and packages (as identified in the service requests) as a lowest cost waypoint along or within the overall route, the waypoints being calculated as being lowest cost based upon AV condition data and/or passenger or package weight or size information. The method may still further include routing or directing, via one or more processors or servers, the delivery autonomous vehicle along the overall route to pick-up and drop-off passengers and packages at each intermediate waypoint along the overall route, receiving, via one or more processors or servers, a new or additional electronic service request for pick-up and delivery of an additional passenger and/or package, the additional electronic service request including pick-up and drop-off point or location information, and continuing, via one or more processors, servers, and/or transceivers, to receive updated AV condition data via wireless communication or data transmission over one or more radio links, the condition data including traffic, weather, congestion, road, and/or accident data. The condition data may be generated by autonomous vehicles or other sources, such as smart infrastructure, intelligent homes, or mobile devices. The method may include, while the delivery AV is floating along the overall route, dynamically updating the overall route, via one or more processors and/or servers, by calculating the lowest cost route that includes the intermediate pick-up and drop-off locations or points in the additional service request (s) as additional waypoints along the overall route. The lowest cost update route may be calculated based upon the update AV condition data or other data received since the overall route was initially calculated. The method may also include directing, via one or more processors and/or servers, the delivery AV along the dynamically updated overall route, and updating, via one or more processors and/or servers, a status hub or user interface displaying a current status and/or location of each passenger and/or package. The method may include additional, fewer, and/or alternative steps, including those described herein.

In a further aspect, a computer system for remotely and/or locally directing an autonomously floating delivery autonomous vehicle may be provided. The computer system may include one or more local or remote processors, sensors, transceivers, and/or servers configured to receive autonomous vehicle (AV) condition data from multiple autonomous vehicles and other sources (such as smart infrastructure or intelligent homes) via wireless communication and/or data transmission over one or more radio frequency links. The condition data may be generated by autonomous vehicle-mounted sensors and indicating weather, road, traffic, congestion, or accident conditions. The computer system may be configured to retrieve from a memory unit or receive via wireless communication or data transmission over one or more radio links multiple service requests generated by multiple customer computing devices, each service request including a pick-up and drop-off address, location, or coordinates, each service request including information identifying one or more passengers or type and weight of one or more packages. The computer system may also be configured to calculate an overall route that the floating delivery autonomous vehicle will travel from an origination point to a final destination, the overall route including each pick-up and drop-off point of the passengers and packages (as identified in the service requests) as a lowest cost waypoint along or within the overall route. The waypoints may be calculated as being lowest cost based upon AV condition data and/or passenger or package weight or size information. The computer system may be further configured to route or direct the delivery autonomous vehicle along the overall route to pick-up and drop-off passengers and packages at each intermediate waypoint along the overall route, receive a new or additional electronic service request for pick-up and delivery of an additional passenger and/or package, the additional electronic service request including pick-up and drop-off point or location information, and continue to receive updated AV condition data via wireless communication or data transmission over one or more radio links, the condition data including traffic, weather, congestion, road, and/or accident data. The condition data may be generated by autonomous vehicles or other sources, such as smart infrastructure, intelligent homes, or mobile devices. In addition, the computer system may be configured to, while the delivery AV is floating along the overall route, dynamically update the overall route by calculating the lowest cost route that includes the intermediate pick-up and drop-off locations or points in the additional service request(s) as additional waypoints along the overall route. The lowest cost update route may be calculated based upon the update AV condition data or other data received since the overall route was initially calculated. The computer system may be still further configured to direct the delivery AV along the dynamically updated overall route; and update a status hub or user interface displaying a current status and/or location of each passenger and/or package. The computer system may have additional, less, and/or alternative functionality, including functionality as described herein.

In another aspect, at least one non-transitory computer-readable storage medium having computer-executable instructions thereon may be provided, wherein, when executed by at least one processor of a computer system for remotely and/or locally directing an autonomously floating delivery autonomous vehicle, the computer system including one or more local or remote processors, sensors, transceivers, and/or servers, the computer-executable instructions cause the at least one processor to receive autonomous vehicle (AV) condition data from multiple autonomous vehicles and other sources (such as smart infrastructure or intelligent homes) via wireless communication and/or data transmission over one or more radio frequency links. The condition data may be generated by autonomous vehicle-mounted sensors and indicating weather, road, traffic, congestion, or accident conditions. The computer-executable instructions may cause the at least one processor to retrieve from a memory unit or receive via wireless communication or data transmission over one or more radio links multiple service requests generated by multiple customer computing devices, each service request including a pick-up and drop-off address, location, or coordinates, each service request including information identifying one or more passengers or type and weight of one or more packages. The computer-executable instructions may also cause the at least one processor to calculate an overall route that the floating delivery autonomous vehicle will travel from an origination point to a final destination. The overall route may include each pick-up and drop-off point of the passengers and packages (as identified in the service requests) as a lowest cost waypoint along or within the overall route, the waypoints being calculated as being lowest cost based upon AV condition data and/or passenger or package weight or size information. The computer-executable instructions may further cause the at least one processor to route or direct the delivery autonomous vehicle along the overall route to pick-up and drop-off passengers and packages at each intermediate waypoint along the overall route, receive a new or additional electronic service request for pick-up and delivery of an additional passenger and/or package, the additional electronic service request including pick-up and drop-off point or location information, and continue to receive updated AV condition data via wireless communication or data transmission over one or more radio links, the condition data including traffic, weather, congestion, road, and/or accident data, the condition data may be generated by autonomous vehicles or other sources, such as smart infrastructure, intelligent homes, or mobile devices. The computer-executable instructions may still further cause the at least one processor to, while the delivery AV is floating along the overall route, dynamically update the overall route by calculating the lowest cost route that includes the intermediate pick-up and drop-off locations or points in the additional service request(s) as additional waypoints along the overall route. The lowest cost update route may be calculated based upon the update AV condition data or other data received since the overall route was initially calculated. The computer-executable instructions may also cause the at least one processor to direct the delivery AV along the dynamically updated overall route, and update a status hub or user interface displaying a current status and/or location of each passenger and/or package. The computer-executable instructions may cause additional, less, and/or alternative functionality, including that described herein.

In a still further aspect, a computer system for directing a floating delivery autonomous vehicle may be provided. The computer system may include at least one of: one or more processors, one or more sensors, one or more transceivers, and one or more servers. The computer system may be configured to receive autonomous vehicle (AV) condition data from at least one source including a plurality of AVs, the AV condition data generated by AV-mounted sensors and indicating weather, road, traffic, congestion, and/or accident conditions, and retrieve, from a memory unit, a plurality of service requests generated by a corresponding plurality of customer computing devices, each service request including a pick-up location, a drop-off location, and information identifying (i) one or more passengers, and/or (ii) a type and a weight of one or more packages. The computer system may also be configured to calculate an overall route that the floating delivery AV will travel from an origination location to a final location, the overall route including a respective pick-up and drop-off location identified in a subset of the plurality of service requests, including calculating the overall route as a lowest cost route between all of the respective pick-up and drop-off locations as waypoints, based upon at least one of: (i) the AV condition data, and/or (ii) passenger or package information identified in the subset of service requests. The computer system may be configured to direct the delivery AV to travel the overall route to each pick-up and drop-off location and to pick-up and drop off the (i) one or more passengers and/or (ii) one or more packages at each respective pick-up and drop-off location as indicated in the subset of the plurality of service requests. The computer system may be still further configured to receive an additional service request for pick-up and drop-off of an additional (i) one or more passengers and/or (ii) one or more packages, the additional service request including a corresponding pick-up and drop-off locations, continuously receive updated AV condition data, and, while directing the delivery AV along the overall route, dynamically update the overall route by calculating an updated lowest cost route that includes the pick-up and drop-off locations in the additional service request as additional waypoints along the overall route, based upon at least one of (i) the updated AV condition data and/or (ii) other data received since the overall route was initially calculated. The computer system may be configured to direct the delivery AV along the dynamically updated overall route, and update a remote status hub with location information associated with the delivery AV, the status hub configured to display at least one of a current status and current location of each (i) one or more passengers or (ii) one or more packages transported by the delivery AV. The computer system may have additional, less, and/or alternative functionality, including functionality as described herein.

Advantages will become more apparent to those skilled in the art from the following description of the preferred embodiments which have been shown and described by way of illustration. As will be realized, the present embodiments may be capable of other and different embodiments, and their details are capable of modification in various respects. In addition, although certain steps of the exemplary processes are numbered, having such numbering does not indicate or imply that the steps necessarily have to be performed in the order listed. The steps may be performed in the order indicated or in another order. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein:

FIG. 4B illustrates an exemplary optimal route that may be generated by the VRA computing device shown in FIG. 2 and implemented by the vehicle shown in FIG. 1;

Figure 1:
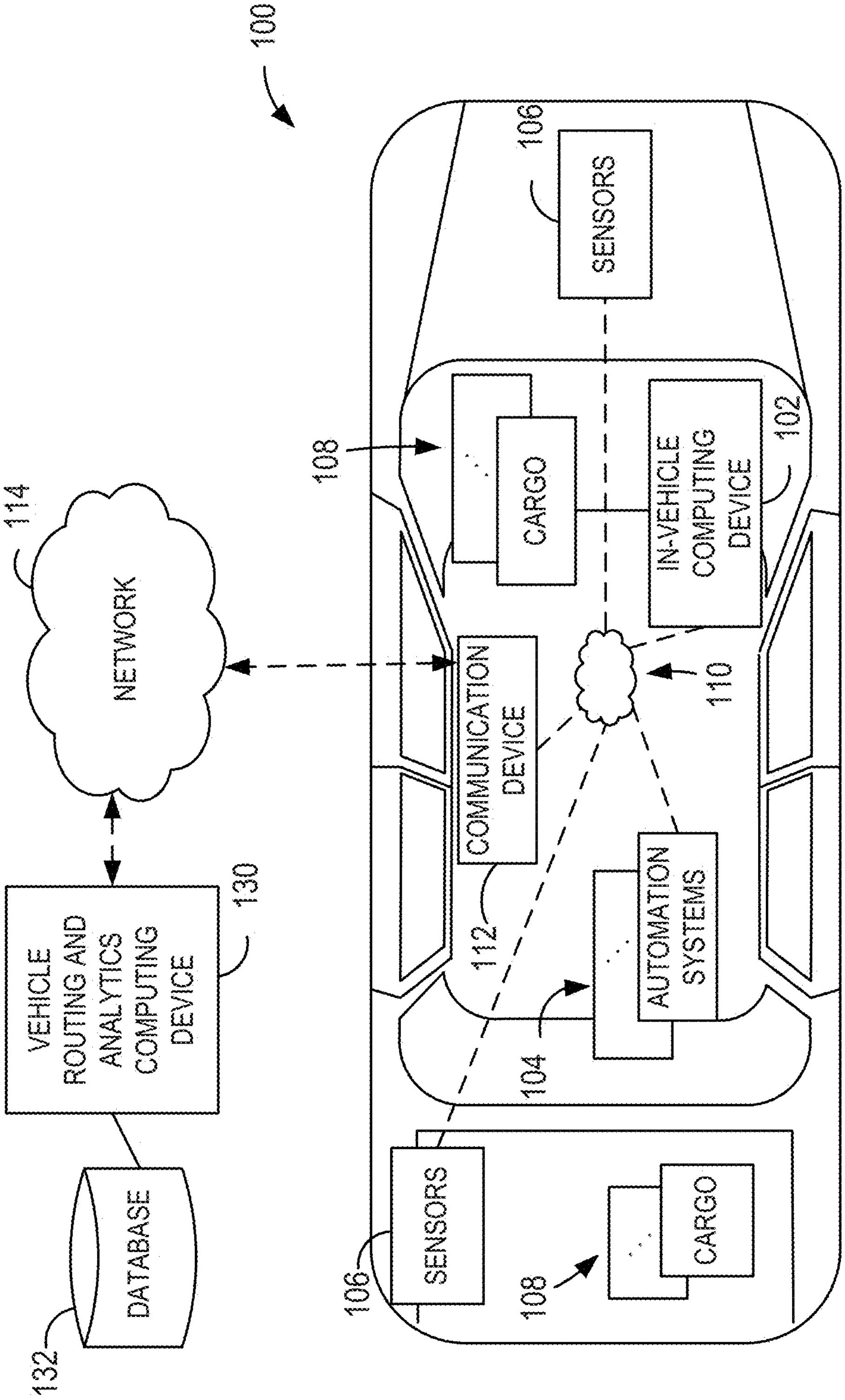
FIG. 1 illustrates a schematic diagram of an exemplary vehicle.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, systems and methods for optimizing delivery routing for a plurality of vehicles. Vehicle users (e.g., owners, lessors, fleet managers, etc.) may register with a vehicle routing system to receive vehicle routing services therefrom. The vehicle users may submit "definitions" of their vehicle that describe how they want their vehicle to be used (e.g., the times and locations that the vehicle is available to make deliveries). The vehicle routing system may receive a plurality of tasks (e.g., delivering cargo including person(s) and/or object(s)) to be completed, and may analyze the vehicle definitions and the plurality of tasks to generate an optimal route for each vehicle that maximizes the vehicle's profit generation. In the exemplary embodiment, the vehicle routing system may include artificial intelligence and/or machine or deep learning functionality to generate the optimal routes.

In addition, the vehicle routing system may collect and process sensor data from the plurality of vehicles, as the vehicles operate according to the optimal routes (e.g., performing delivery tasks). The sensor data may characterize use/performance of the vehicle, an ambient environment around the vehicle (e.g., weather, traffic), local infrastructure, and more. The vehicle routing system may process the sensor data (e.g., using the artificial intelligence and/or machine or deep learning functionality) to generate vehicle analytics for each vehicle, identify trends, update optimal routes, and/or make recommendations.

In the exemplary embodiment, the vehicle routing system maintains a management hub app that enables users to view vehicle analytics and recommendations made by the vehicle routing system. The management hub may additionally enable users to update their user preferences or vehicle definitions of registered vehicles. Additionally or alternatively, the management hub app provides users access to a plurality of other services provided by the vehicle routing system, including maintenance/repair services, financial services, marketing services, and the like.

"Vehicle," as used herein, may refer generally to any vehicle owned, operated, and/or used by one or more vehicle users. A vehicle may include any kind of vehicle, such as, for example, cars, trucks, all-terrain vehicles (ATVs), motorcycles, recreational vehicles (RVs), snowmobiles, boats, autonomous vehicles, semi-autonomous vehicles, user-driven or user-operated vehicles, industrial vehicles (e.g., construction vehicles), "riding" lawnmowers, farm equipment, planes, helicopters, bicycles, flying cars, robo-taxis, self-driving taxis, and/or any kind of land-, water-, or air-based vehicle.

"Vehicle user," as used herein, may refer generally to a person who is responsible for the vehicle, and who has access to use of the vehicle. Vehicle users may include owners, lessors, and/or renters, for example, of a vehicle. A vehicle user may be responsible for or have access to a plurality of vehicles, referred to herein as a "fleet." Vehicle users may be personal vehicle users (e.g., may be responsible for and have access to one or more vehicles for personal use) and/or may be corporate vehicle users (e.g., corporate managers who may be responsible for and have access to one or more vehicles associated with corporate use and/or with a corporate entity).

"Autonomous vehicle," as used herein, may refer generally to any vehicle that has at least one automation system that is related to the piloting of the vehicle (e.g., warning systems assisting in a piloting task, intervention systems performing a piloting task, control systems performing a piloting task). The term "unautomated vehicle" refers to vehicles in which no automation systems are present (e.g., the vehicle is being piloted by the full-time performance of a human driver, and without enhancements from warning or intervention systems). The terms "semi-autonomous vehicle" and "autonomous vehicle" may be used interchangeably in some instances, and the term "autonomous vehicle" may be used to refer to both semi-autonomous vehicles and autonomous vehicles for purposes of convenience.

Automation systems include, for example, rear-view sensors and alarms (e.g., to detect obstacles while in reverse), anti-lock braking systems (e.g., to prevent wheel locking during deceleration), traction control systems (e.g., actuating brakes or reducing throttle to restore traction if wheels begin to spin), electronic stability control and acceleration slip regulation (e.g., to prevent the car from understeering or oversteering), dynamic steering response (e.g., to correct the rate of power steering based upon road conditions), cruise control (e.g., to maintain vehicle speed), autonomous cruise control (e.g., to adjust cruising speed to maintain safe distance from vehicles ahead), lane-keep assist systems (e.g., to alert the driver or adjust steering to keep the vehicle in its current lane), driver monitoring systems (e.g., to warn drivers when they become drowsy or fall asleep), adaptive headlamps (e.g., to alter the brightness or angle of headlamps), collision avoidance systems (e.g., to warn the driver an impending collision or adjust steering to avoid impending collision), parking assistance systems, blind spot monitoring systems, traffic sign recognition systems, dead man's switch systems, computer vision systems, location determination systems (e.g., GPS), and navigation systems (e.g., to navigate or assist in navigating the vehicle to a destination).

"Job" or "task," as used interchangeably herein, may refer generally to one complete use of the vehicle, from a starting point to an ending point. In some cases, a task may commence when the vehicle is started and may terminate when the vehicle is turned off. If a task is defined in this way, the vehicle may automatically track and record tasks, as commencement and termination are simply defined. In some cases, a task may commence when an initial location is reached and may terminate when a destination location is reached. In such cases, the vehicle may automatically track and record tasks based upon, for example, location determination and/or navigation systems native to the vehicle and/or activated on a user computing device within the vehicle. In other cases, the task may be "manually" defined, such that a user designates a commencement and termination of a task (e.g., when the vehicle may be turned on and off more than once in a single use of the vehicle, or when multiple tasks are completed without turning off the vehicle). In such cases, the vehicle may prompt the user to designate the commencement and termination (e.g., using a user interface of the vehicle and/or using an app available on a user computing device) of the task such that the vehicle may track and record the task.

As used herein, "vehicle definition" may refer generally to a record of characteristics of each vehicle. The vehicle routing system described herein may use the vehicle definition to identify available tasks that a vehicle is able to complete, when generating the optimal route for a single vehicle or a plurality of vehicles. A vehicle definition may be generated and/or populated based upon input from a vehicle user associated with a vehicle (e.g., an owner, lessor, corporate manager, etc.) when the vehicle user registers the vehicle with the vehicle routing system (e.g., to receive the routing services therefrom). Each vehicle definition includes a plurality of data elements such as one or more of: an identifier of the vehicle (e.g., a vehicle identification number (VIN), or an identifier specific to the vehicle routing system); time(s) the vehicle is available to complete tasks; geographic location(s) in which the vehicle is available to complete tasks; whether the vehicle is autonomous, semi-autonomous, or manually driven; available features of the vehicle (e.g., luggage racks, tinted windows, child locks, running boards, accessibility features, etc.); vehicle make; vehicle model; vehicle manufacturing year or vehicle age; vehicle mileage; vehicle capacity (e.g., for cargo including persons and/or objects); vehicle class (e.g., sedan, pick-up truck, semi-truck, plane, bicycle, etc.); and/or communication standards for the vehicle (e.g., how the vehicle can receive commands, messages, etc.). The vehicle definition may further include an identifier of and/or contact information for one or more vehicle users, such as the vehicle user that registered the vehicle and/or additional vehicle user(s) responsible for and/or having access to the vehicle.

Vehicle definitions may additionally or alternatively include data that is continually or periodically updated—that is, vehicle definitions may not be completely static but may change over time. For example, vehicle definitions may further include data elements such as a current vehicle location; current vehicle capacity and/or current cargo in vehicle; a risk or performance rating of the vehicle; historical claim data associated with the vehicle and/or vehicle user; and/or user preferences (e.g., only accept cargo including persons, only accept cargo including objects, accept cargo including persons and/or objects, available for route continuation tasks, accept or do not accept high-risk cargo, etc.).

"Task definitions," as used herein, may refer to a record of characteristics of an available or a completed task. The vehicle routing system described herein may use the task definition of each task, when generating the optimal route for a single vehicle or a plurality of vehicles. A task definition may be generated and/or populated when a task is registered with the vehicle routing system, as described further herein. Each task definition includes a plurality of data elements such as one or more of: a pick-up time, a delivery time, precision designation for the pick-up time and/or the delivery time (e.g., low precision such as +/−thirty minutes, high precision such as +/−five minutes), pick-up, transport, and/or delivery restrictions (e.g., human signature or other authorization measure required, specific type of vehicle required or prohibited, concurrent cargo prohibited, etc.), pick-up location, delivery location, task value (e.g., a dollar amount granted upon completion of the task); cargo type (e.g., person and/or object); dimensions, size, and/or weight of cargo; number of cargo (e.g., two package or three persons); cargo status (e.g., high-value, high-risk, social good); cargo priority (e.g., low priority, VIP, etc.); cargo risk and/or performance rating; and/or additional requirements and/or preferences (e.g., no route continuation, bonus if delivered within a priority period of time, restrictions on transporting certain cargo or passengers concurrently, etc.). Task definitions may further include an identifier of and/or contact information for a user associated therewith, such as a user that registered the task with the vehicle routing system (which may include an individual person, a corporate entity, etc.).

Task definitions may additionally or alternatively include data that is continually or periodically updated—that is, task definitions may not be completely static but may change over time. For example, task definitions may further include data elements such as a current cargo location; and/or current task value (e.g., a bonus offered or a payment reduced based upon poor service, etc.). It is contemplated that tasks may have default values associated therewith for common tasks (e.g., a pick up from and delivery to common or frequent locations), tasks may have values set on a per-task basis by whomever registers the task, tasks may have varying values based upon how successfully or timely they are completed, and/or task values may be divided (e.g., if the cargo is subject to route continuation).

"App," as used herein, may refer generally to a software application installed and downloaded on a user interface of the vehicle and/or a user computing device associated with a vehicle user. An app associated with the vehicle routing system, as described herein, may be understood to be maintained by the vehicle routing system and/or one or more components thereof. Accordingly, a "maintaining party" of the app may be understood to be responsible for any functionality of the app and may be considered to instruct other parties/components to perform such functions via the app.

EXEMPLARY EMBODIMENTS

In the example embodiment, the vehicle routing system is configured to capture data from a plurality of sources and automatically synthesize that data to create efficient routing strategies for one or more vehicles. For example, the vehicle routing system may receive, retrieve, capture, and/or otherwise access sensor data from the vehicles (which may include and/or be processed to generate usage data for the vehicle), tasks data, user data (e.g., of vehicle users registered with the vehicle routing system), and/or ambient data (e.g., weather data, traffic data, news, market data). The vehicle routing system may include any suitable data storage capabilities, such as cloud storage, to access and/or store any of the above data. In that way, the vehicle routing system may access historical and/or current (e.g., real-time or near real-time) data. In the exemplary embodiment, the vehicle routing system includes at least one vehicle routing and analytics (VRA) computing device. The VRA computing device is configured to perform the functions that may be more generally described herein as being performed by and/or attributed to the vehicle routing system.

In particular, in the exemplary embodiment, the VRA computing device processes vehicle definitions and task definitions of available tasks to generate an optimal route for one or more vehicles. The VRA computing device may receive each vehicle definition, for example, from a vehicle user associated with each vehicle when the vehicle user registers with the vehicle routing system. For example, the vehicle user adds one or more vehicles to an account to access the vehicle routing strategies of the vehicle routing system. The VRA computing device may store the vehicle definitions, for example, in a vehicle definition database. The vehicle definition database may be any suitable storage location, and may in some embodiments include a cloud storage device such that the vehicle definition database may be accessed by a plurality of computing devices (e.g., vehicle user computing devices, such that vehicle users may update and/or add vehicle definitions; vehicle computing devices, such that vehicle definitions may be updated based upon sensor data from the vehicles).

The VRA computing device may receive each task definition, for example, from one or more task sources. Task sources may be corporate entities (e.g., UBER, LYFT, AMAZON, smaller companies, etc.) that register a plurality of tasks with the vehicle routing system. Task sources may additionally or alternatively be individuals that register individual tasks with the vehicle routing system (e.g., requests for individual rides, requests for individual package delivery). The VRA computing device may store the task definitions, for example, in a task definition database. The task definition database may be any suitable storage location, and may in some embodiments include a cloud storage device such that the task definition database may be accessed by a plurality of computing devices (e.g., computing devices associated with task sources, such that users may update and/or add task definitions). The task definition database may be similar to and/or integral to the vehicle definition database. The vehicle definition database and/or the task definition database may be integral to the VRA computing device or may be remotely located with respect thereto.

The VRA computing device may additionally incorporate ambient data into its generation of optimal routes for vehicles. Ambient or environmental data may be received from vehicles registered with the vehicle routing system and/or may be received/retrieved/accessed from one or more third-party sources. Ambient data may include, for example, one or more of weather data, traffic data, construction/road closure data, emergency data, crime data, and/or risk/liability data.

The VRA computing device may apply artificial intelligence, machine learning, and/or deep learning to any data described herein to develop routing strategies that maximize revenue on a per-vehicle and/or per-vehicle-fleet basis, and/or that optimize use of a vehicle and/or a vehicle fleet. In some embodiments, the VRA computing device may develop routing strategies that take into account a most optimal class or capacity of vehicle available for a task, closest vehicle, best availability (e.g., local, regional, domestic, any, etc.), and/or greatest revenue opportunity.

Additionally or alternatively, the VRA computing device may generate optimal routes based upon the availability of a plurality of vehicles. For example, the VRA computing device may determine that many vehicles are available to accept a set of tasks, but that some of the tasks have specific requirements that are only matched by a subset of the available vehicles. Accordingly, the VRA computing device may assign more restrictive tasks first and then assign less restrictive tasks based upon the remaining vehicle availability. In some embodiments, the VRA computing device may only perform such assignments among vehicles within a vehicle fleet, such that availability and revenue opportunity are distributed throughout the vehicle fleet.

Additionally or alternatively, the VRA computing device may identify locations and/or classes of cargo for vehicles to service, such as locations with less competition and/or underserved locations (e.g., locations with a lowest number of completed tasks). The VRA computing device may provide recommendations to vehicle users to expand or modify the availability radius of their associated vehicles, such that the vehicles may operate in underserved locations.

The VRA computing device may also be configured to leverage event data—such as data gathered from publicly available social media, crawled from the internet, and/or captured from calendars of vehicle users registered with the vehicle routing system—to generate, enhance, modify, and/or update routing strategies. For example, the vehicle routing service may identify a local event (e.g., a concert or sporting event) taking place at a first location at a first time (and/or within a first time period, e.g., from 1 PM-4 PM). The vehicle routing service may determine that there are likely to be many potential tasks to complete associated with the event, such as transporting persons to and from the event. Specifically, although no or few tasks may already be available (e.g., based upon scheduled or reserved transportation), the VRA computing device may determine (e.g., based upon historical event data and/or data associated with past completed tasks) the event is likely to generate a plurality of potential tasks, and may route vehicles to the event at the start and/or end date. The vehicles will be available to accommodate any potential tasks at the event.

The VRA computing device may be further configured to apply artificial intelligence and/or deep learning to identify and utilize patterns and/or trends in developing routing strategies. In the exemplary embodiment, the VRA computing device may identify trends and/or patterns based upon the timing of available and/or completed tasks, such as daily, weekly, work-weekly (e.g., Monday through Friday), weekend, monthly, yearly, seasonal, and/or other patterns and trends. The VRA computing device may additionally or alternatively identify trends and/or patterns in classes of cargo, types of tasks, and/or locations (e.g., greater number of flower deliveries in February, greater numbers of food deliveries in to particular neighborhoods, greater number of returns to a corporate warehouse location). The VRA computing device may develop routing strategies that strategically and pre-emptively direct vehicles to various locations to accommodate these trends and/or patterns, making the vehicles available to complete tasks in strategic locations and/or at strategic times.

It is contemplated that the characteristics of tasks associated with cargo including persons (e.g., ride sharing or other scheduled personal transportation) may be different from the characteristics of tasks associated with cargo including objects (e.g., package delivery, food delivery, etc.). For example, tasks associated with person(s) as cargo (referred to herein as "person-based tasks") may, in some cases, present a higher revenue opportunity than tasks associated with object(s) as cargo (referred to herein as "object-based tasks"), as people may be willing to pay more to transport themselves than to send packages.

Moreover, the characteristics of person-based tasks may vary widely. For example, tasks associated with transporting children, disabled persons, elderly persons, and/or "high-value" persons (e.g., users willing to pay more for privacy, speed, security, etc.) may present a higher revenue opportunity. Likewise, the characteristics of object-based tasks may vary widely. For example, tasks associated with transporting fragile, high-risk, and/or high-value object may present a higher revenue opportunity. On the other hand, higher-revenue tasks may present greater risks and/or restrictions, such as requiring the cargo to be the only cargo on-board the vehicle, requiring more precise pick-up and/or delivery timing, requiring faster delivery, requiring human signature or other confirmation of pick-up and/or delivery, requiring certain vehicle or user attributes, and the like, which may limit the availability of the revenue opportunity.

In certain embodiments, tasks may offer bonuses or other incentives. For example, as described above, certain persons may define their tasks to have a high value, to incentivize faster, more secure, more premium, and/or more private service. A person may prioritize (and therefor incentivize, or offer a higher task value to) certain types of vehicles, such as preferred autonomous vehicles over manually driven vehicles (or vice versa), vehicles featuring more safety features or amenities, and the like. In other words, a task source may encourage their associated task to be prioritized by increasing the task value, which may cause the VRA computing device to schedule the task more promptly. Additionally or alternatively, users may pay premiums or subscription fees to have their associated tasks prioritized by the VRA computing device.

The VRA computing device may further account for various costs in determining the optimal route for each vehicle. For example, the VRA computing device may determine that the fuel costs for one vehicle may be higher than for another vehicle, and accordingly a particular task presents a greater revenue opportunity for the vehicle with lower fuel costs. Additionally or alternatively, the VRA computing device may further account for other factors in determining the optimal route for each vehicle. For example, the VRA computing device may determine that maintenance costs for one vehicle may be higher than for another vehicle, and accordingly a particular task presents a greater revenue opportunity for the vehicle with lower maintenance costs. As another example, the VRA computing device may consider an environmental impact of certain routes and/or certain vehicles. The VRA computing device may prioritize vehicles with reduced environmental impact.

Accordingly, the VRA computing device is configured to execute artificial intelligence, machine learning, and/or deep learning functionality to optimally organize and schedule the varying tasks within the routes of many vehicles. The artificial intelligence and/or machine or deep learning functionality, in the exemplary embodiment, apply one or more optimization rules that account for the various characteristics of each task as well as the vehicle definition of each vehicle to generate an optimal route for each vehicle that schedules a plurality of tasks for the vehicle to complete.

The VRA computing device may further account for user preferences or settings (e.g., stored as part of the vehicle definition) in generating the optimal routes. The preferences may include, for example, whether the vehicle is available for only person-based tasks, only object-based tasks, and/or for person- and object-based tasks. Moreover, the VRA computing device may analyze the routes developed for vehicles associated with only person-based tasks or only object-based tasks and compare the revenue of those routes to the revenue of more flexible routes (e.g., for vehicle that accept both persons and objects as cargo). The VRA computing device may recommend that a vehicle user change their preferences if the VRA computing device determines, based upon such a comparison, that the vehicle could be generating more revenue if the vehicle accepted both persons and cargo.

As another example, the VRA computing device may analyze user preferences such as vehicle availability, and determine that a vehicle is available for a certain number of hours in a day. The VRA computing device may further determine that the vehicle could be generating more revenue if the vehicle were available for more hours in the day, or if the vehicle were available on a different schedule (e.g., if the vehicle were available during busier time periods).

In addition, the VRA computing device may be configured to detect, in the identified patterns and/or trends, that there are certain times of day, certain days, or other times during which vehicles generally (e.g., on average) complete relatively few tasks, or a number of tasks below a threshold. These times may be referred to as "down times" or "lull times."

The VRA computing device may recognize that these times may be advantageous for completing tasks that are less profitable or have no profit associated therewith. For example, the VRA computing device may schedule service or maintenance for a vehicle during a lull time, and may route the vehicle to a service vendor to perform the service during the lull time.

As another example, the VRA computing device may identify certain "non-profit" or "social good" tasks, which generate little or no profit but which are associated with service to a local community, such as transporting low income persons who cannot afford to pay for a trip, transporting persons objects to/from non-profit entities (e.g., food banks, homeless shelters), and/or transporting the elderly or handicapped, transporting or delivering medications and needed medical equipment and the like. The VRA computing device may schedule such social good tasks during lull times. Additionally or alternatively, each vehicle and/or vehicle fleet may be required or recommended to perform a predetermined number of social good tasks within a period of time (e.g., monthly, yearly, etc.). The VRA computing device may generate a route for a vehicle that prioritizes social good tasks, even during more profitable times of the day, in order to reach the required or recommended number of social good tasks. In some embodiments, social good tasks may have a low value or no value (with respect to potential revenue) but may have a positive tax incentive that supplements the low/no value.

"Route continuation," as used herein, refers generally to division of a task into portions for completion by separate vehicles. The VRA computing device may implement route continuation for tasks that are associated with a long distance between pick-up and delivery (e.g., if no single vehicle has an appropriate availability radius, if the task is more profitable if divided, and/or if the task will be completed in a shorter time if divided). For example, cargo that is to be picked up in Chicago and delivered to Boston may be subject to route continuation. A first vehicle may pick up the cargo in Chicago and deliver the cargo to a second vehicle at a second location intermediate Chicago and Boston (e.g., Cleveland). The second vehicle may pick up the cargo at the second location and may deliver the cargo to the delivery location (e.g., Boston) or may deliver the cargo to a third vehicle at a third location intermediate the second location and Boston (e.g., Syracuse). The third vehicle may pick up the cargo at the third location and then deliver the cargo to the delivery location.

In the exemplary embodiment, the vehicles registered with the vehicle routing system capture data during operation thereof (whether the vehicles are autonomous, semi-autonomous, and/or manually driven). Specifically, the vehicles have one or more sensors disposed thereon, such as location sensors, audio sensors, video sensors, cameras, LIDAR, RADAR, GPS/navigation systems, acceleration/deceleration sensors, braking sensors, turning sensors, scanners, and/or any other sensor, including those described elsewhere herein. The sensors operate and collect and/or generate sensor data passively and/or actively as the vehicle operates (e.g., drives during/between tasks). In some embodiments, the sensor data includes information captured about the respective vehicle's operation, the environment around the vehicle (e.g., infrastructure, weather, etc.), and objects around the vehicle (e.g., other vehicles, people, etc.). The VRA computing device is configured to receive and/or access sensor data from the vehicles registered with the vehicle routing system. The VRA computing device may store received sensor data in a sensor data database, which may include a cloud storage database. The sensor data database may be similar to and/or integral to the vehicle definition database and/or the task definition database, as described herein. The VRA computing device may use the sensor data in a variety of ways, such as incorporating the sensor data into the intelligent vehicle routing and generating various reports based upon the sensor data.

In some embodiments, the VRA computing device processes the sensor data to develop vehicle analytics including risk profiles of routes being travelled by the vehicle, the vehicle itself, and/or the cargo being transported/delivered. For example, the VRA computing device uses sensor data to understand real-time risks and liabilities to vehicle(s), people, interstates, streets, roadway technology and roadway lights, buildings, houses, and landscapes about the vehicles. The risk profiles may incorporate infrastructure risks and/or liabilities (e.g., routes with a significant number of potholes or associated with significant number of emergency incidents such as crimes and/or accidents), crime data, real-time environmental data (e.g., weather and/or traffic data), as well as data about the performance of the vehicle during operation thereof. The VRA computing device may use generated risk profiles to determine appropriate cargo that can be delivered by the vehicle and/or to analyze insurance policies associated with the vehicle, as described further herein. The risk profiles may be real-time risk profiles, which incorporate real-time ambient data to identify a local, real-time risk for a particular vehicle, which may impact availability to complete tasks, elevate risk to the vehicle/vehicle user, or elevate risk of insurance claims activity.

In some embodiments, the VRA computing device may analyze the risk profiles to determine whether enhanced insurance policies should be pushed to a vehicle user associated with a vehicle experiencing high risk. For example, the VRA computing device may access an insurance policy associated with the vehicle and/or the vehicle user (e.g., from an insurance server/database) and identify whether the retrieved insurance policy would provide adequate coverage for the level of risk experienced by the vehicle. If not, the VRA computing device may transmit a notification to the vehicle user associated with the vehicle of the potential deficiency in their current insurance policy. The notification may include a recommendation of an improved insurance policy and/or a one-time insurance package associated with a particular task and/or route.

Additionally or alternatively, the VRA computing device may avoid scheduling tasks in a vehicle's optimal route if the risk associated with the task and/or the route thereto/therefrom would exceed a risk threshold defined in an insurance policy associated with the vehicle. The VRA computing device may notify a vehicle user that because their insurance policy defines a particular low risk level, the vehicle is unable to accommodate higher-risk (and, in some cases, higher-value) tasks. The VRA computing device may recommend the vehicle user upgrade their insurance policy such that the vehicle may be assigned such higher-risk but higher-value tasks.

In some embodiments, the VRA computing device may use the sensor data to generate reports for various entities, such as local governments, businesses, consumers, and/or residents. For example, the reports may include processed and parsed sensor data to highlight infrastructure issues, changes, technology and construction progress and upgrades, work needing to be performed or maintained, crime, business and residential consumer risks and liabilities. The reports may further include recommendations, solutions, strategies, and/or services to reduce the risks, liabilities, and costs identified in the reports, reduce insurance costs, and/or to improve property values and revenue potential.

The VRA computing device may additionally or alternatively leverage video, audio, and/or navigation/location sensor data in response to local emergencies (e.g., accidents, crime, etc.). This sensor data may increase success of responding to emergencies, accidents, disasters or finding missing persons (e.g., in response to amber alerts, silver alerts, etc.), persons of interest (e.g., wanted criminals), crimes in progress, fires, and/or cries for help. In some embodiments, in response to an emergency alert, a vehicle in an affected area may activate various sensors and/or transmit real-time sensor data to the VRA computing device. The VRA computing device may parse the sensor data and provide, where applicable, various reports, alerts, data evidence, and the like to first responders and/or other suitable entities.

In addition, the VRA computing device may incorporate the use of the vehicle's sensors into the operation of the vehicle according to an optimal route. In the exemplary embodiment, the vehicles include sensors configured to track check-in/check-out of cargo to/from the vehicle, such as scanners, cameras, motion sensors, presence sensors, and the like. Cargo, such as objects, may have RFID tags, bar codes, and/or other identifiers that may be scanned and/or otherwise sensed by the sensors to track the check-in/check-out of the cargo. Other cargo, such as persons, may have user computing devices such as smart phones that the persons may scan or otherwise present to the vehicle when entering/ exiting the vehicle. Additionally or alternatively, the user computing devices may include near-field communication (NFC), RFID, and/or BLUETOOTH functionality that enables check-in/check-out. In some embodiments, a person may have a dedicated device used for check-in/check-out, such as a key fob, that may be scanned or otherwise sensed by the vehicle during check-in/check-out. Additionally or alternatively, the vehicle may include one or more biometric sensors, such as facial scanners, fingerprint sensors, and the like, which enable known persons to securely enter and exit the vehicle.

The vehicle may generate sensor data indicative of the check-in/check-out activity at the vehicle. The VRA computing device may receive such sensor data from the vehicle and may monitor the sensor data for adherence to the optimal route schedule. For example, the VRA computing device may generate and maintain a ledger of all check-in/check-out activity, which may be compared to a similar ledger maintained at the vehicle itself, for data validation purposes. In some embodiments, the VRA computing device and/or the vehicle may maintain a ledger as a blockchain, enhancing data security and integrity. In addition, the VRA computing device may use the check-in/check-out data to identify when a task is completed and, therefore, to initiate payment of the task's value to a financial account associated with the vehicle, as described further herein.

Moreover, the VRA computing device may use the sensor data, as well as the vehicle and task definitions, to develop onboarding strategies for a vehicle that optimize the use of space/capacity within the vehicle. For example, the VRA computing device may determine that, based upon current cargo in the vehicle, the vehicle has 50% cargo capacity remaining. The VRA computing device may additionally determine that tasks having larger cargo and/or cargo to be transported further should be arranged within the vehicle in a particular way (e.g., larger packages further back and/or closer to the bottom), and may direct one or more human operators (e.g., placing objects into the vehicle) how to optimally arrange the cargo within the vehicle, based upon the optimal route and the sensed available space/capacity.

Additionally or alternatively, the VRA computing device may monitor the sensor data and detect a deviation from the optimal schedule, such as an unexpected and/or unauthorized check-in and/or check-out. The VRA computing device may initiate one or more corrective measures upon detecting a deviation from the optimal route. For example, if an unauthorized person attempts to enter the vehicle, or if an unauthorized removal of an object is detected, the VRA computing device may transmit a control signal to the vehicle to (i) generate an audible and/or visual alarm, (ii) activate one or more audio/video sensors to begin recording to capture evidence of the unauthorized entry/departure, and/or (iii) transmit a report to a first responder.

The VRA computing device may leverage additional sensor data to identify high-risk cargo, which may require additional insurance coverage or may need to be rejected from the vehicle. For example, the vehicle may include radiation sensors, cargo scanning sensors, and/or other sensors that may generate sensor data used by the VRA computing device to detect high-risk and/or dangerous object-based cargo, such as drugs, bomb making materials, radioactivity, etc. Additionally or alternatively, the vehicle may include audio and/or video sensors, cameras, microphones, and the like that may generate sensor data used by the VRA computing device to detect high-risk person-based cargo, such as persons that are under the influence of drugs or alcohol, that use threatening language or exhibit violent behavior, and the like. Upon detection of such high-risk cargo, the VRA computing device may (i) transmit a control signal to the vehicle to suspend further operation and/or (ii) transmit a request for assistance to a first responder (e.g., the police, emergency medical services, etc.).

The VRA computing device may additionally leverage vehicle sensor data to identify real-time environment risks, such as accidents, disasters, extreme weather, terrorism, and the like, and automatically re-route the vehicle away from the risks (e.g., by modifying an optimal route and/or transmitting override instructions).

The VRA computing device may also process sensor data from vehicles to identify performance issues associated therewith, which may require the vehicle to be serviced. It should be understood that performance issues and/or related services may be minor or routine, such as filling a gas tank when gas is determined to be low, charging a battery when a battery charge is determined to be low, changing the oil when the oil level is low or a threshold number of miles have been travelled, and/or interior/exterior detailing. The performance issues and/or related services may be more acute, such as a flat tire needing to be replaced, a damaged transmission system, required brake maintenance, etc. When the VRA computing device determines the vehicle needs to be serviced, the VRA computing device determines an optimal time for the services to be performed, as described above, and routes the vehicle to a service vendor.

Moreover, the VRA computing device may detect from the sensor data that a vehicle is disabled (or is close to being disabled) and requiring real-time/roadside/emergency service. The VRA computing device may transfer any incomplete tasks from the vehicle to another vehicle. For example, the VRA computing device may modify optimal routes of one or more other vehicles to take on future tasks and/or travel to the disabled vehicle to onboard any cargo that was being transported in the disabled vehicle. Additionally, the VRA computing device may request a service vehicle travel to the disabled vehicle, for example, from a service vendor, and request that the service vehicle tow or otherwise transfer the disabled vehicle to a service location for service/repair.

In some embodiments, the VRA computing device initiates and/or facilitates payment for completed tasks to financial accounts associated with vehicle users. The VRA computing device, as described herein, determines when a task is complete, identifies the vehicle that completed the task, and identifies a task value associated with the completed task (e.g., by retrieving or accessing the task definition or a cached copy thereof). The VRA computing device further identifies a user or user account associated with the task, which may include an individual person, a corporate account, etc. The VRA computing device determines a financial institution associated with the user/user account (a "task financial institution"), as well as a financial institution associated with the vehicle user of the vehicle that completed the task (a "vehicle financial institution"). The VRA computing device transmits an instruction to the task financial institution to transfer funds from a payment account of the user associated with the task to a payment account of the vehicle user. The VRA computing device may facilitate task value division, provision of bonuses/incentives from users, provision of tax incentives, and/or any other financial services associated with the completion of tasks as described herein. The VRA computing device may transmit funds-transfer instructions for payment of completed tasks after each individual task is completed, periodically, in batches, etc.

In some embodiments, the VRA computing device enables investment in vehicles and/or vehicle fleets registered with the vehicle routing system. The VRA computing device enables investors to contribute or wholly invest in the purchase and/or management of vehicles and/or vehicle fleets. The VRA computing device manages payment to investor parties in accordance with their relative investment. For example, an investor invests $X and receives a Y % return. Investors may additionally, in some embodiments, receive credits for fees and/or task values. Additionally or alternatively, the VRA computing devices enables investors to invest in vehicles and/or vehicle fleets by pre-paying for delivery services by vehicles and/or vehicle fleets registered with the vehicle routing system.

In the exemplary embodiment, the VRA computing device also provides management facilitation services to users thereof (both task sources and vehicle users). Specifically, the VRA computing device maintains a management hub software application or "app" that enables vehicle users and task sources to track various metrics, adjust user settings, and access a plurality of services associated with the vehicle routing system. The management hub app may be executed on user computing devices and/or in-vehicle computing devices, as described further herein.

In one embodiment, the management hub app enables a vehicle user to view metrics for the vehicle(s) associated with the vehicle user. For example, for each vehicle and/or for an entire vehicle fleet (or a subset thereof), the management hub app displays optimal routes, performance/service status, vehicle usage, location, revenue generated, risk ratings, business reports, and/or recommendations (e.g., to improve revenue, improve performance, reduce risk, reduce costs, etc.). Such information may be "snapshots" of real-time metrics and/or reports that display and/or describe the metrics over a period of time.

The management hub app may further enable the vehicle user to adjust one or more settings, such as user preferences associated with one or more vehicles, and/or other data elements of the vehicle definitions. The vehicle user may additionally or alternatively add or delete vehicles from an account, may add or delete other vehicle users (e.g., may add "manager" users that monitor the vehicle metrics), may modify payment account information associated with one or more vehicles, and adjust other settings and/or preferences.

Likewise, the management hub app may enable task sources to view metrics associated with their registered tasks, such as tasks in progress, a relative/average priority of their tasks, a percentage of tasks completed, an average risk rating (or other score/rating) associated with their tasks, and the like. The task sources may add or delete tasks, modify payment account information associated with one or more user accounts, add or modify subscription/priority settings, and adjust other settings and/or preferences. The management hub app may further enable users thereof to view service vendors and/or other partners of the vehicle routing system (e.g., preferred dealerships, detailers, mechanics, etc.), and may enable vehicle users to prioritize service vendors and/or request particular services for their vehicles (e.g., detailing).

The management hub app may further include various financial capabilities. For example, the management hub app may enable users to view cost-revenue comparisons for one or more vehicles, review recommendations to generate additional revenue, review service costs, review incoming and/or outgoing task-value payment(s), invest in vehicles and/or vehicle fleets, view investment results, pre-pay for tasks or purchase subscriptions to the vehicle routing system, and the like. In some embodiments, the management hub app enables corporate or business manager vehicle users to review metrics associated with employees that drive their registered vehicle and may modify or distribute payments and/or payments through the management hub app. The management hub app may include insurance functionality, such that users may view current insurance policies, modify (e.g., upgrade or enhance) current insurance policies, purchase one-time or on-demand insurance policies for certain tasks, submit claims, and the like.

The management hub app may include various other functionalities, for example: (i) enabling users to view and/or manage legal or financial disputes, (ii) enabling users (e.g., small business users) to purchase advertising or marketing services, and/or (iii) review public and/or private ratings of vehicles, task sources, and/or vehicle users.

The VRA computing device may include one or more databases to store any data, such as vehicle definitions, task definitions, sensor data, optimal routes, check-in/check-out ledgers, and/or any other data described herein (e.g., user data, insurance data, digital communication data, financial data, usage data, etc.). The databases may be any suitable database, including cloud storage databases, which enable secure storage of such data as well as secure data access by one or more computing devices.

The methods and system described herein may be implemented using computer programming or engineering techniques including computer software, firmware, hardware, or any combination or subset. As disclosed above, at least one technical problem with current systems for requesting deliveries and completing tasks rely on the users to choose their tasks and frequently restrict concurrent tasks. Specifically, these current systems do not have automatic task selection and/or routing capabilities. Accordingly, vehicles may be used inefficiently, vehicle users may be deprived of additional revenue, and/or tasks may not be completed timely. Moreover, current systems are not able to access and/or leverage data from the vehicles in suggesting or distributing tasks, nor in making recommendations to vehicle users. The system and methods described herein address these technical problems.

The technical effect of the systems and processes described herein may be achieved by performing at least one of the following steps: (a) retrieving a vehicle definition for the vehicle, the vehicle definition including availability parameters and delivery preferences associated with the vehicle; (b) retrieving, based in part on the vehicle definition, a plurality of task definitions defining a respective plurality of tasks, each task including a respective cargo to be delivered, pick-up time, delivery time, pick-up location, delivery location, and task value; (c) generating, by executing at least one of artificial intelligence and deep learning functionality using the vehicle definition and the plurality of task definitions, an optimal route for the vehicle that includes a scheduled list of a subset of the plurality of tasks for the vehicle to perform, wherein the optimal route maximizes the potential revenue for operation of the vehicle within a period of time associated with the optimal route; (d) transmitting the optimal route to the vehicle for operation of the vehicle according to the optimal route; (e) receiving, from a first vehicle, sensor data during operation of the first vehicle according to the optimal route; (f) processing the received sensor data to generate vehicle analytics associated with a performance of the vehicle; (g) generating one or more visual representations of the vehicle analytics; and/or (h) transmitting the one or more visual representations of the vehicle analytics to a computing device of the vehicle user for display within a user interface of a management hub application executed on the user computing device The resulting technical effect is that tasks may be optimally distributed between available vehicle, and vehicles may be used more efficiently by completing an optimal number of tasks in an optimal order that maximizes revenue generation for vehicle users. A solution to the above-described problems provided by the vehicle routing system is the development of optimal routing strategies based upon the characteristics of tasks and available vehicles. The vehicle routing system may employ artificial intelligence and/or deep learning functionality to generate optimal routes, which increases the flexibility of the system to respond to changes in tasks, environment, risk, and/or other factors to generate the optimal routes. In particular, the vehicle routing system is well suited to incorporating sensor data received from registered vehicles (e.g., vehicle analytics) into various rules or algorithms of the artificial intelligence and/or deep learning functionality. The vehicle routing system also provides a management hub application ("app") that enables vehicle users to view and manage optimal routes and vehicle analytics, and to manage various other elements of their relationship with the vehicle routing system.

Exemplary Vehicle

FIG. 1 depicts a view of an exemplary vehicle 100. In the exemplary embodiment, vehicle 100 is an autonomous or semi-autonomous vehicle capable of fulfilling the transportation and delivery capabilities as described in further detail herein. In these embodiments, vehicle 100 may be capable of sensing its environment and navigating without human input. In other embodiments, vehicle 100 is a manual vehicle, such as a traditional automobile that is controlled by a driver (not shown).

Vehicle 100 may include any kind of vehicle, such as, for example, cars, trucks, all-terrain vehicles (ATVs), motorcycles, bicycles, recreational vehicles (RVs), snowmobiles, boats, industrial vehicles (e.g., construction vehicles), "riding" lawnmowers, smart farming equipment, ships, planes, helicopters, and so forth. Generally, vehicles 100 will be described herein using cars/trucks (e.g., personal vehicles) as examples. However, these examples should not be construed to limit the disclosure in any way, as the scope of the present disclosure may be applicable to any kind of autonomous vehicle, including those listed hereinabove.

Vehicle 100 may be capable of sensing aspects of its environment and, in some cases, assisting in or performing control aspects associated with piloting vehicle 100 (e.g., via automation systems 104, with or without human input). Vehicle 100 may include a plurality of sensors 106. The plurality of sensors 106 may detect the current surroundings and location of vehicle 100. Plurality of sensors 106 may include, but are not limited to, radar, LIDAR, GPS receivers, video devices, imaging devices, cameras, audio recorders, and computer vision.

Plurality of sensors 106 may also include sensors that detect conditions of vehicle 100, such as speed, acceleration, gear, braking, and other conditions related to the operation of vehicle 100, for example: at least one of a measurement of at least one of speed, direction, rate of acceleration, rate of deceleration, location, position, orientation, and rotation of the vehicle, and a measurement of one or more changes to at least one of speed, direction, rate of acceleration, rate of deceleration, location, position, orientation, and rotation of the vehicle. Furthermore, plurality of sensors 106 may include impact sensors that detect impacts to vehicle 100, including force and direction, and sensors that detect actions of vehicle 100, such the deployment of airbags.

In some embodiments, plurality of sensors 106 may detect the presence of cargo 108 in vehicle 100. In some embodiments, cargo 108 includes persons, such as one or more passengers (not specifically shown) in vehicle 100. In these embodiments, plurality of sensors 106 may detect the presence of fastened seatbelts, the weight in each seat in vehicle 100, heat signatures, or any other method of detecting information about the passengers in vehicle 100. In some embodiments, cargo 108 includes items, such as packages or other objects, which may be located in a cabin of vehicle 100 and/or in a trunk of vehicle 100. In these embodiments, plurality of sensors 106 may include scanners (e.g., RFID scanners, optical scanners, tag readers), weight sensors, cameras, and/or other suitable sensor that may detect the presence and/or position of cargo 108, introduction of cargo 108 into/onto vehicle 100, and/or removal of cargo 108 from vehicle 100 (e.g., check-in and/or check-out of cargo 108).

In these embodiments, vehicle 100 includes an in-vehicle computing device 102 configured to manage aspects of autonomous vehicle operation provided by a plurality of automation systems 104, each of which represent an electronic control system onboard vehicle 100 that may be involved in some aspect of piloting vehicle 100. As described further herein, in-vehicle computing device 102 may be configured to operate vehicle 100 according to routing instructions from a centralized vehicle routing and analytics (VRA) computing device 130.

Automation systems 104 may interpret the sensory information from sensors 106 while performing various operations. Automation systems 104 may include, for example, (a) fully autonomous (e.g., driverless) driving; (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; (s) automatic or semi-automatic driving without occupants; and/or other functionality. While not all sensor types for each particular automation system 104 are listed here, it should be understood that sensors 106 include any sensors sufficient to allow the associated automation system 104 to operate for its intended purpose. As such, each particular automation system 104 may utilize some data from sensors 106 to perform its underlying function.

In some embodiments, vehicle 100 may include a user interface (not shown) such that vehicle users of vehicle 100 may access certain features of vehicle 100 (e.g., receive alerts from automation systems 104 or in-vehicle computing device 102, review or adjust routing instructions from VRA computing device 130, etc.). The user interface may, in some embodiments, be integral to in-vehicle computing device 102. In-vehicle computing device 102 may be configured to collect sensor data from sensors 106. In some embodiments, in-vehicle computing device 102 may process, store, and/or transmit sensor data, including as described herein.

In-vehicle computing device 102 may be any computing device capable of performing the functions described herein. In-vehicle computing device 102 may be integral to vehicle 100 (e.g., a console computing device) and/or may be coupled to vehicle 100 (e.g., an after-market or retro-fit computing device). Moreover, it is contemplated that in some embodiments, in-vehicle computing device 102 may additionally or alternatively include a user computing device (not shown in FIG. 1) communicatively coupled or "paired" with vehicle 100 (e.g., via a Bluetooth® connection). In-vehicle computing device 102 may collect, compile, format, and/or otherwise process sensor data for transmission to VRA computing device 130. Additionally or alternatively, in-vehicle computing device 102 may facilitate tracking and monitoring check-in and check-out of cargo 108 to and from vehicle 100, such as by facilitating operation of one or more scanners, biometric sensors, and the like. In-vehicle computing device 102 may control operation of automation systems 104 for operation of vehicle 100, for example, based upon an optimal route from VRA computing device 130, one or more control signals form VRA computing device 130, and/or additional or alternative instructions. In-vehicle computing device 102 may store or cache sensor data from sensors 106, or compressed/condensed/abbreviated versions thereof, such that in-vehicle computing device 102 may maintain a check-in/check-out ledger and/or any other suitable sensor data records that track operation of vehicle 100.

Vehicle 100 may include multiple communication devices 112 for connecting to multiple different types of networks. Communication devices 112 may include, for example, a wired or wireless network adapter and/or a wireless data transceiver for use with a mobile telecommunications network. Communication devices 112 may be configured to communicate using many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, a cable modem, a Wi-Fi connection, and a Bluetooth® connection.

Vehicle 100 includes an onboard communications network ("onboard network") 110 that communicatively couples various electronics and computing devices on vehicle. In the exemplary embodiment, onboard network 110 communicatively couples in-vehicle computing device 102, sensors 106, automation systems 104, and communications device(s) 112. In some embodiments, vehicle 100 may be able to communicate with one or more remote computer devices, such as a VRA computing device 130, via one or more wireless networks 114, using a communication device 112 (e.g., wireless network adapter). Network 114 may include, for example, a cellular network, a satellite network, and a wireless vehicular ad-hoc network. In this example, network 114 is a cellular network, perhaps also connected to the Internet (not separately shown in FIG. 1), that allows vehicle 100 to communicate with VRA computing device 130.

In some embodiments, VRA computing device 130 may include, or otherwise be connected to, a one or more database(s) 132. Database 132 may include such information as, for example, vehicle definitions, task definitions, sensor data, vehicle usage data, reports, optimal routes, and the like. In some embodiments, database 132 may be accessed by one or more components of vehicle 100, such as, for example, in-vehicle computing device 102 or automation systems 104.

Figure 2:
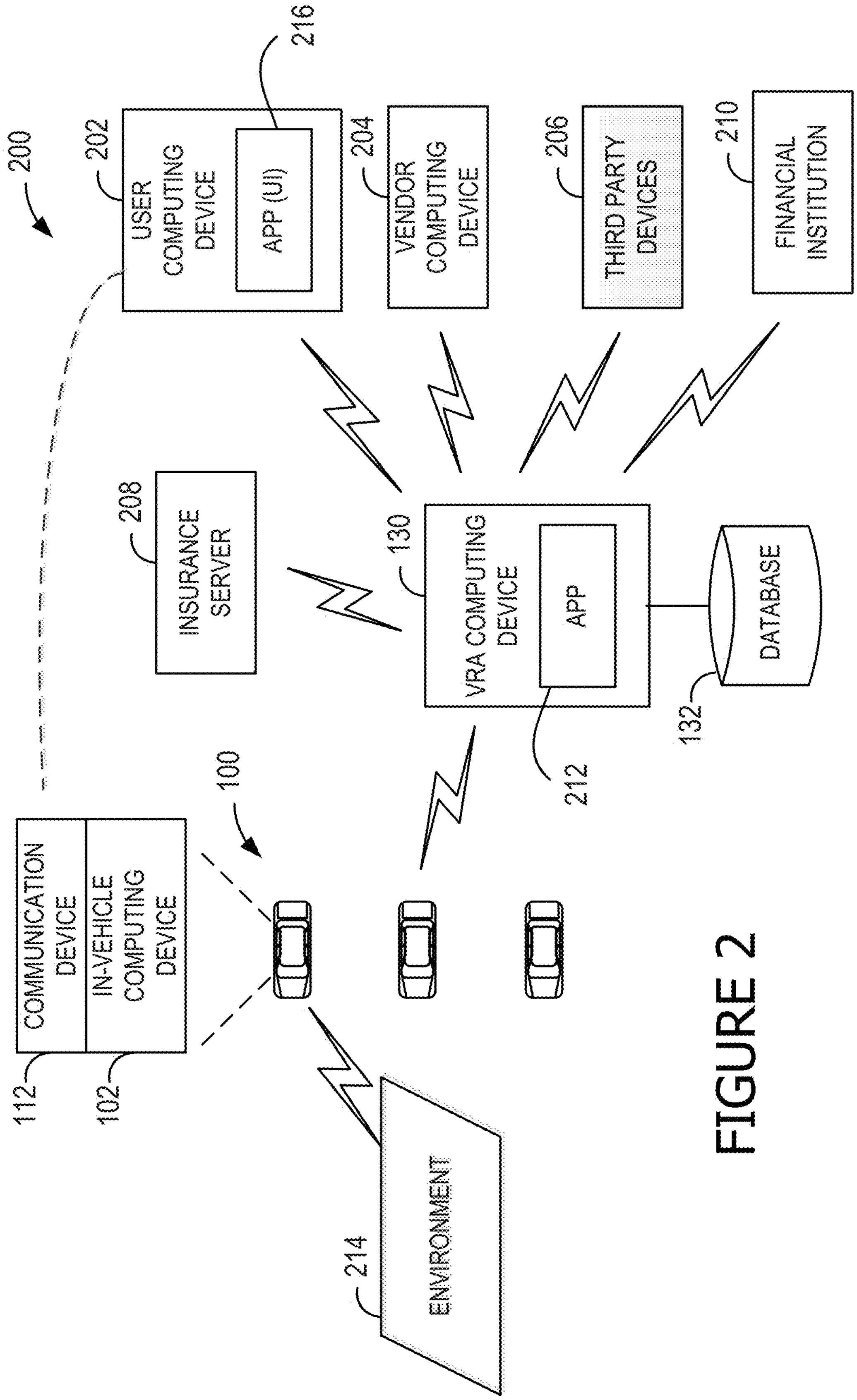
FIG. 2 illustrates a schematic diagram of an exemplary vehicle routing system.

Exemplary Vehicle Routing System for Intelligently Routing Vehicles to Complete Tasks and Maximize Revenue FIG. 2 depicts a schematic diagram of an exemplary vehicle routing system 200. Vehicle routing system 200 is configured to intelligently route vehicles 100 to complete delivery tasks and maximize delivery revenue. In one exemplary embodiment, vehicle routing system 200 may include and/or facilitate communication between one or more vehicles 100 (e.g., via in-vehicle computing devices 102 and communication devices 112) and VRA computing device 130, and/or between VRA computing device 130 and one or more of user computing devices 202, vendor computing device 204, third party device 206, insurance servers 208, and/or financial institutions 210.

VRA computing device 130 may be implemented as a server computing device with artificial intelligence and deep learning functionality. Alternatively, VRA computing device 130 may be implemented as any device capable of interconnecting to the Internet, including mobile computing device or "mobile device," such as a smartphone, a "phablet," or other web-connectable equipment or mobile devices. VRA computing device 130 may be in communication with vehicles 100, one or more user computing device 202, vendor computing devices 204, third party devices 206, insurance servers 208, and/or financial institutions 210, such as via wireless communication or data transmission over one or more radio frequency links or wireless communication channels. In the exemplary embodiment, components of vehicle routing system 200 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular telecommunications connection, and a cable modem.

Vehicle routing system 200 includes one or more database(s) 132 containing information on a variety of matters. For example, database 132 may include such information as vehicle definitions, task definitions, vehicle sensor data, vehicle usage reports, check-in/check-out ledgers, generated optimal routes, generated recommendations and/or reports, ambient/environmental data, insurance data (e.g., policies associated with vehicles 100), user data (e.g., associated with vehicle users and/or task sources), and/or any other information used, received, and/or generated by vehicle routing system 200 and/or any component thereof, including such information as described herein. In one exemplary embodiment, database 132 may include a cloud storage device, such that information stored thereon may be accessed by one or more components of vehicle routing system 200, such as, for example, VRA computing device 130, in-vehicle computing devices 102, and/or user computing devices 202. In one embodiment, database 132 may be stored on VRA computing device 130. In any alternative embodiment, database 132 may be stored remotely from VRA computing device 130 and may be non-centralized.

Vehicle routing system 200 includes a plurality of vehicles 100 registered therewith. Although only three vehicles 100 are shown in FIG. 2, it should be readily understood that any number of vehicles 100 may be registered with vehicle routing system 200 to receive optimal routes from VRA computing device 130. As described above, each vehicle 100 may include any kind of vehicle, such as, for example, cars, trucks, all-terrain vehicles (ATVs), motorcycles, autonomous vehicles, semi-autonomous vehicles, recreational vehicles (RVs), snowmobiles, boats, industrial vehicles (e.g., construction vehicles), "riding" lawnmowers, flying cars, robo-taxis, and/or any kind of vehicle. Generally, vehicles 100 will be described herein using cars/trucks (e.g., personal vehicles) as examples. However, these examples should not be construed to limit the disclosure in any way, as the scope of the present disclosure may be applicable to any kind of vehicle, including those listed hereinabove.

In the exemplary embodiment, vehicle 100 includes communication device 112 such that vehicle 100 may communicate with VRA computing device 130, for example, via the Internet. Vehicle 100 may additionally communicate with other components of vehicle routing system 200, such as database 132, user computing device(s) 202, insurance server 208, etc. As described herein, vehicles 100 are configured to operate in accordance with optimal routes generated by VRA computing device 130 in order to maximize revenue associated with completing delivery tasks. Vehicles 100 may be further configured to capture and/or generate sensor data associated with operation of vehicles 100, including sensor data associated with cargo 108 (shown in FIG. 1), performance of vehicle 100, and associated with an environment 214 about vehicle 100. Environment 214 may include weather, infrastructure, obstacles, other vehicles, persons, and/or any other object or occurrence. VRA computing device 130 may receive any data from vehicles 100 (e.g., via in-vehicle computing device 102 and communication device 112), such as sensor data. VRA computing device 130 may transmit any data to vehicle 100, including optimal routes, control instructions, modified routes and/or control instructions, and the like.

In the exemplary embodiment, user computing devices 202 may be computers that include a web browser or a software application to enable user computing devices 202 to access the functionality of VRA computing device 130 using the Internet or a direct connection, such as a cellular network connection. User computing devices 202 may be any device capable of accessing the Internet including, but not limited to, a desktop computer, a mobile device (e.g., a laptop computer, a personal digital assistant (PDA), a cellular phone, a smartphone, a tablet, a phablet, netbook, notebook, smart watches or bracelets, smart glasses, wearable electronics, pagers, etc.), or other web-based connectable equipment. User computing device 202 may be associated with vehicle users having vehicle registered with vehicle routing system 200, task sources (e.g., individual users that register tasks with vehicle routing system 200 and/or users with user accounts associated with corporate or business entities that register tasks with vehicle routing system 200), and/or investors. User computing devices 202 may be used to access a management hub app 212 maintained by VRA computing device 130, for example, via a user interface 216 when management hub app 212 is executed on user computing device 202.

In the exemplary embodiment, VRA computing device 130 may be associated with vehicle routing and vehicle analytics services provided by vehicle routing system 200. Users, including vehicle users, tasks sources, investors, and the like, may register or sign up with vehicle routing system 200 (e.g., using user computing devices 202) to access the vehicle routing and vehicle analytics functionality of VRA computing device 130. VRA computing device 130 may receive any data from users (e.g., via user computing devices 202), such as vehicle definitions, task definitions, insurance data, investment data, financial data, and the like. VRA computing device 130 may transmit any data to users (e.g., via management hub app 212 executed on user computing devices 202), such as recommendations, reports, vehicle analytics, investment results, payment data, and the like. In some embodiments, user computing devices 202 may be configured to transmit data to and/or receive data from vehicles 100. For example, a user computing device 202 of a vehicle user having a vehicle 100 may transmit control instructions to vehicle 100 directing the vehicle 100 to travel to a particular location or to follow control instructions from VRA computing device 130.

Vendor computing devices 204 may be computing devices associated with vendors that have a relationship with vehicle routing system 200, such as providing one or more services to vehicle routing system 200 (e.g., vehicle maintenance/repairs, detailing, towing/recovery, and the like). Such vendors may be referred to as "partner vendors" and/or "preferred vendors." VRA computing device 130 may communicate with vendor computing device 204, for example, to schedule services for one or more vehicles 100, to receive fee schedules from the vendor, to transmit or receive feedback to/from vendor computing device 204, and/or to transmit and/or receive any other information. Vendor computing device 204 may be any device capable of interconnecting to the Internet, including a server computing device, a mobile computing device or "mobile device," such as a smartphone, or other web-connectable equipment or mobile devices.

Third party devices 206 may be computing devices associated with external sources of data, such as sources of ambient data, event data, internet content, social media data, and the like. VRA computing device 130 may request, receive, and/or otherwise access data from third party devices 206. Third party devices 206 may be any devices capable of interconnecting to the Internet, including a server computing device, a mobile computing device or "mobile device," such as a smartphone, or other web-connectable equipment or mobile devices.

Insurance server 208 may be associated with and/or maintained by an insurance provider, which provides insurance policies associated with vehicles 100, cargo 108 (shown in FIG. 1), tasks, vehicle users, and the like. Insurance server 208 may communicate with VRA computing device 130, user computing device(s) 202, and/or database 132 in order to transmit and/or receive information associated with the insurance policies.

For example, insurance server 208 may transmit insurance policies to VRA computing device 130, and/or may receive requested modification to insurance policies and/or purchases of supplemental, one-time insurance policies from VRA computing device 130 and/or user computing devices 202. As another example, insurance server 208 may receive vehicle sensor data, usage data, and/or risk profiles from VRA computing device 130 and/or database 132 and may update or recommend updates to an insurance policy associated with a vehicle 100 based thereon.

Financial institution 210 may include any financial institution associated with any component of vehicle routing system 200, one or more vehicle users, one or more task sources, and/or one or more investors in one or more vehicles 100. For example, financial institution 210 may include a bank, at which one or more payment account(s) is maintained, that payment account(s) associated with any component of vehicle routing system 200, one or more vehicle users, one or more task sources, and/or one or more investors in one or more vehicles 100. VRA computing device 130 may be in communication with any number of financial institutions 210, and may transmit funding requests thereto to pay vehicle users for completed tasks.

Exemplary Vehicle Routing and Analytics Computing Device

Figure 3:
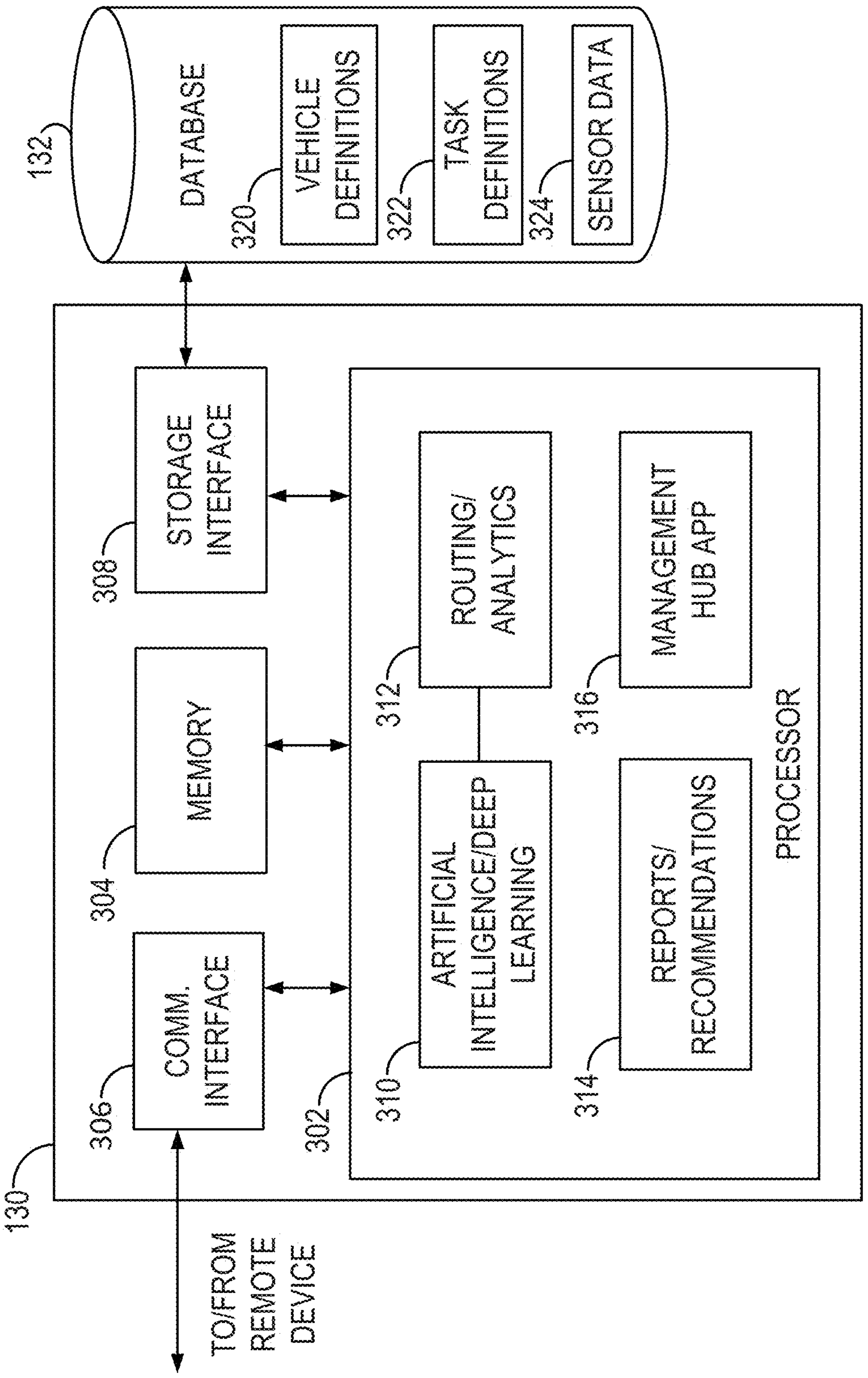
FIG. 3 illustrates a schematic diagram of an exemplary vehicle routing and analytics (VRA) computing device that may be used in the vehicle routing system shown in FIG. 2.

FIG. 3 depicts a schematic diagram of an exemplary VRA computing device 130 (as shown in FIGS. 1 and 2). In one exemplary embodiment, VRA computing device 130 may include a processor 302, a memory 304 (which may be similar to database 132, also shown in FIGS. 1 and 2), a communication interface 306, and a storage interface 308. Processor 302 is configured to execute instructions, which may be stored in memory 304. Processor 302 includes one or more processing units (e.g., in a multi-core configuration) and may be configured to execute a plurality of modules.

In the exemplary embodiment, processor 302 is operable to execute an artificial intelligence/deep learning (AI/DL) module 310, a routing/analytics module 312, a reports/recommendations module 314, and a module 316 that maintains functionality for management hub app 212 (shown in FIG. 2). Modules 310, 312, 314, and 316 may include specialized instruction sets, and/or coprocessors. Database 132 and/or memory 304 may store any data and/or instructions necessary for modules 310, 312, 314, and 316 to function as described herein. In the exemplary embodiment, database 132 stores vehicle definitions 320, task definitions 322, and sensor data 324.

AI/DL module 310 may execute artificial intelligence and/or deep learning functionality on behalf of routing/analytics module 312. Specifically, AI/DL module 310 may include any rules (e.g., route optimization rules), algorithms, training data sets/programs, and/or any other suitable data and/or executable instructions that enable VRA computing device 310 to employ artificial intelligence and/or deep learning to generate optimal routes, generate vehicle analytics, incorporate vehicle analytics to modify rules and/or algorithms, and the like.

Routing/analytics module 312 may create efficient routing strategies for one or more vehicles (e.g., vehicles 100, shown in FIGS. 1 and 2). For example, routing/analytics module 312 may access and process vehicle definitions 320, task definitions 322, and/or sensor data 324 from database 132 to generate optimal routes for one or more vehicles. Routing/analytics module 312 may develop routing strategies that maximize revenue on a per-vehicle and/or per-vehicle-fleet basis, and/or that optimize use of a vehicle and/or a vehicle fleet. In some embodiments, routing/analytics module 312 may develop routing strategies for a most optimal class or capacity of vehicle available for a task, closest vehicle, best availability (e.g., local, regional, domestic, any, etc.), and/or greatest revenue opportunity. Additionally or alternatively, routing/analytics module 312 may generate optimal routes based upon the availability of a plurality of vehicles.

In generating optimal routes, routing/analytics module 312 may identify locations and/or classes of cargo for vehicles to service, such as locations with less competition and/or underserved locations (e.g., locations with a lowest number of completed tasks). Routing/analytics module 312 may automatically route vehicles to such underserved locations, by generating and/or modifying optimal routes and/or by transmitting control instructions to the vehicles. Routing/analytics module 312 may also be configured to leverage event data (not shown)—such as data gathered from publicly available social media, crawled from the internet, and/or captured from calendars of vehicle users registered with vehicle routing system 200—to generate, enhance, modify, and/or update routing strategies. For example, routing/analytics module 312 may identify a local event (e.g., a concert or sporting event) taking place at an event location at a first time and/or within a first time period (e.g., from a start time to and end time). Routing/analytics module 312 may route vehicles to the event location at the start and/or end date, by generating and/or modifying optimal routes and/or by transmitting control instructions to the vehicles.

Routing/analytics module 312 may be further configured to employ AI/DL module 310 to identify patterns and/or trends, for example, in sensor data 324 and/or in historical data that may also be stored in database as part of sensor data 324 and/or separately therefrom (e.g., historical routes travelled, historical tasks completed, etc.). In the exemplary embodiment AI/DL module 310 may identify timing trends and/or patterns; trends and/or patterns in classes of cargo, types of tasks, and/or locations; and/or any other trends and/or patterns. Routing/analytics module 312 may develop routing strategies that strategically and pre-emptively direct vehicles to various locations to accommodate these trends and/or patterns. Routing/analytics module 312 may also develop routing strategies that respond to identified lull times, by scheduling services and/or social good tasks during lull times.

Routing/analytics module 312 may generate optimal routes based upon cost-benefit analyses for each task, accounting for a task value of each task as well as costs associated with completing the task. Routing/analytics module 312 may further generate optimal routes based upon user preferences or settings (e.g., stored as part of vehicle definitions 320 and/or task definitions 322).

Routing/analytics module 312 may also generate vehicle analytics based upon sensor data 324 (which includes data characterizing operation of the vehicle according to an optimal route, completion of tasks, etc.). Vehicle analytics may include, for example, risk profiles of vehicles (and/or the routes travelled by vehicles and/or cargo delivered therein), check-in/check-out ledgers, cargo placement optimization, performance issues, service needs, and the like.

Report/recommendation module 314 may be configured to generate and transmit recommendations and/or reports to users, such as vehicle users, task sources, and/or investors. In some embodiments, report/recommendation module 314 provides recommendations such as: (i) recommendations to vehicle users to expand or modify the availability radius of their associated vehicles, such that the vehicles may operate in underserved locations; (ii) recommendations to vehicle users to modify restrictive delivery preferences to generate additional revenue; and/or (iii) other types of recommendations, including those discussed elsewhere herein.

Report/recommendation module 314 may provide reports for various entities, such as local governments, businesses, consumers, and/or residents. For example, the reports may include processed and parsed sensor data to highlight infrastructure issues, changes, technology and construction progress and upgrades, work needing to be performed or maintained, crime, business and residential consumer risks and liabilities. The reports may further include recommendations, solutions, strategies, and/or services to reduce the risks, liabilities, and costs identified in the reports, reduce insurance costs, and/or to improve property values and revenue potential.

In the exemplary embodiment, report/recommendation module 314 provides generated reports and/or recommendations through management hub app 212. Accordingly, report/recommendation module 314 may employ module 316 to provide the recommendations and/or reports to user computing devices 202 through management hub app 212.

Module 316 is configured to facilitate maintaining management hub app 212 and providing the functionality thereof to users. Module 316 may store instructions that enable the download and/or execution of management hub app 212 at the user computing devices. Module 316 may store instructions regarding user interfaces, controls, commands, settings, and the like, and may format data, such as reports, recommendations, analytics, and the like, into a format suitable for transmitting to user computing devices for display thereat.

In the exemplary embodiment, processor 302 is operatively coupled to communication interface 306 such that VRA computing device 130 is capable of communicating with remote device(s) such as vehicles 100, one or more user computing device 202, vendor computing devices 204, third party devices 206, insurance servers 208, and/or financial institutions 210 (all shown in FIG. 2) over a wired or wireless connection. For example, communication interface 306 may receive vehicle definitions 320 and/or task definitions 322 form user computing devices 202 and/or may receive sensor data 324 from vehicles 100. Communication interface 306 may include, for example, a wired or wireless network adapter and/or a wireless data transceiver for use with a mobile telecommunications network.

Processor 306 may also be operatively coupled to database 132 (and/or any other storage device) via storage interface 308. Database 132 may be any computer-operated hardware suitable for storing and/or retrieving data. In some embodiments, database 132 may be integrated in VRA computing device 130. For example, VRA computing device 132 may include one or more hard disk drives as database 132. In other embodiments, database 132 is external to VRA computing device 130 and is accessed by a plurality of computer devices. For example, database 132 may include a storage area network (SAN), a network attached storage (NAS) system, multiple storage units such as hard disks and/or solid state disks in a redundant array of inexpensive disks (RAID) configuration, cloud storage devices, and/or any other suitable storage device.

Storage interface 308 may be any component capable of providing processor 302 with access to database 132. Storage interface 308 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 302 with access to database 132.

Processor 302 may execute computer-executable instructions for implementing aspects of the disclosure. In some embodiments, processor 302 may be transformed into a special purpose microprocessor by executing computer-executable instructions or by otherwise being programmed. For example, processor 302 may be programmed with the instruction such as those illustrated in FIGS. 9, 10, and 11.

Memory 304 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Exemplary Optimal Routing

Figure 4A:
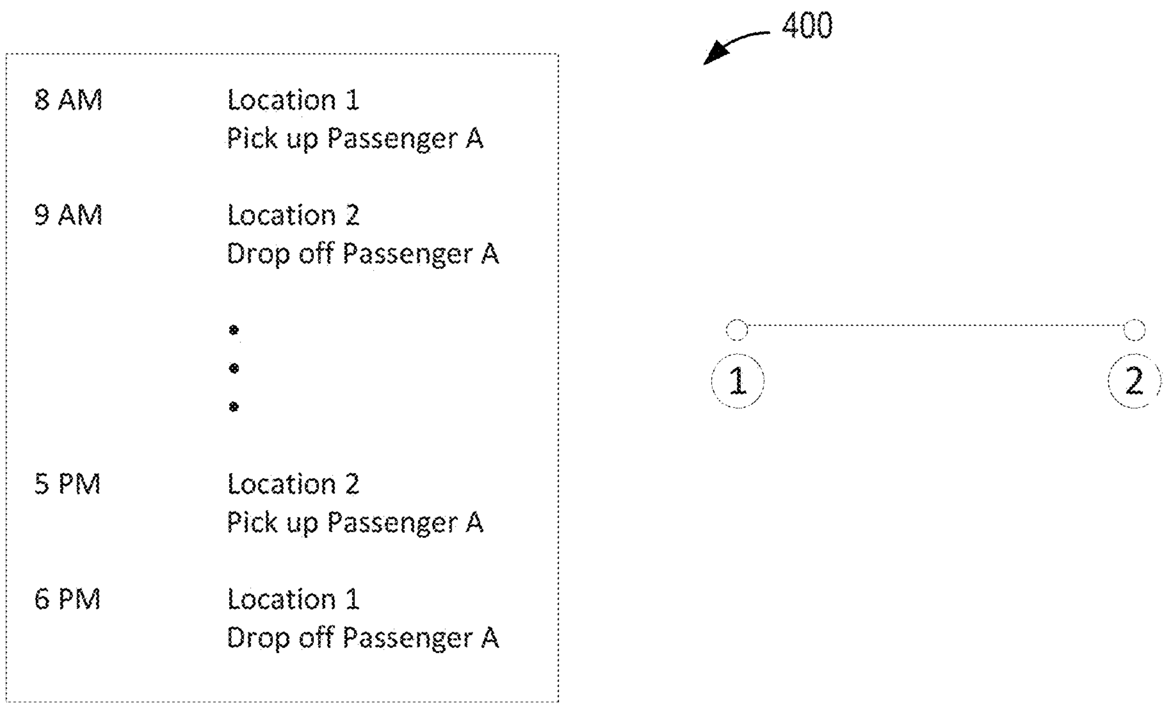
FIG. 4A illustrates a conventional delivery schedule.

FIGS. 4A and 4B illustrate exemplary vehicle routes 400 and 450, respectively. More specifically, FIG. 4A illustrates a first vehicle route 400 that may be generated using current delivery systems. First vehicle route 400 may be implemented using a vehicle (e.g., vehicle 100, shown in FIG. 1). In the illustrated embodiment, first vehicle route 400 includes two tasks, which may have been selected and scheduled by a vehicle user associated with the vehicle. For example, the vehicle may deliver cargo including a commuting person.

Specifically, the vehicle may pick up a passenger A at a location 1 at 8:00 AM, and may drop off passenger A at a location 2 at 9:00 AM, which represents a first task. The vehicle may pick up passenger A at location 2 at 5:00 PM and drop off passenger A at location 1 at 6:00 PM, which represents a second task. First vehicle route 400 does not take advantage of the time between 9:00 AM and 5:00 PM, in which the vehicle could be completing additional tasks. Moreover, first vehicle route 400 does not enable concurrent tasks, nor tasks associated with cargo including objects (e.g., package delivery).

Second vehicle route 450 is an example of an optimal route generated according to the present disclosure, and may be generated by VRA computing device 130 (shown in FIG. 1). In the illustrated embodiment, second vehicle route 450 (referred to hereinafter as "optimal route 450") includes at least six tasks (the schedule of tasks is abbreviated in FIG. 4B and may not show each pair of pick-up and delivery for each task) that may be completed throughout a day by the vehicle. Optimal route 450 (*i*) takes advantage of a full day's availability of the vehicle, (ii) enables concurrent tasks (e.g., simultaneously transporting passenger A and package B), and (iii) enables both person-based tasks and object-based tasks. Moreover, optimal route 450 may include all of these advantages over first vehicle route 400 while keeping the vehicle within substantially the same geographic radius as first vehicle route 400.

Where the vehicle is a manually driven vehicle, VRA computing device 130 may transmit optimal route 450 to a user computing device (e.g., user computing device 202, shown in FIG. 2) of a driver of the vehicle, such that the driver may operate the vehicle according to optimal route 450. Where the vehicle is an autonomous vehicle, VRA computing device 130 may transmit optimal route 450 within a control signal to the vehicle (e.g., to an in-vehicle computing device of the vehicle, such as in-vehicle computing device 102, shown in FIG. 1). The control signal may cause the vehicle to operate according to optimal route 450.

Figure 5:
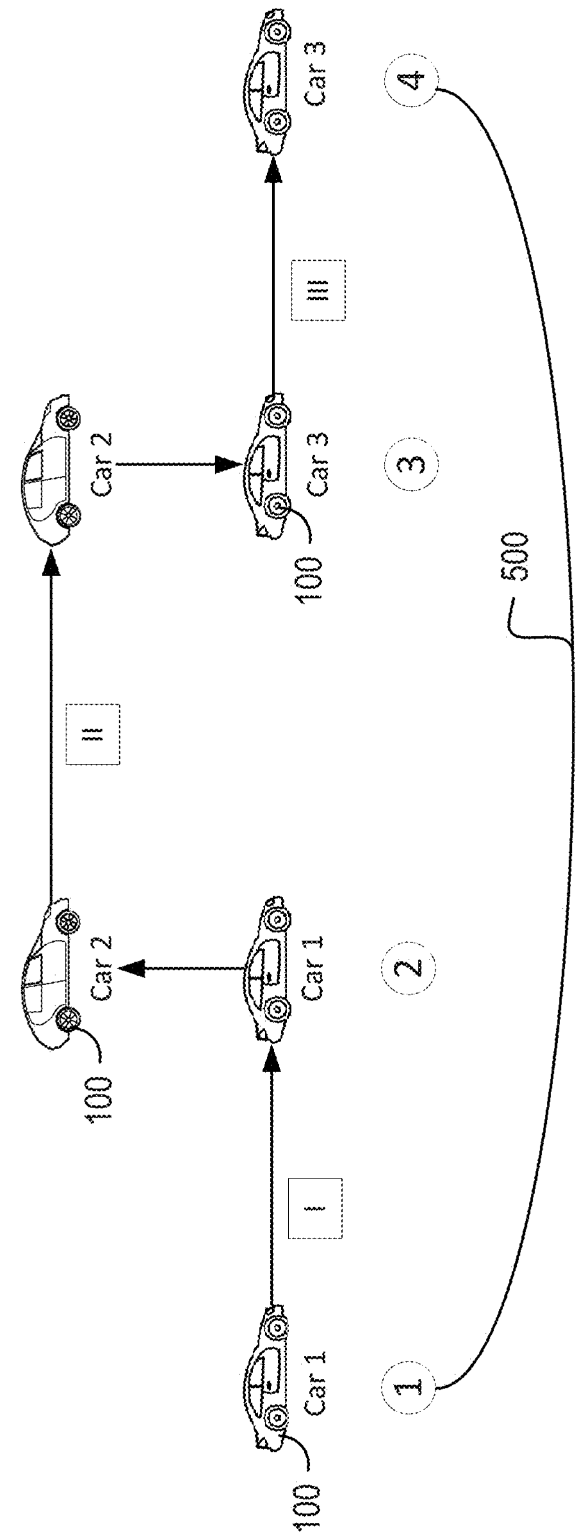
FIG. 5 illustrates an exemplary task that may be subject to route continuation and divided between optimal routes of vehicles shown in FIG. 1.

FIG. 5 illustrates an exemplary task 500 subject to route continuation. More specifically, task 500 has been divided into three portions (I, II, III), where each portion is scheduled in an optimal route generated for each of three vehicles 100 (Car 1, Car 2, and Car 3). In the illustrated embodiment, task 500 may be associated with cargo including an object and/or cargo including a person. In the first portion (I) of task 500, Car 1 picks up the cargo at a Location 1, an original pick-up location associated with task 500. Car 1 delivers the cargo to a Location 2, and completes the first portion (I) of task 500. The second portion (II) of task 500 is initiated by Car 2, which picks up the cargo at Location 2 and delivers the cargo to a Location 3. The second portion (II) of task 500 is completed. The third portion (III) of task 500 is initiated by Car 3, which picks up the cargo at Location 3 and delivers the cargo to a Location 4, an original delivery location associated with task 500. The third portion (III) of task is completed, and task 500 is completed.

Exemplary Management Hub App

Figure 6:
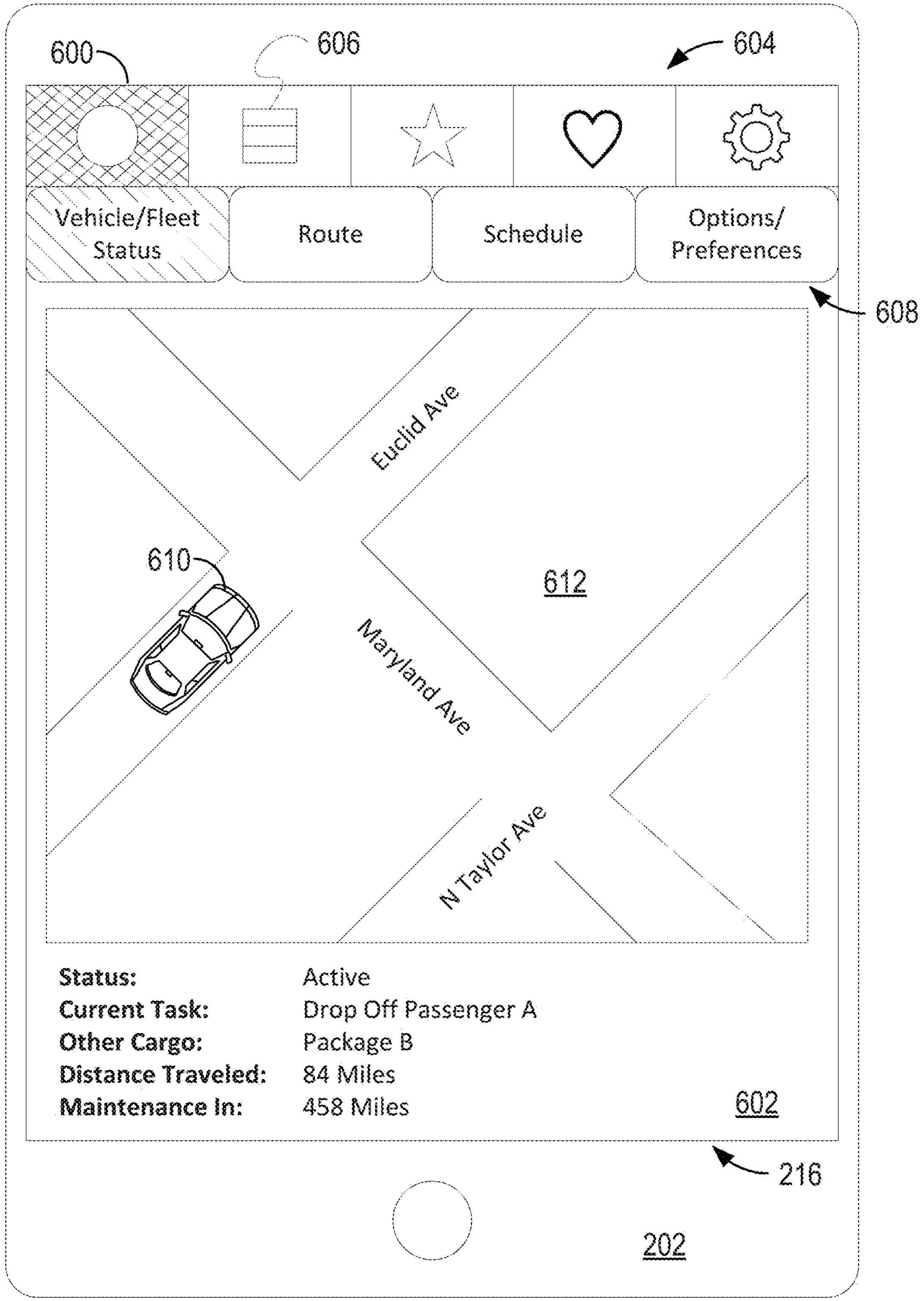
FIGS. 6 and 7 depict exemplary screen captures of a management hub software application ("app") maintained using the vehicle routing system shown in FIG. 2.
Figure 7:
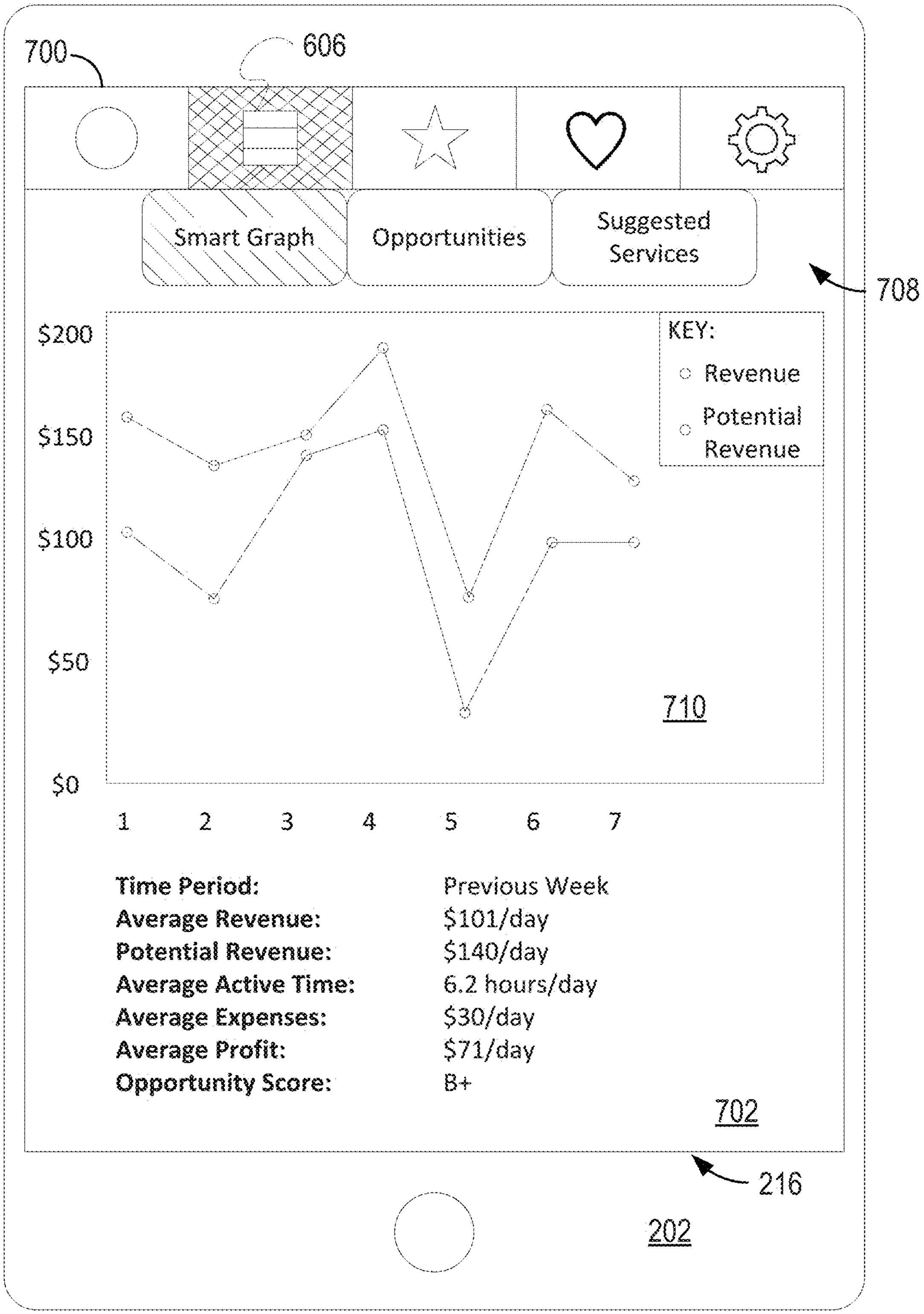

FIGS. 6 and 7 depict exemplary screen captures or "screenshots" of user interface 216 of management hub app 212 as executed on a user computing device 202 (all shown in FIG. 2). The example screenshots include various features and functionalities of management hub app 212. In particular, VRA computing device 130 causes to be displayed at least optimal vehicle routes and vehicle analytics at user computing device 202, specifically via management hub app 212.

More specifically, FIG. 6 depicts a screenshot 600 of a first page 602 accessed by a user within user interface 216 of management hub app 212. First page 604 may display a menu 604 of icons 606 that may be selected by the user to access different sections, pages, and/or functionality of management hub app 212. In the illustrated embodiment, menu 604 includes icons 606 associated with Operations (represented as a circle), Business Tools/Reports (represented as a lined box), E-Assistance (represented as a star), Definitions (represented as a heart), and Account Settings (represented as a gear). It should be readily understood that menu 604 may include additional, fewer, and/or alternative icons 606 that may represent additional, fewer, and/or alternative sections, pages, and/or functionality within management hub app 212.

In the illustrated embodiment, the user has selected the icon 606 associated with the Operations section to display first page 602. First page 602 further includes a plurality of tabs 608, each tab 608 associated with a different page within the Operations section of management hub app. Specifically, tabs 608 include a Status tab, a Route tab, a Schedule tab, and an Options/Preferences tab. It should be readily understood that Operations section may include additional, fewer, and/or alternative tabs 608 that may represent additional, fewer, and/or alternative pages therein. Likewise, when any other sections are selected by the user, tabs 608 may change in accordance with the various pages associated with each respective section.

The user has selected the Status tab to display first page 602. Accordingly, user interface 216 shows a current location of a vehicle operating according to an optimal route generated by VRA computing device 130 (shown in FIG. 1). The current location is displayed as an icon 610 of the vehicle on a map 612. Also shown are a status of the vehicle, illustrated as “Active” (e.g., operating according to an optimal route). Other statuses may include “Service” (e.g., having a maintenance/repair service performed thereon) and/or “Inactive” (e.g., not performing tasks). First page 602 also displays a current task, illustrated as “Drop Off Passenger A,” as well as other cargo, including “Package B”.

Accordingly, the user may easily identify what cargo is currently being transported by the vehicle, which may include any number of person(s) and/or object(s). The status may also include a distance travelled during operation of the current optimal route, a maintenance notification, a maintenance status indicator (e.g., Good, Non-Critical Repair Required, Immediate Repair Required, Offline/Disabled, etc.), and/or any other suitable information. Moreover, when a user has more than one vehicle associated therewith (e.g., multiple associated vehicles in one or more fleets, or multiple vehicle that operate independently), first page 602 may further include one or more controls that enable the user to view the status for each respective vehicle (e.g., by selecting from a drop-down list, scrolling via back and forward arrows, etc.) and/or all vehicles at once.

Although not illustrated, it is contemplated that the Route tab, when selected, may display the current optimal route as a list/schedule of tasks, included completed and/or upcoming tasks, their pick-up/delivery locations, pick-up/delivery times, anticipated cargo, and the like. It is contemplated that the Schedule tab may enable the user to schedule a task, such as requesting a ride or scheduling a package pick-up/delivery. The Options/Preferences tab may enable the user to modify various user-defined preferences for one or more vehicles, such as cargo preferences (e.g., person-only, object-only, persons and objects) and/or operation preferences, such as time(s) each vehicle is available, location preferences (e.g., do not travel more than X miles, restrict travel to a certain radius or within certain areas), battery/fuel preferences (e.g., operate until battery is at X % or has X estimated miles remaining), risk settings (e.g., only allow tasks having a risk level below a certain threshold, only allow optimal routes having an overall risk level below a certain threshold), priority settings (e.g., prioritize objects, prioritize persons, prioritize VIPs, etc.), and the like.

FIG. 7 depicts a screenshot 700 of a second page 702 accessed by a user within user interface 216 of management hub app 212. In the illustrated embodiment, the user has selected the icon 606 associated with the Business Tools/Reports section to display second page 702. Second page 702 further includes a plurality of tabs 708, each tab 708 associated with a different page within the Business Tools/Reports section of management hub app. Specifically, tabs 708 include a Smart Report tab, an Opportunities tab, and a Suggested Services tab. It should be readily understood that Business Tools/Reports section may include additional, fewer, and/or alternative tabs 708 that may represent additional, fewer, and/or alternative pages therein.

User interface 216 displays a graph or “smart chart” 710 of one or more vehicle analytics, such as revenue generated and/or potential revenue (in the illustrated embodiment), as well as text-based reports of other vehicle analytics. Other vehicle analytics may include, for example, time in operation (e.g., in hours or a percentage of a time period such as a day or week), lull time (e.g., the vehicle is disabled, being serviced, or otherwise not completing tasks/generating revenue), expenses/costs, profits (e.g., revenues less costs), number of completed tasks, mileage driven, number of “social good” tasks completed, risk level, performance ratings, and the like.

Any vehicle analytic can be displayed as an absolute value, an average/median, total value according to time period (e.g., “per day,” “per week,” etc.), and/or otherwise calculated and displayed, such as “revenue per hour of operation,” “profit per mile driven,” etc. In addition, one smart chart 710 may display one vehicle analytic or a plurality of vehicle analytics at once. Moreover, when a user has more than one vehicle associated therewith (e.g., multiple associated vehicles in one or more fleets, or multiple vehicle that operate independently), second page 702 may further include one or more controls that enable the user to view the vehicle analytics for each respective vehicle (e.g., by selecting from a drop-down list, scrolling via back and forward arrows, etc.) and/or all vehicles at once.

Although not illustrated, it is contemplated that, when the Opportunities tab is selected, user interface 16 may display one or more recommendations to improve revenue generation for a vehicle. Recommendations vary depending on the specifics of each vehicle’s operation, and may generally include increasing time/location availability, modifying time/location availability to accommodate task “surges” (e.g., commute periods, events, etc.), varying allowed risk levels, modifying cargo preferences, adding vehicles, and the like. Selecting the Suggested Service tab may cause display of a page that provides information on “partner vendors,” which may encourage the user to employ the services of those vendors.

Additionally or alternatively, the Suggested Services tab may identify particular services the user may want and/or need to schedule for the vehicle (or, in some cases, for the user’s business associated with the vehicle(s), such as marketing/advertising services), and may recommend one or more partner vendors associated with those services. In some embodiments, users may be able to employ and/or purchase those services directly through management hub app 212 (e.g., without requiring out-of-app contact with a vendor, such as via phone).

Although not illustrated, it is contemplated that, when the icon 606 associated with the E-Assistance section is selected, one or more associated page(s) may be displayed (e.g., with or without associated tab(s)). For example, user interface 216 may display an Accident/Incident/Recovery page selectable when a vehicle is undergoing service, has been in an accident, is disabled, or the like. Such a page may enable the user to request repair/maintenance services, review the current location of the vehicle and/or a current vendor servicing the vehicle, request emergency assistance, and the like. Additionally or alternatively, user interface 216 may display an Insurance page, where the user may review their insurance policies, request modification thereto, request or purchase one-time insurance policies, view recommendations, and the like.

It is contemplated that, when the icon 606 associated with the Definitions section is selected, one or more associated page(s) may be displayed (e.g., with or without associated tab(s)). For example, user interface 216 may display a Vehicle Definition page that enables the user to add, update, modify, and/or view one or more vehicle definitions. User interface 216 may display a Task Definition page that enables the user to add, update, modify, and/or view one or more task definitions.

It is contemplated that, when the icon 606 associated with the Definitions section is selected, one or more associated page(s) may be displayed (e.g., with or without associated tab(s)). For example, user interface 216 may display a Profile page, where the user may register or modify a user profile/account, such as an account type (e.g., individual user, small business user, investor, fleet manager, etc.), personal/contact information, financial account information for deposits and/or withdrawals, insurance policy information, privacy settings, and the like.

Exemplary User Computer Device

Figure 8:
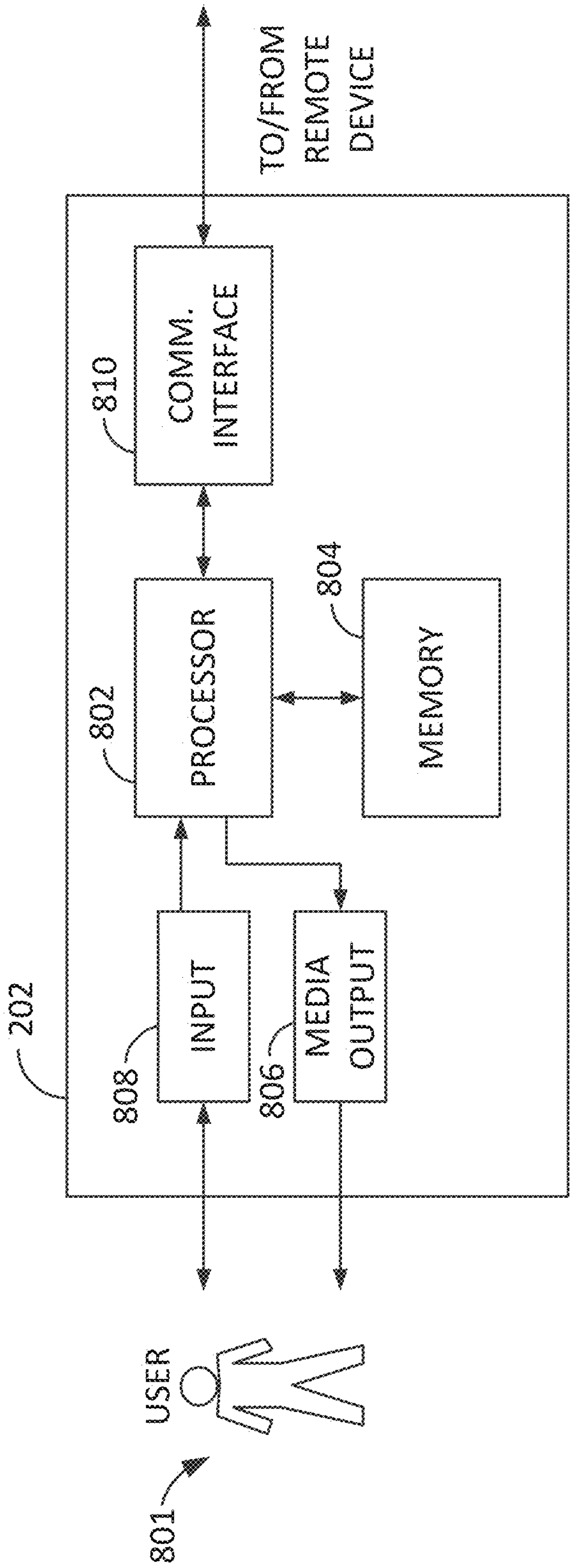
FIG. 8 illustrates a schematic diagram of an exemplary user computing device that may be used in the vehicle routing system shown in FIG. 2.

FIG. 8 depicts an exemplary configuration of an exemplary user computer device 202 that may be used with vehicle routing system 200 (shown in FIG. 2), in accordance with one embodiment of the present disclosure. User computer device 202 may be operated by a user 801 (e.g., a vehicle user, a task source, an investor, etc.).

User computer device 202 may include a processor 802 for executing instructions. In some embodiments, executable instructions may be stored in a memory area 804. Processor 802 may include one or more processing units (e.g., in a multi-core configuration). Memory area 804 may be any device allowing information such as executable instructions and/or transaction data to be stored and retrieved. Memory area 804 may include one or more computer-readable media. Memory area 804 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

User computer device 202 also may include at least one media output component 806 for presenting information to user 801, such as user interface 216 of management hub app 212 (both shown in FIG. 2) when management hub app 212 is executed on user computing device 202. Media output component 806 may be any component capable of conveying information to user 801. In some embodiments, media output component 806 may include an output adapter (not shown), such as a video adapter and/or an audio adapter. An output adapter may be operatively coupled to processor 802 and operatively couplable to an output device such as a display device (e.g., a liquid crystal display (LCD), light emitting diode (LED) display, organic light emitting diode (OLED) display, cathode ray tube (CRT) display, "electronic ink" display, or a projected display) or an audio output device (e.g., a speaker or headphones).

In some embodiments, user computer device 202 may include an input device 808 for receiving input from user 801. User 801 may use input device 808 to, without limitation, interact with vehicle 104 and/or VRA computing device 130 (both shown in FIG. 1), input vehicle definitions, input task definition, review vehicle analytics, and/or review payment information. Input device 808 may include, for example, a keyboard, a pointing device, a mouse, a stylus, and/or a touch sensitive panel (e.g., a touch pad or a touch screen). A single component such as a touch screen may function as both an output device of media output component 806 and input device 808.

User computer device 202 may also include a communication interface 810, communicatively coupled to a remote device such as VRA computing device and/or vehicle 100. Communication interface 810 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 804 may be, for example, computer-readable instructions for providing a user interface to user 801 via media output component 806 and, optionally, receiving and processing input from input device 808. The user interface may include, among other possibilities, a web browser and/or a client application. Web browsers enable users, such as user 801, to display and interact with media and other information typically embedded on a web page or a website from VRA computing device 130. A client application may allow user 801 to interact with, for example, VRA computing device 130. For example, instructions may be stored by a cloud service and the output of the execution of the instructions sent to the media output component 806.

Figure 9:
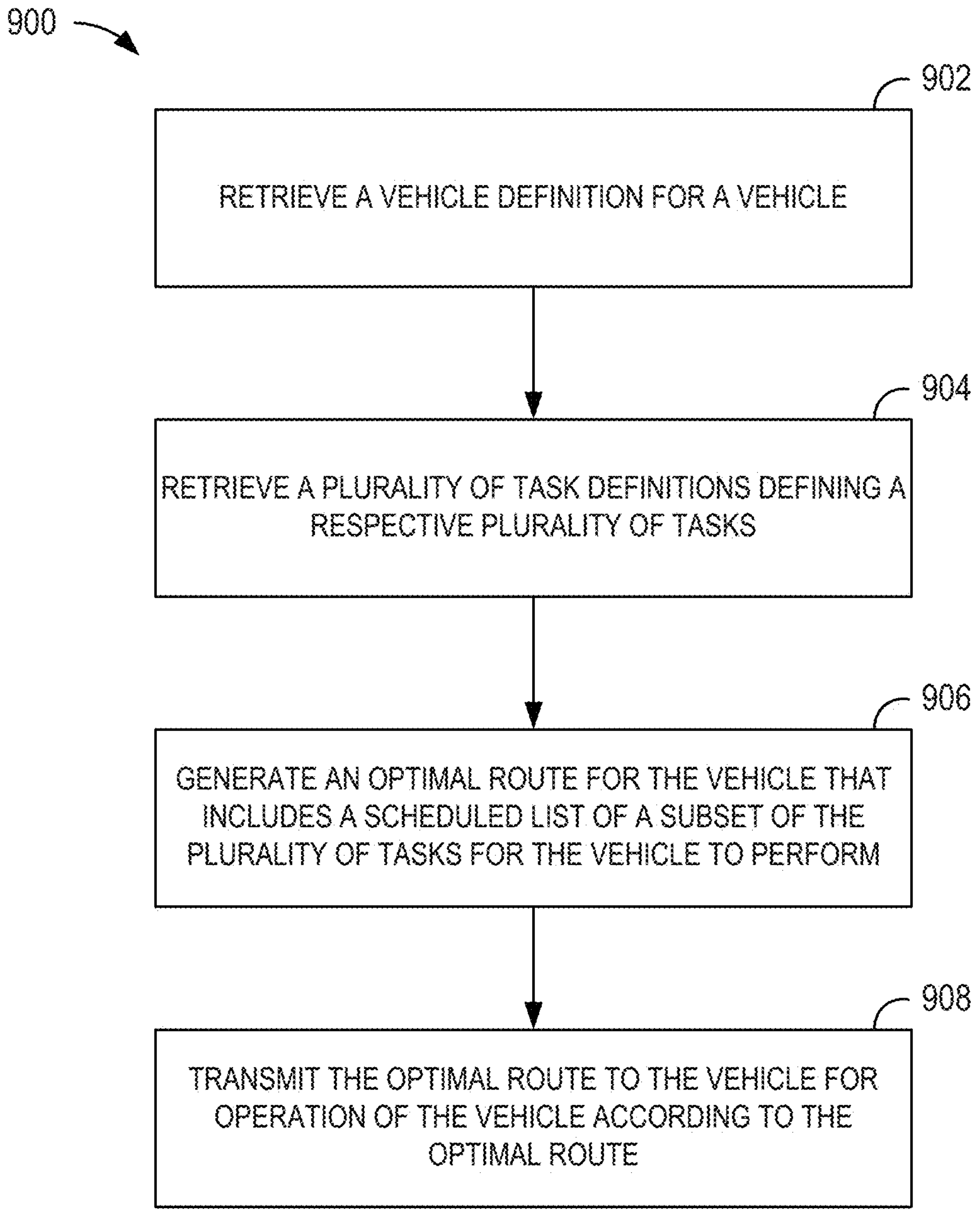
FIG. 9 illustrates a flow chart of an exemplary computer-implemented method for generating an optimal route for a vehicle that maximizes potential revenue for operation of the vehicle, using the vehicle routing system shown in FIG. 2.

Exemplary Computer-Implemented Method for Generating an Optimal Route for a Vehicle that Maximizes Potential Revenue for Operation of the Vehicle FIG. 9 depicts a flow chart of an exemplary computer-implemented method 900 for generating an optimal route for a vehicle (e.g., vehicle 100, shown in FIG. 1) that maximizes potential revenue for operation of the vehicle, using vehicle routing system 200 shown in FIG. 2. In the exemplary embodiment, method 900 may be performed by VRA computing device 130 (shown in FIG. 1).

Method 900 may include retrieving 902 a vehicle definition for the vehicle, the vehicle definition including availability parameters and delivery preferences associated with the vehicle. In some embodiments, VRA computing device 130 is communicatively coupled to a vehicle definition database (e.g., database 132, shown in FIG. 1) that stores vehicle definitions, wherein the vehicle definition database is populated by vehicle users associated with vehicles for which the vehicle definitions are stored, and wherein the vehicle definition includes data elements include a period of time over which the vehicle is available to complete tasks, a geographic range over which the vehicle is available to complete tasks, cargo preferences set by the associated vehicle user, a capacity of the vehicle for cargo including persons, a capacity of the vehicle for cargo including objects, a make of the vehicle, a model of the vehicle, a manufacturing year of the vehicle, an identifier of the vehicle, a vehicle type, vehicle features, a vehicle class, current vehicle location, current vehicle capacity, a performance rating for the vehicle, and historical claim data for the vehicle.

Method 900 may also include retrieving 904, based in part on the vehicle definition, a plurality of task definitions defining a respective plurality of tasks, each task including a respective cargo to be delivered, pick-up time, delivery time, pick-up location, delivery location, and task value. In some embodiments, VRA computing device 130 may be communicatively coupled to a task definition database (e.g., database 132) that stores available tasks, and retrieving 904 may further include: (i) identifying, based upon the vehicle definition, an availability radius for the vehicle, the availability radius defining a bounded geographical area to which the vehicle is available to travel and a period of time over which the vehicle is available to travel; (ii) generating a query including the availability radius; and/or (iii) transmitting, to the task definition database, the query including the availability radius, wherein the query causes the task definition database to identify and retrieve the plurality of tasks that can be completed within the availability radius of the vehicle.

Method 900 may additionally include generating 906, by executing at least one of artificial intelligence and deep learning functionality using the vehicle definition and the plurality of task definitions, an optimal route for the vehicle that includes a scheduled list of a subset of the plurality of tasks for the vehicle to perform, wherein the optimal route maximizes the potential revenue for operation of the vehicle within a period of time associated with the optimal route. In some embodiments, a first task of the subset of tasks is associated with a high-value cargo, and generating 906 may include generating the optimal route to schedule no additional tasks until completion of the first task. In some such embodiments, generating 906 may further include generating the optimal route to include a first sub-route associated with the first task that has a risk level at or below a risk level threshold associated with the first task.

Method 900 may further include transmitting 908 the optimal route to the vehicle for operation of the vehicle according to the optimal route. In some embodiments, the vehicle may be an autonomous vehicle, and wherein the optimal route, when received by the autonomous vehicle, may cause the autonomous vehicle to travel to pick-up and delivery locations associated with the subset of tasks according to the optimal route.

Method 900 may include additional, fewer, and/or alternative steps, including those described herein. For example, in some embodiments, method 900 may further include: (i) retrieving a plurality of historical routes travelled by a plurality of vehicles; (ii) retrieving a plurality of completed tasks completed by the plurality of vehicles; (iii) identifying one or more patterns in the plurality of historical routes and the plurality of completed tasks; and/or (iv) updating the at least one of the artificial intelligence and deep learning functionality based upon the identified patterns.

In some such embodiments, method 900 may further include: (a) identifying, from the identified patterns, at least one underserved location that has fewer than a threshold numbers of completed tasks associated therewith; and/or (b) generating the optimal route to prioritize tasks associated with the underserved location. In some embodiments, method 900 may further include: (a) identifying, from the identified patterns, a lull period of time over which the plurality of vehicles completed a lowest number of completed tasks; (b) generating a service schedule including one or more services associated with the vehicle, a respective service time associated with each service, and a respective service vendor associated with each service, wherein each service time is within the lull period of time; and/or (c) transmitting the service schedule to the vehicle for operation of the vehicle according to the service schedule. In some cases, the vehicle may be an autonomous vehicle, and the service schedule, when received by the autonomous vehicle, may cause the autonomous vehicle to travel to locations associated with the respective service vendors according to the service schedule.

In some embodiments, method 900 also includes: (i) identifying a first event occurring at a first location at first time, wherein the first event is likely to be associated with a plurality of potential tasks; and/or (ii) generating the optimal route to schedule operation of the vehicle at the first location at the first time to make the vehicle available to accommodate at least one potential task.

In some embodiments, the delivery preferences for the vehicle may include a person-only cargo preference, and method 900 may further include: (i) filtering the plurality of tasks based upon the person-only cargo preference to identify a plurality of person-only cargo tasks from the plurality of tasks, and/or (ii) generating the optimal route for the vehicle that includes the scheduled list of a subset of the plurality of person-only cargo tasks for the vehicle to perform. In some such embodiments, the vehicle may include a first vehicle and the optimal route may include a first optimal route, and method 900 may further include: (a) identifying a second vehicle operating according to a second optimal route, wherein the second vehicle is associated with a vehicle definition that does not include the person-only cargo preference and operates within an availability radius similar to an availability radius of the first vehicle; (b) comparing a predicted revenue associated with the second optimal route to a predicted revenue associated with the first optimal route; (c) calculating, based upon the comparing, a predicted loss associated with the first optimal route; and/or (d) transmitting, to a vehicle user associated with the first vehicle, a recommendation message including the predicted loss and a recommendation that the vehicle user remove the person-only cargo preference from the vehicle definition of the first vehicle.

In some embodiments, the delivery preferences for the vehicle may include an object-only cargo preference, and method 900 may further include: (i) filtering the plurality of tasks based upon the object-only cargo preference to identify a plurality of object-only cargo tasks from the plurality of tasks; and/or (ii) generating the optimal route for the vehicle that includes the scheduled list of a subset of the plurality of object-only cargo tasks for the vehicle to perform. In some such embodiments, the vehicle may include a first vehicle and the optimal route may include a first optimal route, and method 900 may further include: (a) identifying a second vehicle operating according to a second optimal route, wherein the second vehicle is associated with a vehicle definition that does not include the object-only cargo preference and operates within an availability radius similar to an availability radius of the first vehicle; (b) comparing a predicted revenue associated with the second optimal route to a predicted revenue associated with the first optimal route; (c) calculating, based upon the comparing, a predicted loss associated with the first optimal route; and/or (d) transmitting, to a vehicle user associated with the first vehicle, a recommendation message including the predicted loss and a recommendation that the vehicle user remove the object-only cargo preference from the vehicle definition of the first vehicle.

In some embodiments, the vehicle may include a first vehicle and the vehicle definition may include a first vehicle definition, the first vehicle definition including a first availability radius for the first vehicle that defines a bounded geographical area to which the vehicle is available to travel and a period of time over which the vehicle is available to travel. Method 900 may further include: (i) identifying, from the plurality of task definitions, a first task that extends beyond the first availability radius of the first vehicle; (ii) retrieving vehicle definitions of other vehicles than the first vehicle that operate within a respective availability radius adjacent to the first availability radius; (iii) selecting a second vehicle from the other vehicles having a second availability radius adjacent to the first availability radius; (iv) generating (e.g., generating 906) the optimal route for the first vehicle as a first optimal route that includes a first portion of the first task, wherein the first optimal route schedules the first vehicle to pick up cargo associated with the first task at the pick-up location associated with the first task and to drop off the cargo at the second vehicle at a second location between the pick-up location and the delivery location associated with the first task; (v) generating a second optimal route for the second vehicle that includes a second portion of the first task, wherein the second optimal route schedules the second vehicle to pick up the cargo associated with the first task from the first vehicle at the second location and to drop off the cargo at one of (a) the delivery location associated with the first task, or (b) a third vehicle at a third location between the second location and the delivery location associated with the first task; and/or (vi) transmitting (e.g., transmitting 908) the first optimal route to the first vehicle and the second optimal route to the second vehicle.

In some such embodiments, the first and second vehicles may be autonomous vehicles, and the first optimal route, when received by the first autonomous vehicle, may cause the first autonomous vehicle to travel to the pick-up location and the second location associated with the first portion of the first task according to the first optimal route. The second optimal route, when received the second autonomous vehicle, may cause the second autonomous vehicle to travel to the second location and the one of (a) the delivery location, or (b) the third location associated with the second portion of the first task according to the second optimal route. Additionally, the first optimal route may further cause the first autonomous vehicle to arrive at the second location at a predetermined time, and the second optimal route may cause the second autonomous vehicle to arrive at the second location at substantially the same predetermined time.

Figure 10:
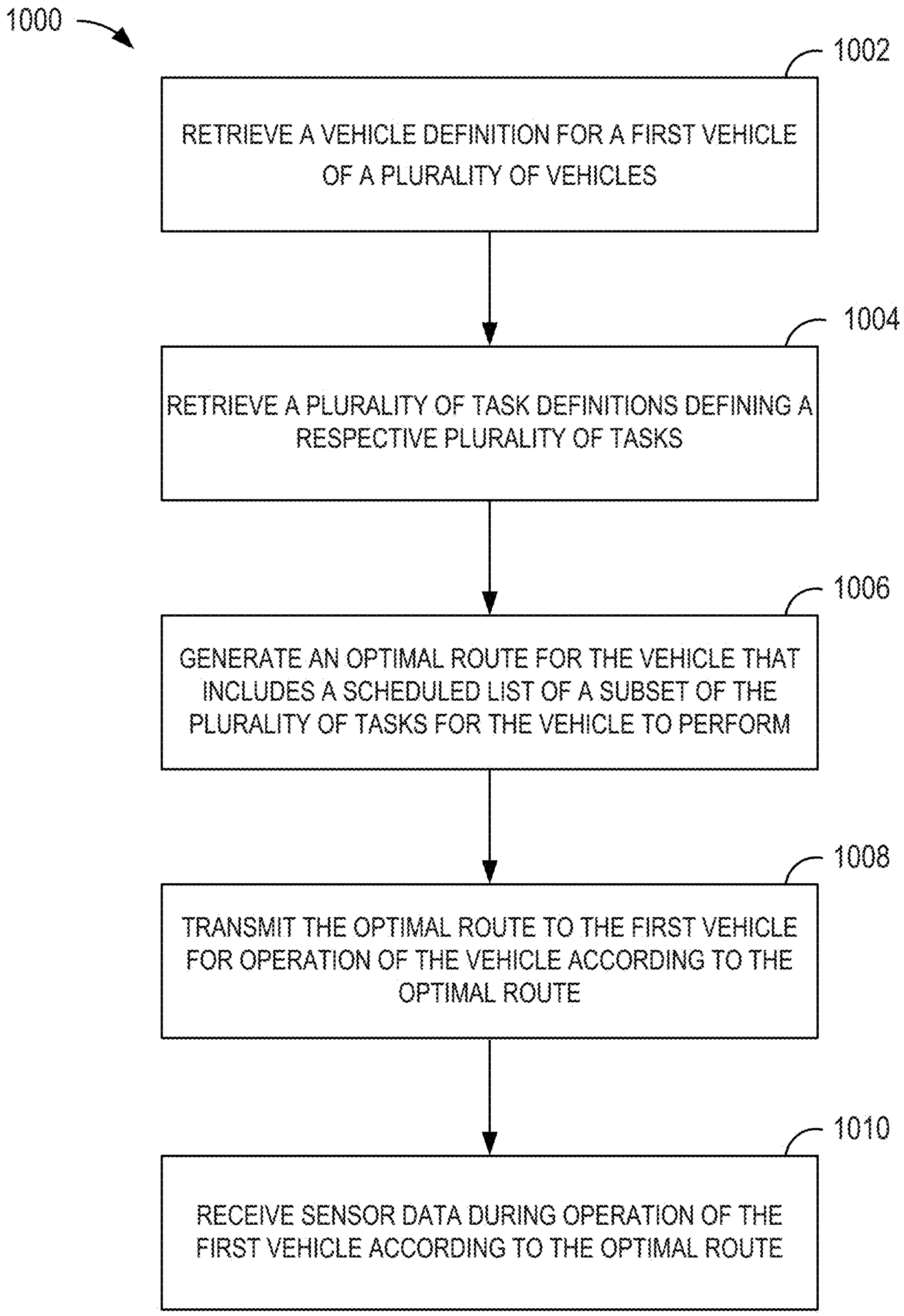
FIG. 10 illustrates a flow chart of another exemplary computer-implemented method for generating an optimal route for a vehicle that maximizes potential revenue for operation of the vehicle and generating analytics associated with operation of the vehicle, using the vehicle routing system shown in FIG. 2.

Exemplary Computer-Implemented Methods for Generating an Optimal Route and Generating Analytics Associated with Operation of the Vehicle FIG. 10 depicts a flow chart of an exemplary computer-implemented method 1000 for generating an optimal route for a vehicle (e.g., vehicle 100, shown in FIG. 1) that maximizes potential revenue for operation of the vehicle and generating analytics associated with operation of the vehicle, using vehicle routing system 200 shown in FIG. 2. In the exemplary embodiment, method 1000 may be performed by VRA computing device 130 (shown in FIG. 1). VRA computing device 130 may be communicatively coupled to a plurality of vehicles, each vehicle having a plurality of sensors (e.g., sensors 106, shown in FIG. 1) disposed thereon and configured to collect sensor data during operation of the respective vehicle.

Method 1000 may include retrieving 1002 a vehicle definition for a first vehicle of the plurality of vehicles, the vehicle definition including availability parameters and delivery preferences associated with the first vehicle.

Method 1000 may also include retrieving 1004, based in part on the vehicle definition, a plurality of task definitions defining a respective plurality of tasks, each task including a respective cargo to be delivered, pick-up time, delivery time, pick-up location, delivery location, and task value.

Method 1000 may further include generating 1006, by executing at least one of artificial intelligence and deep learning functionality using the vehicle definition and the plurality of task definitions, an optimal route for the vehicle that includes a scheduled list of a subset of the plurality of tasks for the vehicle to perform, wherein the optimal route maximizes the potential revenue for operation of the vehicle within a period of time associated with the optimal route.

Method 1000 may additionally include transmitting 1008 the optimal route to the first vehicle for operation of the vehicle according to the optimal route, and receiving 1010, from the first vehicle, sensor data during operation of the first vehicle according to the optimal route.

Method 1000 may include additional, fewer, and/or alternative steps, including those described herein. For example, in some embodiments, method 1000 may further include determining, based upon the received sensor data from the first vehicle, a first risk level associated with operation of the first vehicle according to the optimal route. In some such embodiments, method 1000 may further include: (i) retrieving an insurance policy associated with the first vehicle; (ii) determining whether the first risk level exceeds a threshold defined in the insurance policy; and/or (iii) when the first risk level exceeds the threshold, transmitting a notification to a vehicle user associated with the first vehicle that the first risk level exceeds the threshold. In some embodiments, method 1000 may further include (iv) generating the notification including a recommendation of a one-time supplemental insurance policy associated with the optimal route.

In some embodiments, method 1000 may further include: (i) retrieving an insurance policy associated with the first vehicle; (ii) determining whether the first risk level exceeds a threshold defined in the insurance policy; and/or (iii) when the first risk level exceeds the threshold, modifying the optimal route to include one or more alternative paths such that the modified optimal route has a second risk level below the threshold.

In some embodiments, a first task of the subset of tasks may be associated with a high-value cargo, and method 1000 may further include: (i) generating a recommendation message including a recommendation for a one-time supplemental insurance policy associated with the first task; and/or (ii) transmitting the recommendation message to a vehicle user associated with the first vehicle.

In some embodiments, method 1000 may include generating, based upon the sensor data received from the first vehicle, a risk profile associated with the first vehicle. In some embodiments, method 1000 may include: (i) detecting, based upon the sensor data received from the first vehicle, that the first vehicle requires one or more services; (ii) generating a service schedule for the first vehicle, the service schedule including the required one or more services, a respective service time associated with each service, and a respective service vendor associated with each service; and/or (iii) transmitting the service schedule to the vehicle for operation of the vehicle according to the service schedule.

In some embodiments, the plurality of sensors disposed on the first vehicle may include at least one sensor configured to identify check-in and check-out of cargo to and from the first vehicle, and method 1000 may include monitoring the sensor data received from the first vehicle for adherence to the optimal route. In some such embodiments, method 1000 may still further include: (i) identifying, based upon the monitoring, a deviation from the optimal route; and/or (ii) transmitting a control signal to the first vehicle, the control signal operative to cause the first vehicle to at least one of: (a) generate an alarm, or (b) record at least one of audio and video at the first vehicle to capture additional sensor data associated with the deviation.

In some embodiments, method 1000 may still further include: (i) identifying, based upon the monitoring, a deviation from the optimal route; and/or (ii) transmitting an alert to a first responder computing device to report the deviation. In other embodiments, method 1000 may still further include generating an electronic ledger of the identified check-in and check-out of the cargo to and from the first vehicle. In other embodiments, method 1000 may still further include: (i) identifying, based upon the monitoring, a deviation from the optimal route including an unauthorized check-in of cargo to the first vehicle; and/or (ii) transmitting a notification signal to the first vehicle directing suspension of further operation of the first vehicle.

In some embodiments, method 1000 may include receiving sensor data from the plurality of vehicles. Method 1000 may further include: (i) identifying, based upon sensor data received from a subset of the plurality of vehicles having a same make and model, a need for a similar service common to the subset of vehicles; and/or (ii) generating a service report indicating the need for the similar service common to the subset of vehicles for notification of a manufacturer of the subset of vehicles. Additionally or alternatively, method 1000 may further include: (i) processing the sensor data received from the plurality of vehicles to identify an infrastructure risk; and/or (ii) generating a risk report identifying the infrastructure risk for notification of an entity capable of responding to the infrastructure risk.

Additionally or alternatively, method 1000 may include: (i) processing the sensor data received from the plurality of vehicles to identify an ongoing infrastructure project; (ii) generating, from the sensor data over a period of time, a time lapse of progress of the ongoing infrastructure project; and/or (iii) generating a progress report including the time lapse of progress of the ongoing infrastructure project for notification of an entity associated with the ongoing infrastructure project. Additionally or alternatively, method 1000 may further include: (i) processing the sensor data received from the plurality of vehicles to identify a real-time emergency incident; and/or (ii) transmitting a notification to a first responder computing device, the notification including an indication of the real-time emergency incident and a location thereof.

Figure 11:
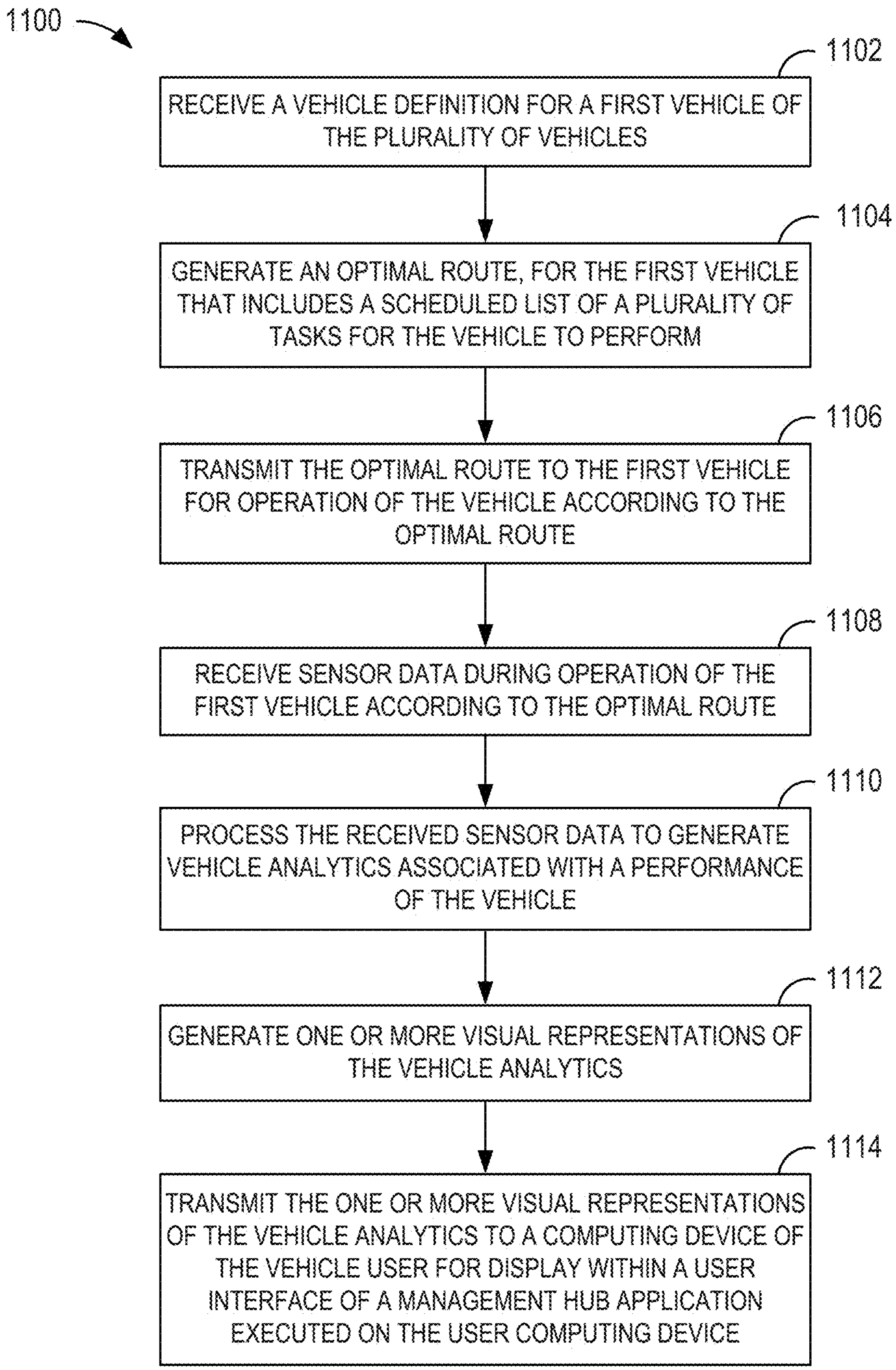
FIG. 11 illustrates a flow chart of yet another exemplary computer-implemented method for generating an optimal route for a vehicle that maximizes potential revenue for operation of the vehicle and generating analytics associated with operation of the vehicle, using the vehicle routing system shown in FIG. 2.

FIG. 11 illustrates a flow chart of another exemplary computer-implemented method 1100 for generating an optimal route for a vehicle (e.g., vehicle 100, shown in FIG. 1) that maximizes potential revenue for operation of the vehicle and generating analytics associated with operation of the vehicle, using the vehicle routing system 200 shown in FIG. 2. In the exemplary embodiment, method 11000 may be performed by VRA computing device 130 (shown in FIG. 1).

Method 1100 may include receiving 1102, from a vehicle user associated with the vehicle, a vehicle definition for a first vehicle of the plurality of vehicles, the vehicle definition including availability parameters and delivery preferences associated with the first vehicle Method 1100 may also include generating 1104, based in part on the vehicle definition, an optimal route for the first vehicle that includes a scheduled list of a plurality of tasks for the vehicle to perform. Each task may have an associated respective cargo to be delivered, pick-up time, delivery time, pick-up location, delivery location, and task value. The optimal route may maximize the potential revenue for operation of the first vehicle within a period of time associated with the optimal route.

Method 1100 may further include transmitting 1106 the optimal route to the first vehicle for operation of the vehicle according to the optimal route, and receiving 1108, from the first vehicle, sensor data during operation of the first vehicle according to the optimal route.

Method 1100 may still further include processing 1110 the received sensor data to generate vehicle analytics associated with a performance of the vehicle, generating 1112 one or more visual representations of the vehicle analytics, and transmitting 1114 the one or more visual representations of the vehicle analytics to a computing device of the vehicle user for display within a user interface of a management hub application executed on the user computing device.

Method 1100 may include additional, fewer, and/or alternative steps, including those described herein. For example, in some embodiments, the vehicle may include a first vehicle, the optimal route may include a first optimal route, and the vehicle analytics may include first vehicle analytics. VRA computing device 130 may be communicatively coupled to a plurality of vehicles including the first vehicle, each vehicle of the plurality of vehicle having a plurality of sensors disposed thereon and configured to collect sensor data during operation of the respective vehicle.

Method 1100 may further include: (i) generating second vehicle analytics for at least one other vehicle than the first vehicle based upon sensor data received from the at least one other vehicle during operation of the at least one other vehicle according to a respective other optimal route; (ii) comparing the first vehicle analytics to the second vehicle analytics; (iii) identifying, based upon the comparing, a difference between the first vehicle analytics and the second vehicle analytics; (iv) parsing the vehicle definition for the first vehicle to identify a user-defined delivery preference that accounts for the difference between the first vehicle analytics and the second vehicle analytics; (v) generating a recommendation that the vehicle user modify the user-defined delivery preference; and/or (vi) transmitting the recommendation to the user computing device for display within the user interface of the management hub application, the recommendation identifying the difference between the first vehicle analytics and the second vehicle analytics, the user-defined delivery preference, and an alternative user-defined delivery preference that would reduce the difference between the first vehicle analytics and the second vehicle analytics. In some embodiments, the user-defined delivery preference is one of a person-only cargo delivery preference and an object-only cargo delivery preference, and wherein the alternative user-defined delivery preference is a persons-and-objects delivery preference.

In other embodiments, VRA computing device 130 may be communicatively coupled to a plurality of service vendor computing devices associated with a respective plurality of service vendors that perform vehicle maintenance and repair services. Method 1100 may further include: (i) detecting, based upon the vehicle analytics, the vehicle needs a service to be performed thereon; (ii) transmitting, to the vehicle, a service schedule including the service to be performed, a service time associated with the service, and a first service vendor of the plurality of service vendors to perform the service; (iii) transmitting, to the service vendor computing device associated with the first service vendor, the service schedule; and/or (iv) transmitting, to the user computing device, an alert that the vehicle needs the service and an identification of the first service vendor.

In some embodiments, method 1100 also includes: (i) identifying a plurality of other vehicles associated with the vehicle user; (ii) generating respective vehicle analytics for each of the plurality of other vehicles; and/or (iii) transmitting one or more visual representations of the vehicle analytics for the plurality of other vehicles to the user computing device for display within the user interface of the management hub application.

In some embodiments, the one or more visual representations may include one or more graphs, charts, maps, plots, and legends. In some embodiments, the vehicle analytics may include one or more of: a generated revenue amount, percentage of the optimal route completed, path and distance travelled during operation of the vehicle according to the optimal route, current location of the vehicle, service status, services performed on the vehicle, risk rating of the optimal route, costs of operating the vehicle during the optimal route, revenue statistics based upon divisions of time, or revenue statistics per task.

In some embodiments, the vehicle may include a first vehicle, the optimal route may include a first optimal route, and the vehicle analytics may include first vehicle analytics. VRA computing device 130 may be communicatively coupled to a plurality of vehicles including the first vehicle, each vehicle of the plurality of vehicle having a plurality of sensors disposed thereon and configured to collect sensor data during operation of the respective vehicle. Method 1100 may include: (i) generating second vehicle analytics for the plurality of vehicles based upon sensor data received from the plurality of vehicles during operation of the plurality of vehicles; and/or (ii) identifying, using artificial intelligence and deep learning functionality, one or more patterns or trends of operation of the plurality of vehicles in the second vehicle analytics.

In some such embodiments, method 1100 may further include: (a) identifying, from the one or more identified patterns or trends, at least one underserved location that has experienced less than a threshold amount of vehicle operation therein; (b) determining, based upon the vehicle definition of the first vehicle, that the availability parameters of the first vehicle do not encompass the at least one underserved location; (c) generating a recommendation that the vehicle user modify the availability parameters of the first vehicle to include the at least one underserved location, the recommendation identifying the at least one underserved location and the availability parameters of the first vehicle; and/or (d) transmitting the recommendation to the user computing device for display within the user interface of the management hub application.

Exemplary Embodiments & Functionality

In one exemplary aspect, a vehicle routing and analytics (VRA) computing device for generating an optimal route for a vehicle that maximizes potential revenue for operation of the vehicle may be provided. The VRA computing device may include at least one processor in communication with a memory. The at least one processor may be programmed to: (i) receive or retrieve a vehicle definition for the vehicle, the vehicle definition including availability parameters and delivery preferences associated with the vehicle; (ii) receive or retrieve, based in part on the vehicle definition, a plurality of task definitions defining a respective plurality of tasks, each task including a respective cargo to be delivered, pick-up time, delivery time, pick-up location, delivery location, and task value; (iii) generate, by executing at least one of artificial intelligence and deep learning (or machine learning) functionality using the vehicle definition and the plurality of task definitions, an optimal route for the vehicle that includes a scheduled list of a subset of the plurality of tasks for the vehicle to perform, wherein the optimal route maximizes the potential revenue for operation of the vehicle within a period of time associated with the optimal route; and/or (iv) transmit the optimal route to the vehicle for operation of the vehicle according to the optimal route.

One enhancement may be, where the vehicle is an autonomous vehicle, that the optimal route, when received by the autonomous vehicle, causes the autonomous vehicle to travel to pick-up and delivery locations associated with the subset of tasks according to the optimal route.

Another enhancement may be, where the VRA computing device is communicatively coupled to a task definition database that stores available tasks, that to retrieve the plurality of task definitions, the at least one processor is further programmed to: (i) identify, based upon the vehicle definition, an availability radius for the vehicle, the availability radius defining a bounded geographical area to which the vehicle is available to travel and a period of time over which the vehicle is available to travel; (ii) generate a query including the availability radius; and/or (iii) transmit, to the task definition database, the query including the availability radius, wherein the query causes the task definition database to identify and retrieve the plurality of tasks that can be completed within the availability radius of the vehicle.

Another enhancement may be, where the VRA computing device is communicatively coupled to a vehicle definition database that stores vehicle definitions, the vehicle definition database populated by vehicle users associated with vehicles for which the vehicle definitions are stored, that the vehicle definition includes data elements include a period of time over which the vehicle is available to complete tasks, a geographic range over which the vehicle is available to complete tasks, cargo preferences set by the associated vehicle user, a capacity of the vehicle for cargo including persons, a capacity of the vehicle for cargo including objects, a make of the vehicle, a model of the vehicle, a manufacturing year of the vehicle, an identifier of the vehicle, a vehicle type, vehicle features, a vehicle class, current vehicle location, current vehicle capacity, a performance rating for the vehicle, and historical claim data for the vehicle.

A further enhancement may be, where a first task of the subset of tasks is associated with a high-value cargo, the at least one processor is further programmed to generate the optimal route to schedule no additional tasks until completion of the first task. The at least one processor may be further programmed to generate the optimal route to include a first sub-route associated with the first task that has a risk level at or below a risk level threshold associated with the first task.

In some cases, the at least one processor may be further programmed to: (i) retrieve a plurality of historical routes travelled by a plurality of vehicles; (ii) retrieve a plurality of completed tasks completed by the plurality of vehicles; (iii) identify one or more patterns in the plurality of historical routes and the plurality of completed tasks; and/or (iv) update the at least one of the artificial intelligence and deep learning functionality based upon the identified patterns. The at least one processor may be further programmed to: (a) identify, from the identified patterns, at least one underserved location that has fewer than a threshold numbers of completed tasks associated therewith; and/or (b) generate the optimal route to prioritize tasks associated with the underserved location.

The at least one processor may be further configured to: (a) identify, from the identified patterns, a lull period of time over which the plurality of vehicles completed a lowest number of completed tasks; (b) generate a service schedule including one or more services associated with the vehicle, a respective service time associated with each service, and a respective service vendor associated with each service, wherein each service time is within the lull period of time; and/or (c) transmit the service schedule to the vehicle for operation of the vehicle according to the service schedule. In some instances, where the vehicle is an autonomous vehicle, the service schedule, when received by the autonomous vehicle, may cause the autonomous vehicle to travel to locations associated with the respective service vendors according to the service schedule.

In other enhancements, the at least one processor may be further programmed to: (i) identify a first event occurring at a first location at first time, wherein the first event is likely to be associated with a plurality of potential tasks; and/or (ii) generate the optimal route to schedule operation of the vehicle at the first location at the first time to make the vehicle available to accommodate at least one potential task.

Additionally or alternatively, the delivery preferences for the vehicle include a person-only cargo preference, and the at least one processor may be further programmed to: (i) filter the plurality of tasks based upon the person-only cargo preference to identify a plurality of person-only cargo tasks from the plurality of tasks; and/or (ii) generate the optimal route for the vehicle that includes the scheduled list of a subset of the plurality of person-only cargo tasks for the vehicle to perform. In some cases, where the vehicle includes a first vehicle and the optimal route includes a first optimal route, and the at least one processor may be further programmed to: (a) identify a second vehicle operating according to a second optimal route, wherein the second vehicle is associated with a vehicle definition that does not include the person-only cargo preference and operates within an availability radius similar to an availability radius of the first vehicle; (b) compare a predicted revenue associated with the second optimal route to a predicted revenue associated with the first optimal route; (c) calculate, based upon the comparing, a predicted loss associated with the first optimal route; and/or (d) transmit, to a vehicle user associated with the first vehicle, a recommendation message including the predicted loss and a recommendation that the vehicle user remove the person-only cargo preference from the vehicle definition of the first vehicle.

Additionally or alternatively, the delivery preferences for the vehicle include an object-only cargo preference, and the at least one processor may be further programmed to: (i) filter the plurality of tasks based upon the object-only cargo preference to identify a plurality of object-only cargo tasks from the plurality of tasks; and/or (ii) generate the optimal route for the vehicle that includes the scheduled list of a subset of the plurality of object-only cargo tasks for the vehicle to perform. In some cases, where the vehicle includes a first vehicle and the optimal route includes a first optimal route, and the at least one processor may be further programmed to: (a) identify a second vehicle operating according to a second optimal route, wherein the second vehicle is associated with a vehicle definition that does not include the object-only cargo preference and operates within an availability radius similar to an availability radius of the first vehicle; (b) compare a predicted revenue associated with the second optimal route to a predicted revenue associated with the first optimal route; (c) calculate, based upon the comparing, a predicted loss associated with the first optimal route; and/or (d) transmit, to a vehicle user associated with the first vehicle, a recommendation message including the predicted loss and a recommendation that the vehicle user remove the object-only cargo preference from the vehicle definition of the first vehicle.

Another enhancement may be, where the vehicle includes a first vehicle and the vehicle definition includes a first vehicle definition, the first vehicle definition including a first availability radius for the first vehicle that defines a bounded geographical area to which the vehicle is available to travel and a period of time over which the vehicle is available to travel, the at least one processor is further programmed to: (i) identify, from the plurality of task definitions, a first task that extends beyond the first availability radius of the first vehicle; (ii) retrieve vehicle definitions of other vehicles than the first vehicle that operate within a respective availability radius adjacent to the first availability radius; (iii) select a second vehicle from the other vehicles having a second availability radius adjacent to the first availability radius; (iv) generate the optimal route for the first vehicle as a first optimal route that includes a first portion of the first task, wherein the first optimal route schedules the first vehicle to pick up cargo associated with the first task at the pick-up location associated with the first task and to drop off the cargo at the second vehicle at a second location between the pick-up location and the delivery location associated with the first task; (v) generate a second optimal route for the second vehicle that includes a second portion of the first task, wherein the second optimal route schedules the second vehicle to pick up the cargo associated with the first task from the first vehicle at the second location and to drop off the cargo at one of (a) the delivery location associated with the first task, or (b) a third vehicle at a third location between the second location and the delivery location associated with the first task; and/or (vi) transmit the first optimal route to the first vehicle and the second optimal route to the second vehicle.

In some instances, wherein the first and second vehicles are autonomous vehicles, the first optimal route, when received by the first autonomous vehicle, may cause the first autonomous vehicle to travel to the pick-up location and the second location associated with the first portion of the first task according to the first optimal route, and the second optimal route, when received the second autonomous vehicle, may cause the second autonomous vehicle to travel to the second location and the one of (i) the delivery location, or (ii) the third location associated with the second portion of the first task according to the second optimal route. In some cases, first optimal route may further cause the first autonomous vehicle to arrive at the second location at a predetermined time, and the second optimal route may cause the second autonomous vehicle to arrive at the second location at substantially the same predetermined time.

It should be readily understood that the VRA computing device may implement a method including steps similar to any of the foregoing functionality described herein. In addition, it should be readily understood that any of the foregoing functionality may be implemented as computer-executable instructions stored on at least one non-transitory computer-readable storage medium.

In another exemplary aspect, a vehicle routing and analytics (VRA) computing device for generating an optimal route for a vehicle to travel that maximizes potential revenue for operation of the vehicle may be provided. The VRA computing device may be communicatively coupled to a plurality of vehicles, each vehicle having a plurality of sensors disposed thereon and configured to collect sensor data during operation of the respective vehicle. The VRA computing device may include at least one processor in communication with a memory. The at least one processor may be programmed to: (i) retrieve a vehicle definition for a first vehicle of the plurality of vehicles, the vehicle definition including availability parameters and delivery preferences associated with the first vehicle; (ii) retrieve, based in part on the vehicle definition, a plurality of task definitions defining a respective plurality of tasks, each task including a respective cargo to be delivered, pick-up time, delivery time, pick-up location, delivery location, and task value; (iii) generate, by executing at least one of artificial intelligence and deep learning functionality using the vehicle definition and the plurality of task definitions, an optimal route for the vehicle that includes a scheduled list of a subset of the plurality of tasks for the vehicle to perform, wherein the optimal route maximizes the potential revenue for operation of the vehicle within a period of time associated with the optimal route; (iv) transmit the optimal route to the first vehicle for operation of the vehicle according to the optimal route; and/or (v) receive, from the first vehicle, sensor data during operation of the first vehicle according to the optimal route.

One enhancement may be that the at least one processor is further programmed to determine, based upon the received sensor data from the first vehicle, a first risk level associated with operation of the first vehicle according to the optimal route. In some cases, the at least one processor may be further programmed to: (i) retrieve an insurance policy associated with the first vehicle; (ii) determine whether the first risk level exceeds a threshold defined in the insurance policy; and/or (iii) when the first risk level exceeds the threshold, transmit a notification to a vehicle user associated with the first vehicle that the first risk level exceeds the threshold. In some instances, the at least one processor may be further programmed to generate the notification including a recommendation of a one-time supplemental insurance policy associated with the optimal route. In other cases, the at least one processor may be further programmed to: (i) retrieve an insurance policy associated with the first vehicle; (ii) determine whether the first risk level exceeds a threshold defined in the insurance policy; and/or (iii) when the first risk level exceeds the threshold, modify the optimal route to include one or more alternative paths such that the modified optimal route has a second risk level below the threshold.

In some cases, where a first task of the subset of tasks is associated with a high-value cargo, the at least one processor may be further programmed to: (i) generate a recommendation message including a recommendation for a one-time supplemental insurance policy associated with the first task, such as a usage-based insurance (UBI) policy having a premium based upon the first task and/or an associated route or portion of the route; and/or (ii) transmit the recommendation message (or a quote for the UBI policy) to a vehicle user associated with the first vehicle and/or to the first vehicle.

Another enhancement may be where the at least one processor is further programmed to generate, based upon the sensor data received from the first vehicle, a risk profile associated with the first vehicle.

In some instances, the at least one processor may be further programmed to: (i) detect, based upon the sensor data received from the first vehicle, that the first vehicle requires one or more services; (ii) generate a service schedule for the first vehicle, the service schedule including the required one or more services, a respective service time associated with each service, and a respective service vendor associated with each service; and/or (iii) transmit the service schedule to the vehicle for operation of the vehicle according to the service schedule.

One enhancement may be, where the plurality of sensors disposed on the first vehicle include at least one sensor configured to identify check-in and check-out of cargo to and from the first vehicle, that the at least one processor is further programmed to monitor the sensor data received from the first vehicle for adherence to the optimal route. In some cases, the at least one processor may be further programmed to: (i) identify, based upon the monitoring, a deviation from the optimal route; and/or (ii) transmit a control signal to the first vehicle, the control signal operative to cause the first vehicle to at least one of: (a) generate an alarm, or (b) record at least one of audio and video at the first vehicle to capture additional sensor data associated with the deviation. In other cases, the at least one processor may be further programmed to: (i) identify, based upon the monitoring, a deviation from the optimal route; and/or (ii) transmit an alert to a first responder computing device to report the deviation.

Additionally or alternatively, the at least one processor may be further programmed to generate an electronic ledger of the identified check-in and check-out of the cargo to and from the first vehicle. Additionally or alternatively, the at least one processor may be further programmed to: (i) identify, based upon the monitoring, a deviation from the optimal route including an unauthorized check-in of cargo to the first vehicle; and/or (ii) transmit a notification signal to the first vehicle directing suspension of further operation of the first vehicle.

In some aspects, the at least one processor may be further programmed to receive sensor data from the plurality of vehicles. The at least one processor may be further programmed to: (i) identify, based upon sensor data received from a subset of the plurality of vehicles having a same make and model, a need for a similar service common to the subset of vehicles; and/or (ii) generate a service report indicating the need for the similar service common to the subset of vehicles for notification of a manufacturer of the subset of vehicles. Additionally or alternatively, the at least one processor may be further programmed to: (i) process the sensor data received from the plurality of vehicles to identify an infrastructure risk; and/or (ii) generate a risk report identifying the infrastructure risk for notification of an entity capable of responding to the infrastructure risk.

In some cases, the at least one processor is further programmed to: (i) process the sensor data received from the plurality of vehicles to identify an ongoing infrastructure project; (ii) generate, from the sensor data over a period of time, a time lapse of progress of the ongoing infrastructure project; and/or (iii) generate a progress report including the time lapse of progress of the ongoing infrastructure project for notification of an entity associated with the ongoing infrastructure project. Additionally or alternatively, the at least one processor may be further programmed to: (i) process the sensor data received from the plurality of vehicles to identify a real-time emergency incident; and/or (ii) transmit a notification to a first responder computing device, the notification including an indication of the real-time emergency incident and a location thereof.

It should be readily understood that the VRA computing device may implement a method including steps similar to any of the foregoing functionality described herein. In addition, it should be readily understood that any of the foregoing functionality may be implemented as computer-executable instructions stored on at least one non-transitory computer-readable storage medium.

In yet another exemplary aspect, a vehicle routing and analytics (VRA) computing device for generating an optimal route for a vehicle to travel that maximizes potential revenue for operation of the vehicle and generating analytics associated with operation of the vehicle may be provided. The VRA computing device may be communicatively coupled to the vehicle, the vehicle having a plurality of sensors disposed thereon and configured to collect sensor data during operation thereof. The VRA computing device may include at least one processor in communication with a memory, wherein the at least one processor may be programmed to: (i) receive, from a vehicle user associated with the vehicle, a vehicle definition for a first vehicle of the plurality of vehicles, the vehicle definition including availability parameters and delivery preferences associated with the first vehicle; (ii) generate, based in part on the vehicle definition, an optimal route for the first vehicle that includes a scheduled list of a plurality of tasks for the vehicle to perform, each task having an associated respective cargo to be delivered, pick-up time, delivery time, pick-up location, delivery location, and task value, wherein the optimal route maximizes the potential revenue for operation of the first vehicle within a period of time associated with the optimal route; (iii) transmit the optimal route to the first vehicle for operation of the vehicle according to the optimal route; (iv) receive, from the first vehicle, sensor data during operation of the first vehicle according to the optimal route; (v) process the received sensor data to generate vehicle analytics associated with a performance of the first vehicle; (vi) generate one or more visual representations of the vehicle analytics; and/or (vii) transmit the one or more visual representations of the vehicle analytics to a computing device of the vehicle user for display within a user interface of a management hub application executed on the user computing device.

One enhancement may be where the one or more visual representations include one or more graphs, charts, maps, plots, and legends. Another enhancement may be where the vehicle analytics include one or more of: a generated revenue amount, percentage of the optimal route completed, path and distance travelled during operation of the vehicle according to the optimal route, current location of the vehicle, service status, services performed on the vehicle, risk rating of the optimal route, costs of operating the vehicle during the optimal route, revenue statistics based upon divisions of time, or revenue statistics per task.

In some cases, where the vehicle includes a first vehicle, the optimal route includes a first optimal route, and the vehicle analytics include first vehicle analytics, the VRA computing device may be communicatively coupled to a plurality of vehicles including the first vehicle, each vehicle of the plurality of vehicle having a plurality of sensors disposed thereon and configured to collect sensor data during operation of the respective vehicle. The at least one processor may be further programmed to: (i) generate second vehicle analytics for at least one other vehicle than the first vehicle based upon sensor data received from the at least one other vehicle during operation of the at least one other vehicle according to a respective other optimal route; (ii) compare the first vehicle analytics to the second vehicle analytics; (iii) identify, based upon the comparing, a difference between the first vehicle analytics and the second vehicle analytics; (iv) parse the vehicle definition for the first vehicle to identify a user-defined delivery preference that accounts for the difference between the first vehicle analytics and the second vehicle analytics; (v) generate a recommendation that the vehicle user modify the user-defined delivery preference; and/or (vi) transmit the recommendation to the user computing device for display within the user interface of the management hub application, the recommendation identifying the difference between the first vehicle analytics and the second vehicle analytics, the user-defined delivery preference, and an alternative user-defined delivery preference that would reduce the difference between the first vehicle analytics and the second vehicle analytics. In some instances, the user-defined delivery preference is one of a person-only cargo delivery preference and an object-only cargo delivery preference, and the alternative user-defined delivery preference is a persons-and-objects delivery preference.

Another enhancement may be, where the VRA computing device is further communicatively coupled to a plurality of service vendor computing devices associated with a respective plurality of service vendors that perform vehicle maintenance and repair services, that the at least one processor is further programmed to: (i) detect, based upon the vehicle analytics, the vehicle needs a service to be performed thereon; (ii) transmit, to the vehicle, a service schedule including the service to be performed, a service time associated with the service, and a first service vendor of the plurality of service vendors to perform the service; (iii) transmit, to the service vendor computing device associated with the first service vendor, the service schedule; and/or (iv) transmit, to the user computing device, an alert that the vehicle needs the service and an identification of the first service vendor.

In some instances, the at least one processor may be further programmed to: (i) identify a plurality of other vehicles associated with the vehicle user; (ii) generate respective vehicle analytics for each of the plurality of other vehicles; and/or (iii) transmit one or more visual representations of the vehicle analytics for the plurality of other vehicles to the user computing device for display within the user interface of the management hub application.

Another enhancement may be, where the vehicle includes a first vehicle, the optimal route includes a first optimal route, the vehicle analytics include first vehicle analytics, the VRA computing device is communicatively coupled to a plurality of vehicles including the first vehicle, each vehicle of the plurality of vehicle having a plurality of sensors disposed thereon and configured to collect sensor data during operation of the respective vehicle, that the at least one processor is further programmed to: (i) generate second vehicle analytics for the plurality of vehicles based upon sensor data received from the plurality of vehicles during operation of the plurality of vehicles; and/or (ii) identify, using artificial intelligence and deep learning functionality, one or more patterns or trends of operation of the plurality of vehicles in the second vehicle analytics.

In some cases, the at least one processor may be further programmed to: (a) identify, from the one or more identified patterns or trends, at least one underserved location that has experienced less than a threshold amount of vehicle operation therein; (b) determine, based upon the vehicle definition of the first vehicle, that the availability parameters of the first vehicle do not encompass the at least one underserved location; (c) generate a recommendation that the vehicle user modify the availability parameters of the first vehicle to include the at least one underserved location, the recommendation identifying the at least one underserved location and the availability parameters of the first vehicle; and/or (d) transmit the recommendation to the user computing device for display within the user interface of the management hub application.

It should be readily understood that the VRA computing device may implement a method including steps similar to any of the foregoing functionality described herein. In addition, it should be readily understood that any of the foregoing functionality may be implemented as computer-executable instructions stored on at least one non-transitory computer-readable storage medium.

In a further exemplary aspect, a computer-implemented method of directing an autonomously floating delivery autonomous vehicle may be provided. The method may include: (i) receiving, via one or more processors, servers, and/or transceivers, autonomous vehicle (AV) condition data from multiple autonomous vehicles and other sources (such as smart infrastructure or intelligent homes) via wireless communication and/or data transmission over one or more radio frequency links, the condition data being generated by autonomous vehicle-mounted sensors and indicating weather, road, traffic, congestion, or accident conditions; (ii) retrieving from a memory unit or receiving via wireless communication or data transmission over one or more radio links, via one or more processors, servers, and/or transceivers, multiple service requests generated by multiple customer computing devices, each service request including a pick-up and drop-off address, location, or coordinates, each service request including information identifying one or more passengers or type and weight of one or more packages; (iii) calculating, via one or more processors or servers, an overall route that the floating delivery autonomous vehicle will travel from an origination point to a final destination, the overall route including each pick-up and drop-off point of the passengers and packages (as identified in the service requests) as a lowest cost waypoint along or within the overall route, the waypoints being calculated as being lowest cost based upon AV condition data and/or passenger or package weight or size information; (iv) routing or directing, via one or more processors or servers, the delivery autonomous vehicle along the overall route to pick-up and drop-off passengers and packages at each intermediate waypoint along the overall route; (v) receiving, via one or more processors or servers, a new or additional electronic service request for pick-up and delivery of an additional passenger and/or package, the additional electronic service request including pick-up and drop-off point or location information; (vi) continuing, via one or more processors, servers, and/or transceivers, to receive updated AV condition data via wireless communication or data transmission over one or more radio links, the condition data including traffic, weather, congestion, road, and/or accident data, the condition data may be generated by autonomous vehicles or other sources, such as smart infrastructure, intelligent homes, or mobile devices; (vii) while the delivery AV is floating along the overall route, dynamically updating the overall route, via one or more processors and/or servers, by calculating the lowest cost route that includes the intermediate pick-up and drop-off locations or points in the additional service request(s) as additional waypoints along the overall route, the lowest cost update route may be calculated based upon the update AV condition data or other data received since the overall route was initially calculated; (viii) directing, via one or more processors and/or servers, the delivery AV along the dynamically updated overall route; and/or (ix) updating, via one or more processors and/or servers, a status hub or user interface displaying a current status and/or location of each passenger and/or package.

In one enhancement, the AV condition data may be generated or collected by autonomous vehicle-mounted sensors, and may include telematics (including speed, GPS location, route, direction, cornering, braking, and acceleration data) and image data. In another enhancement, the AV condition data may be generated or collected by smart infrastructure, mobile devices, intelligent homes, drones, planes, and/or satellites.

In some instances, the lowest cost overall route may be calculated based upon shortest time or shortest distance traveled to complete to overall route. In some instances, the lowest cost overall route may be calculated based upon optimizing downtime of the delivery autonomous vehicle for maintenance purposes. In further instances, the lowest cost overall route may be calculated based upon optimizing downtime of the delivery autonomous vehicle for refueling or recharging purposes. In other instances, the lowest cost overall route may be calculated based upon optimizing safety of traveling the overall route. In some instances, the lowest cost overall route may be calculated based upon weather along the route, and dropping and picking up packages or passengers in clear or sunny weather. In still further instances, the lowest cost overall route may be calculated based upon the least traffic, congestion, or road construction along the route.

It should be readily understood that any of the above-described steps may be implemented by a computer system for remotely and/or locally directing an autonomously floating delivery autonomous vehicle, which may include one or more local or remote processors, sensors, transceivers, and/or servers configured to implement any of the above-described steps. In addition, any of the above-described steps may be stored and executed as computer-executable instructions on at least one non-transitory computer-readable storage medium.

In another exemplary aspect, a computer system for directing a floating delivery autonomous vehicle may be provided. The computer system may include at least one of: one or more processors, one or more sensors, one or more transceivers, and one or more servers. The computer system may be configured to: (i) receive autonomous vehicle (AV) condition data from at least one source including a plurality of AVs, the AV condition data generated by AV-mounted sensors and indicating weather, road, traffic, congestion, or accident conditions; (ii) retrieve, from a memory unit, a plurality of service requests generated by a corresponding plurality of customer computing devices, each service request including a pick-up location, a drop-off location, and information identifying (i) one or more passengers, or (ii) a type and a weight of one or more packages; (iii) calculate an overall route that the floating delivery AV will travel from an origination location to a final location, the overall route including a respective pick-up and drop-off location identified in a subset of the plurality of service requests, including calculating the overall route as a lowest cost route between all of the respective pick-up and drop-off locations as waypoints, based upon at least one of: (a) the AV condition data, and (b) passenger or package information identified in the subset of service requests; (iv) direct the delivery AV to travel the overall route to each pick-up and drop-off location and to pick-up and drop off the (a) one or more passengers or (b) one or more packages at each respective pick-up and drop-off location as indicated in the subset of the plurality of service requests; (v) receive an additional service request for pick-up and drop-off of an additional (a) one or more passengers or (b) one or more packages, the additional service request including a corresponding pick-up and drop-off locations; (vi) continuously receive updated AV condition data; (vii) while directing the delivery AV along the overall route, dynamically update the overall route by calculating an updated lowest cost route that includes the pick-up and drop-off locations in the additional service request as additional waypoints along the overall route, based upon at least one of (a) the updated AV condition data or (b) other data received since the overall route was initially calculated; (viii) direct the delivery AV along the dynamically updated overall route; and/or (ix) update a remote status hub with location information associated with the delivery AV, the status hub configured to display at least one of a current status and current location of each (a) one or more passengers or (b) one or more packages transported by the delivery AV.

In one enhancement, the AV condition data may include telematics data including speed, GPS location, route, direction, cornering, braking, and acceleration data of the respective AV vehicles and image data.

In some instances, the AV condition data may be generated at at least one of: smart infrastructure, mobile devices, intelligent homes, drones, planes, or satellites.

In one enhancement, the lowest cost overall route may be calculated based upon shortest time or shortest distance traveled to complete to overall route. In another enhancement, the lowest cost overall route may be calculated based upon optimizing downtime of the delivery AV for at least one of maintenance, refueling, or recharging. In a further enhancement, the lowest cost overall route may be calculated based upon optimizing safety of traveling the overall route. In another enhancement, the lowest cost overall route may be calculated based upon weather along the route, including prioritizing picking up and dropping off the at least one of (i) one or more passengers and (ii) one or more packages in clear weather. In one enhancement, the lowest cost overall route may be calculated based upon a route including the least traffic, congestion, or road construction along the route.

It should be readily understood that the computing system may implement a method including steps similar to any of the foregoing functionality described herein. In addition, it should be readily understood that any of the foregoing functionality may be implemented as computer-executable instructions stored on at least one non-transitory computer-readable storage medium.

Additional Functionality

As autonomous vehicles become mainstream, corporations, manufacturers, and private owners will explore how to receive the most value, efficiency, and revenue from each autonomous vehicle (vehicles may include: Car, Flying Car, Truck, Van, Cargo Vehicle, Drone, Plane, Semi, Construction Class and Farm, Recreation, Multi-Cargo Class, and Unknown).

In exploring best autonomous vehicle use, value, and profit, audiences will ultimately move to a system of: (a) autonomously delivering people and multiple classes of cargo: packages, perishables, materials, and mail; (b) delivering those items locally, regionally, and domestically; (c) providing multiple types of delivery services, in the same vehicle at the same or different times, 24/7/365; and/or (d) floating seamlessly from opportunity to opportunity between multiple classes of cargo to achieve the highest value and profit The systems and methods described herein may provide services, support, and alignments, which will enable corporations, manufacturers, and private owners of autonomous vehicles, separately, to: (i) maximize revenue opportunities; (ii) capture, automatically synthesize, and store data to create ultra-efficient activity, routing, and logistics strategies; (iii) capture infrastructure data points for use in understanding risk or issue, reporting to local governance; (iv) capture vehicle metrics data point for reporting vehicle issues and performance; (v) create a continuous, adaptive system for right-sizing the right cargo for the right vehicle and the right complementary route at the right time; (vi) create a hub system of support, maintenance, and services to keep vehicles operating and creating revenue 24/7/365; (vii) create ultra-efficient methods to validate booking, pickup, tracking, delivering passengers, inventory, cargo, mail; (viii) understand overall, live, real-time risks to be able to assess insurance and protection needs; (ix) provide safety and security to passengers, cargo, and mail; and/or (x) create separate management and support hubs as a service for corporations and private owners that encompasses business and ownership ecosystems including: (a) data capture, analysis, and storage (AI, blockchain, AWS, deep learning, data security as a service); (b) financial services: vehicle financing & leasing products, fleet financing, banking, crypto/digital currency; (c) small business services: metrics & opportunities analysis, accounting, insurance, investments, benefits; (d) insurance, claims, and accident/incident recovery services; (e) maintenance and support services; (f) legal services; (g) advertising, marketing, app, ratings and experiences services; (h) guest services; (i) cargo and passenger booking, tracking, and delivery validation services; and/or (j) subscription and investment services.

The systems and methods described herein may enable capturing market, consumer, and vehicle data, automatically synthesizing that data, and creating ultra-efficient activity, routing, and logistics strategies, referred to generally as "autonomous float strategy and strategy recommendations." The vehicle routing system may be configured to: (i) utilize Al, cloud data storage, and deep learning to understand real-time local, regional, and domestic market and consumer use patterns for ride share, package pickup and delivery, and other cargo pickup and delivery; (ii) utilize Al and deep learning to understand and automatically employ strategies for best class or closest vehicle to implement, best location (local, regional, domestic, or all), max business and revenue opportunity, best competition space or location underserved space; (iii) utilize Al and deep learning to gather information from smart things calendars, user calendar and social media if enabled, publicly available social media, and news sources to gain understanding of real-time events and area activities and employ strategies to service those areas; (iv) utilize Al and deep learning to understand patterns of businesses that have a large quantity of delivery/return package traffic and locations delivered from/returned to enable service to those providers; (v) utilize AI and deep learning to understand and employ strategies for when a ride share, package/cargo/mail pickup/delivery, or a combination of people and cargo is appropriate for max revenue potential; (vi) utilize AI and deep learning to understand and employ strategies for when maximum safety and security is needed, such as the transport of a child, senior, disabled, or a high-value package; (vii) utilize AI and deep learning patterns to employ strategies for best down-times for fueling, maintenance, and repair (which could be while en route to picking up cargo or people or delivering cargo); (viii) unable an app to show one or more vehicles' current strategy, performance, location, current use, revenue generated, maintenance/repair, vehicle issues, and AI-generated recommendations for future use if not using an autonomous Float strategy; and/or (ix) enable owners/subscribers/investors to receive smart reports and be able to adjust use and maintenance strategies as desired.

The systems and methods described herein may also enable utilize on-board cameras, sensors, and AI to capture vehicle data, infrastructure, environmental elements, road way, business, and neighborhood data points, in order to understand overall, live, real-time risks to be able to assess insurance, protection, and solution needs. The vehicle routing system may additionally (i) utilize data to understand real-time risks and liabilities to vehicle(s), people, interstate, street, roadway technology and roadway lights, buildings, houses, and landscape; (ii) create automatic reports for local governance highlighting infrastructure issues, changes, technology and construction progress and upgrade, work needing to be performed or maintained, and crime and offer solutions, strategies, and services which reduce risks, liabilities, and costs and potentially reducing insurance claims; (iii) create automatic reports highlighting business and residential consumer risks and liabilities and offering solutions and services to reduce risks and potentially lower insurance costs and raise property value or revenue potential; (iv) create automatic reports regarding real-time ambient environment including traffic, weather, disaster, and other elements which may elevate risk owner/user risk or claims activity; (v) capture vehicle metric data points for reporting vehicle issues and performance back to manufacturer; and/or (vi) use these data points to create pattern and risk profiles for each vehicle and its use, each area traveled in or through, each passenger, and potentially each vehicle owner.

In some embodiments, the vehicle routing system may enable the passive listening and passive data capture of video, audio, and GPS and reporting to proper enforcement, which could help increase success of responding to emergencies, accidents, disasters or finding missing persons (amber alerts), persons of interest (wanted criminals), crimes in progress, fires, cries for help and provide data evidence within an area of travel if a crime or incident has been committed. Additionally or alternatively, the pattern and risk profiles could then be used to create insurance models—such as the creation of an on-demand insurance product based upon passenger and or packages in the vehicle—that are customized to each vehicle, passenger, and cargo provider The present disclosure provides for creating a continuous, adaptive system for right-sizing the right cargo for the right vehicle and the right complementary route at the right time, by utilizing vehicle sensors and AI to create in-vehicle cargo storage/people/mail placement strategies enabling realization of max cargo load, optimum pickup/offload speed, and highest daily revenue. The vehicle routing system may additionally or alternatively utilize Al, model training, and/or adaptive learning to create a pickup/delivery routing strategy based upon the following factors: time; vehicle model and type; current vehicle location; current cargo; dimensions of individual package/people; weight of individual package/people elements and total cargo; purpose of transportation; cargo or people to pickup/deliver; current location and future destination of person/package/cargo: start point, end point, waypoints, transfer point(s); weather; current area construction and road closures; active emergency route status; time requested for delivery if package/cargo; passenger subscription stat us (future packages tiers may enable choice of rate class, such as private direct routing or routing with package delivery on route to destination); delivery of person/people, if enabled due to route direction agreement, being first priority; human emergency status; environmental emergency status; area and route risk data; area events; rider or cargo provider rating; legal data, such as protective orders limiting distance; route continuation (enablement of rider or cargo to change vehicles to be delivered at fastest pace); routing to complete route continuation strategy; in-route rejection of person or cargo (potentially due to risk of vehicle damage, risk to other passengers, substance detection-such as drugs, bomb making materials, radioactivity, etc.); opportunities for social good, such an opportunity to donate time and transportation which could have tax savings and implications; historical issue and incident data which could help reduce risk or prevent claims (such as claims involving a particular vehicle in a particular area at a specific time or season); crime data; and/or user preferences.

Moreover, the present disclosure provides for creating a hub system of support, maintenance, and services to keep vehicles operating and creating revenue 24/7/365, by, for example: (i) using onboard sensors to detect and track when an autonomous delivery service vehicle needs basic maintenance such as oil change, tire rotation, tire inflation, new wipers, light replacement, interior/exterior detailing and route to the appropriate vendor relationship in accordance with down time routing strategy; (ii) using onboard sensors to detect and track when an autonomous delivery service vehicle needs basic repair, such as replacement of tires and brakes, and route to the appropriate vendor relationship in accordance with down time routing strategy; (iii) using on board sensors to detect and track when an autonomous delivery service vehicle needs major repair, such as repair to exhaust, transmission, suspension, engine, body panel, etc, and route to the appropriate vendor relationship in accordance with down time routing strategy; and/or (iv) using onboard sensors to detect and track when an autonomous delivery service vehicle is disabled, instantly and autonomously routing a "transfer to" vehicle (enabling continuation of people and cargo). At the same time, also instantly routing a tow/recovery vehicle from an appropriate vendor relationship to deliver to appropriate affiliate repair shop. The vehicle in question may be in the process of failing and not necessarily completely disabled for the transfer to and tow/recovery vehicle to be routed.

The vehicle routing system may additionally or alternatively create ultra-efficient routing and validation strategies utilizing blockchain, Al, deep learning, model training, and/or adaptive learning. These technologies in unison can enable point-by-point autonomous validation from origin to endpoint of booking, pickup, tracking, and delivery of passengers, inventory, and cargo, and mail.

The vehicle routing system may additionally or alternatively provide safety and security to passengers, cargo, and data, such as by: (i) In-route rejection of person or cargo (potentially due to risk of vehicle damage, risk to other passengers, substance detection-such as drugs, bomb making materials, radioactivity, etc.); (ii) autonomous notification to proper enforcement agency of subject or package and location, potentially assisting in the detainment of individuals or cargo; (iii) implementing an autonomous rerouting strategy in instances of emergency, accident, high-risk area, disaster, weather, terrorism, etc.; (iv) blockchain and AI tracking system of all packages, cargo, people, and mail; (v) detection of passenger biometric and speech data to enable quick detection and intervention in emergency situations; and/or (vi) sensor tracking/check-in or check-out of packages and mail, much like an in-store RFID tag or QR/scan code. In some embodiments, if packages are not scheduled to exit the vehicle, the vehicle routing system may enable: (a) sounding an alarm; (b) activating vehicle cameras to record and/or identify subjects; (c) activating communication devices to report the incident. The vehicle routing system may store data using a secure cloud service affinity partner, and/or store data through the creation of cloud storage and data security as a service model.

The management hub application ("app") provides management and/or support hub platform ecosystems as a service for corporations and private owners, with affinity partners and relationships. The management hub app encompasses business and ownership models including: (i) data: capture, analysis, storage, and sharing (AI, blockchain, AWS, deep learning, data storage and security as a service); (ii) financial and investment services: vehicle financing & leasing products, fleet financing, banking, crypto/digital currency, investments; (iii) small business services: smart reports containing metrics & opportunities analysis, strategy analysis and recommendation, accounting, insurance, investments, benefits; (iv) insurance, claims, roadside assistance, loaner assistance, and accident/incident recovery services; (v) detailing, maintenance, repair, and support services; (vi) legal and fraud prevention/recovery services; (vii) advertising, marketing, app, ratings and experiences services; (viii) owner and passenger services; (ix) cargo and passenger booking, tracking, and delivery validation services; and/or (x) subscription services to encompass all of the above, certain packages, or a la carte add-on services.

The system and methods described herein may utilize AI, deep learning, data mining, model training, and/or adaptive learning to recognize and understand unseen patterns and uses, inform on those patterns and uses, and automatically recommend and develop new business models. For example, the vehicle routing system, with affirmative consent, may collect data on how owners leverage self-driving technology dependent on geography or other differences, which leads to the creation of a new business model elsewhere.

The systems and methods described herein may also provide fleet purchase and management as an investment service. For example, the vehicle routing system may enable investors to contribute to or wholly invest in a platform where one party (e.g., the vehicle routing system or a party associated therewith) purchases and manages an autonomous fleet for investors. Investors may gain passive revenue without having to physically own or manage one or more autonomous delivery vehicles. As an incentive, investors can also pre-pay for services enabling them to receive free ride share services up to a certain dollar amount each month as well as a % of profits. For example, an investor may invest $X and may receive a Y % return on investment plus a $ZZZ credit for ride-share service fees.

The vehicle routing system may also enable data storage and security as a service, allowing consumers to subscribe to a service that enables them to store and protect data including: (i) digital data; (ii) personal data; (iii) insurance data; (iv) estate data; (v) digital communication and email data; (vi) financial, investment, and credit data; (vii) digital transactions; (viii) business data; and/or (ix) employee data.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, object statistics and information, historical estimates, and/or actual repair costs. The machine learning programs may utilize deep learning algorithms that may be primarily focused on pattern recognition, and may be trained after processing multiple examples. The machine learning programs may include Bayesian Program Learning (BPL), voice recognition and synthesis, image or object recognition, optical character recognition, and/or natural language processing-either individually or in combination. The machine learning programs may also include natural language processing, semantic analysis, automatic reasoning, and/or machine learning.

Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about infrastructures and users associated with a building to detect events and correlations between detected events to identify trends.

Based upon these analyses, the processing element may learn how to identify characteristics, trends, and patterns in current and/or historical sensor data that may then be applied to generating optimal routes and/or generating vehicle analytics.

Exemplary Float Embodiments

In one aspect, this disclosure generally relates to autonomously floating from opportunity to opportunity. More specifically, the present embodiments relate to autonomous ride share; package, mail, people, and material delivery; and/or data collection and analytics.

Autonomous vehicles are being researched and developed. Unlike convention vehicles that have human drivers, autonomous vehicles may not be limited by having a main operator or driver, or may not be limited by the driver's fatigue, schedule, or availability. A few exemplary floating embodiments are discussed below.

Ride-Share Drivers

In one aspect, the present embodiments involve ride-share drivers delivering passengers and packages. Current ride-share drivers (such as those who drive for Uber and Lyft) are missing an income opportunity to also offer local and OTR package pickup and delivery services as they transport ride-share customers.

Delivery Fleet

In another aspect, the present embodiments will allow large corporations to shift to an autonomous delivery fleet, and later turn to private owners. As package delivery models shift to become autonomous, large corporations (such as product companies Amazon, Facebook Marketplace, Google, Wink, DHgate) may purchase their own autonomous fleets to provide their own delivery models instead of using UPS, USPS, FedEx, and other package handlers. What they may find is that purchasing autonomous fleets, and insuring and maintaining them are counter intuitive to revenue models. As a result, they may turn to private consumers who own their own autonomous vehicles and act as third-party service providers.

As package delivery models shift to become autonomous, some companies like Amazon might move to a multi-purpose delivery package service. With the present embodiments, this service would include primarily package delivery for the company who owns the fleet (as an example Amazon) but will extend out beyond delivery of (Amazon) packages to packages for other vendors, as well as delivery of people and other services. Opening the service up to other delivery types will allow these companies to run a profitable business model in areas where package delivery alone would not be profitable.

Autonomous Vehicle Opportunities

In another aspect, the present embodiments involve private drivers that have become initially unemployed due to corporate autonomous fleets becoming rehired if they own autonomous vehicles. For instance, as a result of vehicles becoming autonomous, ride-sharing companies such as Uber, Lyft, and others may eliminate the need for employment of 3$^{rd}$ party drivers (consumers who use their own cars to drive for these services), replacing them with their own fleet of autonomous transportation. Thus, consumers receiving income as drivers of conventional vehicle will no longer be employed as drivers, but may have opportunities associated with owning an autonomous vehicle.

Private Autonomous Owners

In another aspect, the present embodiments will allow private autonomous vehicle owners to become ride-share/package delivery solutions, as well as facilitate data capture as a service fleets. As automation decreases income options and opportunities in metro areas, drivers who were previously employed and other savvy consumers may purchase their own autonomous multi-modal vehicle (car, truck, bike, motorcycle, bus, semi, boat/ship, plane, etc.) or micro-modal fleet to join the ranks of autonomous multi-modal transportation, package, and data point capture service providers. As private owners they will need business, organization, maintenance, data storage and delivery, and 5G services which will support these efforts.

Multiple Points of Data

In another aspect, the present embodiments involve autonomous transportation and will involve much more than delivering packages and people. For instance, the present embodiments will also involve capturing and delivering multiple points of data. As more autonomous vehicles take the road with advanced monitoring, tracking, and awareness systems, they may have the ability to track multiple data points, such as for infrastructure, vehicle performance, crime, environmental, marketplace activity, routing, weather, maintenance, metrics, and more, and provide instant alerts and reporting.

Support Network

In another aspect, the present embodiments will provide a large support network that will provide for the corporate/private autonomous revolution. As large and small business form their autonomous transportation networks, they will need multiple services to support, including business loans, vehicle financing, B2B insurance, fleet insurance, maintenance, data storage and delivery, financial, banking, investment services, subscriptions and subscription services, smart contracts, package tracking, data management, metrics management, account management and customer services, and data security among other needs.

Mail Services

In another aspect, the present embodiments will provide a large support network that will provide for the corporate/private autonomous revolution of mail services. Currently, U.S. mail is delivered using a federal system. In the future, mail delivery services may be privatized by companies such as Amazon who depend on an overwhelmed and potentially outdated delivery system. In order to speed delivery and create new models of revenue and cost reduction, private companies may enter the mail/parcel delivery industry.

A. First Solution Element

The present embodiments include a first solution element that will capture market, consumer, and vehicle data, automatically synthesize, and create ultra-efficient activity, routing, and logistics strategies; and provide autonomous "Float" strategy and strategy recommendations.

The present embodiments will (1) utilize AI, Cloud data storage, and deep learning to understand real-time local, regional, and domestic market and consumer use patterns for ride share, package pickup and delivery, and other cargo pickup and delivery; (2) utilize AI and deep learning to understand and automatically employ strategies for best class or closest vehicle to implement, best location (local, regional, domestic, or all), maximum business and revenue opportunity, best competition space or location underserved space; (3) utilize AI and deep learning to gather information from smart things and calendars, user calendar and social media if enabled, publicly available social media, and news sources to gain understanding of real-time events (e.g., concerts, festivals, sporting events, rallies, etc.) and area activities, and employ strategies to service those areas; (4) utilize AI and deep learning to understand patterns of businesses such as Amazon that have a large quantity of delivery/return package traffic, and locations delivered from/returned to, to enable service to those providers; (5) utilize AI and deep learning to understand and employ strategies for when a ride share, package/cargo/mail pickup/delivery, or a combination of people and cargo is appropriate for max revenue potential; (6) utilize AI and deep learning to understand and employ strategies for when maximum safety and security is needed, such as the transport of a child, senior, disabled, or a high-value package; (7) utilize AI and deep learning patterns to employ strategies for best down times for fueling, maintenance, and repair (which could be while en route to picking up cargo or people, or delivering cargo); (8) enable an app to show one or more vehicles' current strategy, performance, location, current use, revenue generated, maintenance/repair, vehicle issues, and AI generated recommendations for future use if not using an autonomous Float strategy; and/or (9) enable owners, subscribers, and/or investors to receive smart reports, and be able to adjust use and maintenance strategies as desired.

B. Second Solution Element

The present embodiments include a second solution element that utilize on-board cameras, sensors, and AI to capture vehicle data, infrastructure, environmental elements, road way, business, and neighborhood data points.

The present embodiments will be configured to (1) understand overall, live, real-time risks to be able to assess insurance, protection, and solution needs; (2) utilize data to understand real-time risks and liabilities to vehicle(s), people, interstate, street, roadway technology and roadway lights, buildings, houses, and landscape; (3) create automatic reports for local governance highlighting infrastructure issues, changes, technology and construction progress and upgrade, work needing to be performed or maintained, and crime and offer solutions, strategies, and services which reduce risks, liabilities, and costs and potentially reducing insurance claims; (4) create automatic reports highlighting business and residential consumer risks and liabilities, and offering solutions and services to reduce risks, potentially lower insurance costs, and raise property value or revenue potential; (5) create automatic reports regarding real-time ambient environment including traffic, weather, disaster, and other elements which may elevate risk owner/user risk or claims activity; (6) capture vehicle metric data points for reporting vehicle issues and performance back to manufacturer; (7) use these data points to create Pattern and Risk Profiles for each vehicle and its use, each area traveled in or through, each passenger, and potentially each vehicle owner; and/or (8) enable the passive listening and passive data capture of video, audio, and GPS, and associated reporting to proper enforcement. This could help increase success of responding to emergencies, accidents, disasters or finding missing persons (amber alerts), persons of interest (wanted criminals), crimes in progress, fires, cries for help, and provide data evidence within an area of travel if a crime or incident has been committed. The Pattern and Risk Profiles could be used to create insurance models-such as the creation of an on-demand insurance (or UBI (usage-based insurance) product or service based upon passenger and or packages in the vehicle-which are customized to each vehicle, passenger, and cargo provider.

C. Third Solution Element

The present embodiments include a third solution element that creates a continuous, adaptive system for right sizing the right cargo for the right vehicle, and the right complementary route at the right time. The present embodiments utilize vehicle sensors and AI to create in-vehicle cargo storage/people/mail placement strategies enabling realization of maximum cargo load, optimum pickup/offload speed, and highest daily revenue.

The present embodiment utilize AI, model training, and adaptive learning to create a pickup/delivery routing strategy based upon the following factors: time; vehicle model and type; current vehicle location; current cargo; dimensions of individual package/people; weight of individual package/people elements and total cargo; purpose of transportation; cargo or people to pickup/deliver; current location and future destination of person/package/cargo: start point, end point, waypoints, transfer point(s); weather; forecast; current area construction and road closures; active emergency route status; time requested for delivery if package/cargo; passenger subscription status (future packages tiers may enable choice of rate class, such as private direct routing or routing with package delivery on route to destination); delivery of person/people, if enabled due to route direction agreement, being first priority; human emergency status; environmental emergency status; area and route risk data; area events; rider or cargo provider rating; legal data, such as protective orders limiting distance; route continuation (enablement of rider or cargo to change vehicles to be delivered at fastest pace); routing to complete route continuation strategy; in-route rejection of person or cargo (potentially due to risk of vehicle damage, risk to other passengers, substance detection-such as drugs, bomb making materials, radioactivity, etc.); opportunities for social good, such as opportunity to donate time and transportation which could have tax savings and implications; historical issue and incident data which could help reduce risk or prevent claims (such as claims involving a particular vehicle in a particular area at a specific time or season); crime data; and/or user preferences.

D. Fourth Solution Element

The present embodiments include a fourth solution element that creates a hub system of support, maintenance, and services to keep vehicles operating and creating revenue 24 hours a day, 7 days a week, 365 days a year.

The present embodiments (1) use onboard sensors to detect and track when an autonomous delivery service vehicle needs basic maintenance—such as an oil change, tire rotation, tire inflation, new wipers, light replacement, interior/exterior detailing—and route to the appropriate vendor relationship in accordance with down time routing strategy; (2) use onboard sensors to detect and track when an autonomous delivery service vehicle needs basic repair, such as replacement of tires and brakes, and route to the appropriate vendor relationship in accordance with down time routing strategy; and/or (3) use onboard sensors to detect and track when an autonomous delivery service vehicle needs major repair, such as repair to exhaust, transmission, suspension, engine, body panel, etc, and route to the appropriate vendor relationship in accordance with down time routing strategy.

The present embodiments may also (4) use onboard sensors to detect and track when an autonomous delivery service vehicle is disabled, and then instantly and autonomously route a "transfer to" vehicle (enabling continuation of people and cargo). At the same time, also instantly routing a tow/recovery vehicle from an appropriate vendor relationship to deliver to appropriate affiliate repair shop. The vehicle in question may be in the process of failing, and not necessarily completely disabled for the transfer to and tow/recovery vehicle to be routed.

E. Fifth Solution Element

The present embodiments include a fifth solution element that creates ultra-efficient routing and validation strategies utilizing Blockchain, AI, Deep Learning, Model Training, and Adaptive Learning. These technologies in unison can enable point-by-point autonomous validation from origin to endpoint of booking, pickup, tracking, and delivery of passengers, inventory, and cargo, and mail.

F. Sixth Solution Element

The present embodiments include a sixth solution element that provides safety and security to passengers, cargo, and data.

The present embodiments may include (1) in-route rejection of person or cargo (potentially due to risk of vehicle damage, risk to other passengers, substance detection-such as drugs, bomb making materials, radioactivity, etc); (2) autonomous notification to proper enforcement agency of subject or package and location, potentially assisting in the detainment of individuals or cargo; (3) implementing an autonomous rerouting strategy in instances of emergency, accident, high-risk area, disaster, weather, terrorism, etc.; (4) Blockchain and AI tracking system of all packages, cargo, people, and mail; and/or (5) sensor tracking/check-in or check-out of packages and mail, much like an in-store RFID tag or QR/Scan code. If packages are not scheduled to exit the vehicle: (a) an alarm could sound; (b) vehicle cameras could identify subject and record; and/or (c) communication devices could report the incident.

The present embodiment may also include (6) data stored using a secure cloud service affinity partner; (7) data stored through the creation of a cloud storage and data security mechanism as a service model; and/or (8) detection of passenger biometric and speech data to enable quick detection and intervention in emergency situations.

G. Seventh Solution Element

The present embodiments include a seventh solution element that creates a separate management and support hub platform ecosystems as a service. The services may be for corporations and private owners, and may include implementing multiple platform ecosystems with affinity partners and relationships.

The present embodiments may include encompassing business and ownership models including: (1) Data: capture, analysis, storage, and sharing (AI, Blockchain, AWS, Deep Learning, Data Storage and Security as a Service); (2) Financial and Investment Services: Vehicle Financing & Leasing Products, Fleet Financing, Banking, Crypto/Digital Currency, Investments; (3) Small Business Services: Smart Reports containing Metrics & Opportunities Analysis, Strategy Analysis and Recommendations, Accounting, Insurance, Investments, Benefits; (4) Insurance, Claims, Roadside Assistance, Loaner Assistance, and Accident/Incident Recovery Services; (5) Detailing, Maintenance, Repair, and Support Services; (6) Legal and Fraud Prevention/Recovery Services; (7) Advertising, Marketing, App, Ratings and Experiences Services; (8) Owner and Passenger Services; (9) Cargo and Passenger Booking, Tracking, and Delivery Validation Services; and/or (10) Subscription Services to encompass all of the above, certain packages, or ala carte add on services.

H. Eighth Solution Element

The present embodiments include an eighth solution element that utilizes AI, Deep Learning, Data Mining, Model Training, and Adaptive Learning to recognize and understand unseen patterns and uses, inform on those patterns and uses, and automatically recommend and develop new business models. For example, an entity may collect data on how owners leverage self-driving technology dependent on geography or other differences which leads to the creation of a new business model elsewhere.

I. Ninth Solution Element

The present embodiments include a ninth solution element that includes Fleet Purchase and Management as an Investment Service. The present embodiments enable investors to contribute to, or wholly invest in, a platform where an entity purchases and manages an autonomous fleet for investors. Investors gain passive revenue without having to physically own or manage one or more autonomous delivery vehicles. As an incentive, investors can also pre-pay for services enabling them to receive free ride share services up to a certain dollar amount each month, as well as a % of profits. As an example, an investor invests $X and receives a X % return on investment plus a $XXX credit for rideshare service fees.

J. Tenth Solution Element

The present embodiments include a tenth solution element that provides Data Storage and Security as a Service. The present embodiments enable consumers to subscribe to a service which enables them to store and protect data including: Digital Data; Personal Data; Insurance Data; Estate Data; Digital Communication and Email Data; Financial, Investment, and Credit Data; Digital Transactions; Business Data; and/or Employee Data.

Exemplary Float Computing Environment

Figure 12A:
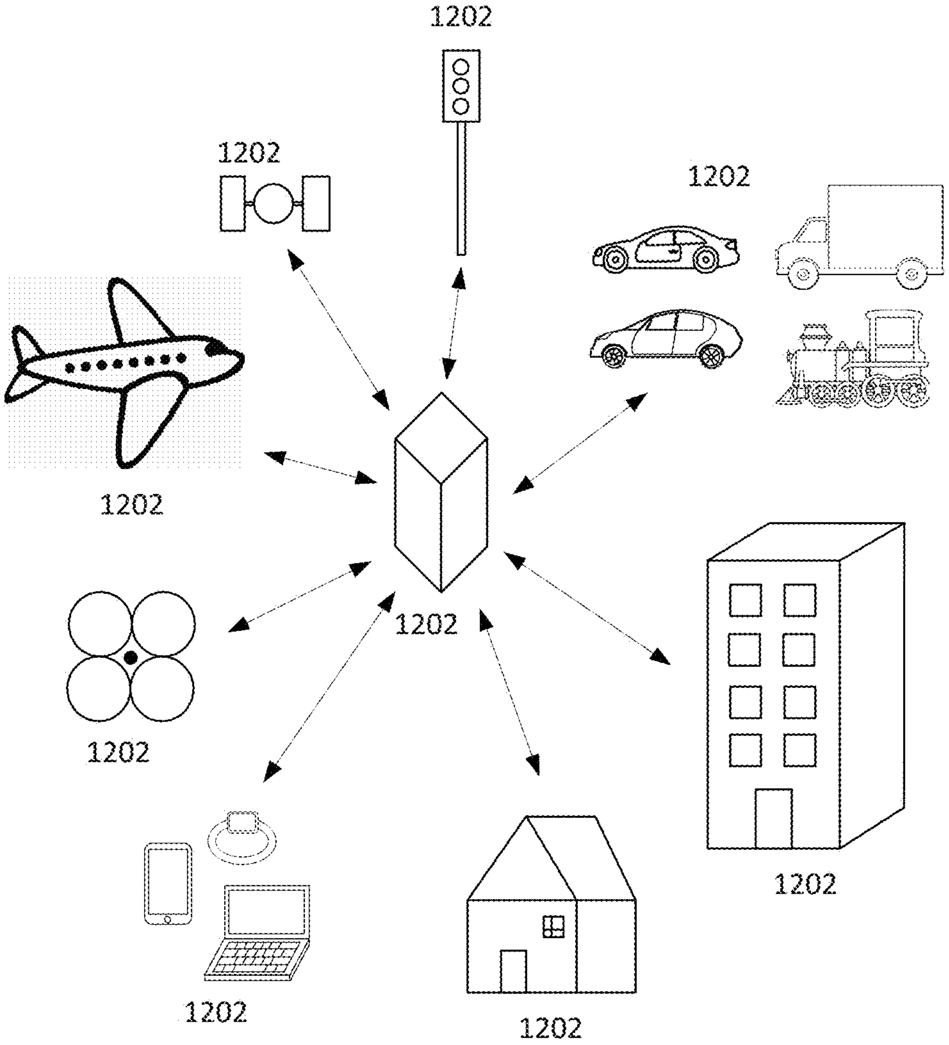
FIG. 12A depicts an exemplary FLOAT computing environment that facilitates autonomous vehicle autonomously floating from one opportunity to another.

FIG. 12A depicts an exemplary FLOAT computing environment that facilitates autonomous vehicle autonomously floating from one opportunity to another 1200. A remote server 1202 may collect real-time or near real-time data from various remotely located computing devices. The remote server 1202 may be in wireless communication with the various computing devices.

The remote server 1202 may wireless receive data transmission from autonomous vehicles (autonomous passenger cars, autonomous flying cars, autonomous delivery vans, autonomous semi-trucks, etc.) 1204 and smart vehicles, smart infrastructure and smart signs 1206, satellites 1208, airplanes 1210, drones 1212, mobile devices (such as laptops, cell or smart phones, wearables, smart watches, etc.) 1214, smart or intelligent homes 1216, and/or smart buildings 1218.

For instance, the autonomous vehicles 1204 may have numerous vehicle-mounted sensors and processors that generate or collect data, and may include transceivers to transmit that data to the remote server 1202. Likewise, the smart homes 1216 and smart buildings 1218 may include home or building-mounted sensors and processors that generate or collect data, and may include transceivers to transmit that data to the remote server 1202. Similarly, the smart drones 1212 and smart mobile devices may have sensors and processors that generate sensor, image, or other data and have transceivers to transmit the data to the remote server 1202.

Exemplary Float Computer-Implemented Method

Figure 12B:
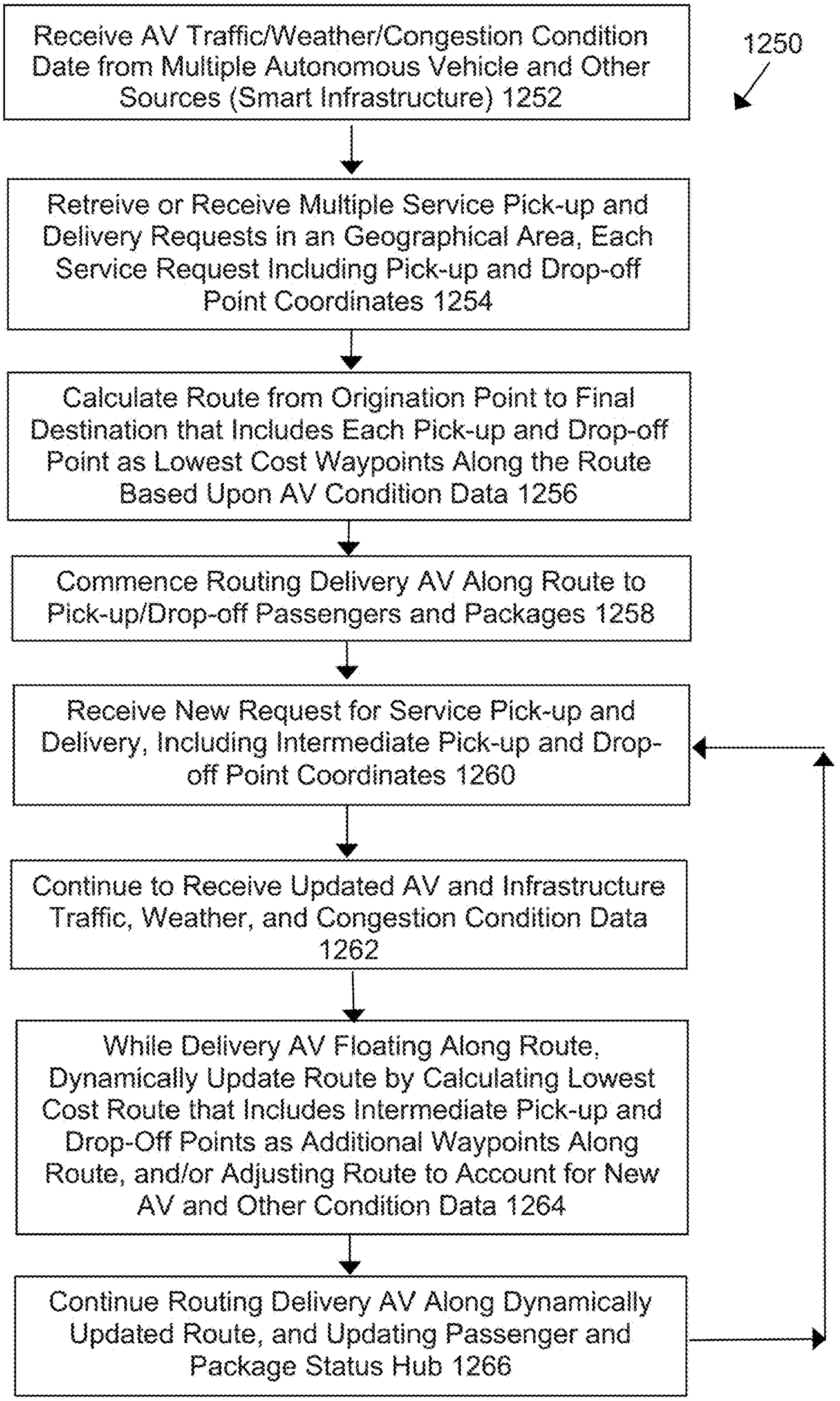
FIG. 12B depicts an exemplary FLOAT computer-implemented method facilitates autonomous vehicle autonomously floating from one opportunity to another.

FIG. 12B depicts an exemplary FLOAT computer-implemented method facilitates autonomous vehicle autonomously floating from one opportunity to another 1250. The method 1250 may be implemented via one or more local or remote processors, sensors, transceivers, and/or servers.

The computer-implemented method 1250 may include receiving, via wireless communication or data transmission, autonomous vehicle (AV) condition data from multiple autonomous vehicles and/or other sources at one or more processors and/or remote servers 1252. The AV condition data may be real-time or near real-time data. The AV condition data may be generated or collected by one or more autonomous vehicle-mounted sensors and/or processors. The AV condition data may be transmitted to a remote server for analysis via wireless communication and/or data transmission over one or more radio frequency links.

The autonomous vehicles generating, collecting, and/or transmitting the AV condition may include automobiles, trucks, drones, planes, or other sources, including those listed in FIG. 12A. The condition data may also be generated, collected, and/or transmitted by other sources, such as smart infrastructure, smart buildings, and/or intelligent homes.

The method 1250 may include retrieving and/or receiving via wireless communication and/or data transmission, via one or more processors and/or remote servers, multiple electronic service pick-up and delivery requests within a geographical area 1254, such as a city, county, town, state, region, etc. The electronic service requests may be generated and/or received by one or more processors associated with customer mobile devices or other computing devices. The electronic service requests may include pick-up and drop-off point coordinates for use as waypoints along an overall route for an autonomous delivery vehicle. The pick-up and drop-off points coordinates may be GPS coordinates or street addresses, for example.

The electronic service requests may include street addresses, GPS coordinates, and/or other location data. The electronic service requests may include passenger, item, material, or package information, such as type, weight, hazardous material or not, flammable material or not, etc. for items or packages. The electronic service requests may include passenger name, medical conditions, passenger preferences, age, etc. for passengers.

The method 1250 may include calculating, via one or more processors, a route from an origination point to a final destination that includes each pick-up and drop-off point as a lowest cost waypoint along the route 1256. Each lowest cost waypoint along the route may be calculated based upon the AV condition data received, and/or other data. Each waypoint may be calculated as being the lowest-cost with respect to time (such as shortest time in transit, quickest delivery time, etc.), mileage (such as shortest distance in transit), traffic (least amount of traffic), risk (the safest intermediate route between pick-up and drop-off points), safest weather conditions, and/or gas or electricity usage. The lowest-cost waypoints may also be calculated based upon optimizing downtime that may be used for maintenance of the delivery AV, or the refueling or recharging of the delivery AV.

The method 1250 may include commencing routing the delivery AV along the route calculated to pick-up and drop-off passengers and packages at the designated waypoints 1258. The delivery AV may autonomously travel to each waypoint in succession along the route, unless or until an updated overall route to the final destination is dynamically calculated based upon updated AV condition data received and/or new service requests associated with additional passengers or packages to be delivered.

The method 1250 may include receiving, via wireless communication or data transmission over one or more radio frequency links, a new or additional electronic service request for passenger or package pick-up and delivery 1260. The new service request may be generated and received from a customer's mobile device or other computing device. The new service request may include information such as pick-up and drop-off location (such as street address or GPS coordinates), weight, name of passenger, type of item, type of material, etc.

The method 1250 may include, at one or more processors and/or servers, continuing to receive updated AV and infrastructure condition data, such as updated traffic, congestion, road, and weather condition data 1262. Condition data may also be collected by mobile devices, intelligent homes or buildings, planes, drones, etc. having sensors, processors, and/or transceivers capable of generating and transmitting condition data via wireless communication and/or data transmission over one or more radio frequency links.

The method 1250 may include, while the delivery AV is floating along the route, dynamically updating the route by calculating the lowest cost route that includes the intermediate pick-up and drop-off points within the additional service requests received as additional waypoints along the overall route to the final destination 1264. The dynamically updated route, in addition to accounting for, and adding, one or more additional service request's intermediate pick-up/drop-off points as waypoints, may also be updated to account for the new AV, infrastructure, and/or other computing device condition data received.

The method 1250 may include, via one or more processors and/or servers, continuing to route the delivery AV along the dynamically updated route 1266. As the delivery AV travels its route, a passenger and status hub (or other) platform) may be updated in real-time or near real-time to show the location and delivery status of each passenger and package. For instance, the location and/or status (such as waiting for pick-up, in transit, or delivered at 10 am) of each passenger or package may be display in a user interface on a computer screen or mobile device screen.

The method 1250 may include continuing to receive additional service requests, and receive updated AV condition data. The method 1250 may continue to dynamically update the route that the AV is traveling based upon the additional service requests and/or the updated AV condition data. The method 1250 may include additional, less, or alternate actions, including those discussed elsewhere herein.

In one aspect, a computer-implemented method of directing an autonomously floating delivery autonomous vehicle may be provided. The method may include (1) receiving, via one or more processors, servers, and/or transceivers, autonomous vehicle (AV) condition data from multiple autonomous vehicles and other sources (such as smart infrastructure or intelligent homes) via wireless communication and/or data transmission over one or more radio frequency links, the condition data being generated by autonomous vehicle-mounted sensors and indicating weather, road, traffic, congestion, or accident conditions; (2) retrieving from a memory unit or receiving via wireless communication or data transmission over one or more radio links, via one or more processors, servers, and/or transceivers, multiple service requests generated by multiple customer computing devices, each service request including a pick-up and drop-off address, location, or coordinates, each service request including information identifying one or more passengers or type and weight of one or more packages; (3) calculating, via one or more processors or servers, an overall route that the floating delivery autonomous vehicle will travel from an origination point to a final destination, the overall route including each pick-up and drop-off point of the passengers and packages (as identified in the service requests) as a lowest cost waypoint along or within the overall route, the waypoints being calculated as being lowest cost based upon AV condition data and/or passenger or package weight or size information; (4) routing or directing, via one or more processors or servers, the delivery autonomous vehicle along the overall route to pick-up and drop-off passengers and packages at each intermediate waypoint along the overall route; (5) receiving, via one or more processors or servers, a new or additional electronic service request for pick-up and delivery of an additional passenger and/or package, the additional electronic service request including pick-up and drop-off point or location information; (6)

continuing, via one or more processors, servers, and/or transceivers, to receive updated AV condition data via wireless communication or data transmission over one or more radio links, the condition data including traffic, weather, congestion, road, and/or accident data, the condition data may be generated by autonomous vehicles or other sources, such as smart infrastructure, intelligent homes, or mobile devices; (7) while the delivery AV is floating along the overall route, dynamically updating the overall route, via one or more processors and/or servers, by calculating the lowest cost route that includes the intermediate pick-up and drop-off locations or points in the additional service request (s) as additional waypoints along the overall route, the lowest cost update route may be calculated based upon the update AV condition data or other data received since the overall route was initially calculated; (8) directing, via one or more processors and/or servers, the delivery AV along the dynamically updated overall route; and/or (9) updating, via one or more processors and/or servers, a status hub or user interface displaying a current status and/or location of each passenger and/or package. The method may include additional, less, or alternate actions, including those discussed elsewhere herein.

For instance, the AV condition data may be generated or collected by autonomous vehicle-mounted sensors, and includes telematics (including speed, GPS location, route, direction, cornering, braking, and acceleration data) and image data. Additionally or alternatively, the AV condition data may be generated or collected by smart infrastructure, mobile devices, intelligent homes, drones, planes, and/or satellites.

The lowest cost overall route may be calculated based upon shortest time or shortest distance traveled to complete to overall route. Additionally or alternatively, the lowest cost overall route may be calculated based upon optimizing downtime of the delivery autonomous vehicle for maintenance purposes. Additionally or alternatively, the lowest cost overall route may be calculated based upon optimizing downtime of the delivery autonomous vehicle for refueling or recharging purposes. Additionally or alternatively, the lowest cost overall route may be calculated based upon optimizing safety of traveling the overall route, and/or based upon weather along the route, and dropping and picking up packages or passengers in clear or sunny weather. Additionally or alternatively, the lowest cost overall route may be calculated based upon the least traffic, congestion, or road construction along the route.

In some embodiments, the sensor and other data may be transmitted via wireless communication or data transmission over one or more radio frequency links. In other embodiments, the sensor and other data may be transferred via other more advanced or unknown forms of data transference methods and techniques.

In another aspect, a computer system for remotely and/or locally directing an autonomously floating delivery autonomous vehicle may be provided. The computer system may include one or more local or remote processors, sensors, transceivers, and/or servers configured to: (1) receive autonomous vehicle (AV) condition data from multiple autonomous vehicles and other sources (such as smart infrastructure or intelligent homes) via wireless communication and/or data transmission over one or more radio frequency links, the condition data being generated by autonomous vehicle-mounted sensors and indicating weather, road, traffic, congestion, or accident conditions; (2) retrieve from a memory unit or receive via wireless communication or data transmission over one or more radio links multiple service requests generated by multiple customer computing devices, each service request including a pick-up and drop-off address, location, or coordinates, each service request including information identifying one or more passengers or type and weight of one or more packages; (3) calculate an overall route that the floating delivery autonomous vehicle will travel from an origination point to a final destination, the overall route including each pick-up and drop-off point of the passengers and packages (as identified in the service requests) as a lowest cost waypoint along or within the overall route, the waypoints being calculated as being lowest cost based upon AV condition data and/or passenger or package weight or size information; (4) route or direct the delivery autonomous vehicle along the overall route to pick-up and drop-off passengers and packages at each intermediate waypoint along the overall route; (5) receive a new or additional electronic service request for pick-up and delivery of an additional passenger and/or package, the additional electronic service request including pick-up and drop-off point or location information; (6) continue to receive updated AV condition data via wireless communication or data transmission over one or more radio links, the condition data including traffic, weather, congestion, road, and/or accident data, the condition data may be generated by autonomous vehicles or other sources, such as smart infrastructure, intelligent homes, or mobile devices; (7) while the delivery AV is floating along the overall route, dynamically update the overall route by calculating the lowest cost route that includes the intermediate pick-up and drop-off locations or points in the additional service request (s) as additional waypoints along the overall route, the lowest cost update route may be calculated based upon the update AV condition data or other data received since the overall route was initially calculated; (8) direct the delivery AV along the dynamically updated overall route; and/or (9) update a status hub or user interface displaying a current status and/or location of each passenger and/or package. The AV condition data may be generated or collected by autonomous vehicle-mounted sensors, and includes telematics (including speed, GPS location, route, direction, cornering, braking, and acceleration data) and image data, and/or generated or collected by smart infrastructure, mobile devices, intelligent homes, drones, planes, and/or satellites. The computer system may include additional, less, or alternate functionality, including that discussed elsewhere herein.

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), SD card, memory device and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer-readable medium. In one exemplary embodiment, the system is executed on a single computer system, without requiring a connection to a server computer. In a further exemplary embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality. The following detailed description illustrates embodiments of the disclosure by way of example and not by way of limitation. It is contemplated that the disclosure has general application to providing an on-demand ecosystem in industrial, commercial, and residential applications.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A vehicle routing and analytics (VRA) computing device comprising at least one processor in communication with a memory, the VRA computing device communicatively coupled to a fleet of vehicles, wherein the at least one processor is programmed to:

control each vehicle of the fleet of vehicles to travel along a respective optimal route, the optimal route including a scheduled list of tasks for the vehicle to perform;

detect one vehicle of the fleet of vehicles has deviated from the respective optimal route;

execute at least one at least one of artificial intelligence and deep learning functionality to assign any remaining tasks assigned to the one vehicle to one or more other vehicles of the fleet of vehicle;

automatically update each respective optimal route of the one or more other vehicles to generate an updated optimal route including an updated scheduled list of tasks including at least one task previously assigned to the one vehicle; and control the one or more vehicles of the fleet of vehicles to travel along the respective updated optimal route according to the updated scheduled list of tasks.

2. The VRA computing device of claim 1, wherein the at least one processor is further programmed to:

retrieve a vehicle definition for each vehicle of the fleet of vehicles, each vehicle definition including availability parameters and delivery preferences associated with the respective vehicle; and execute the at least one of artificial intelligence and deep learning functionality with the vehicle definitions as input.

3. The VRA computing device of claim 1, wherein each vehicle of the fleet of vehicles has a plurality of sensors disposed thereon and configured to collect sensor data during operation of the respective vehicle, wherein the at least one processor is further programmed to:

receive, from the one vehicle, sensor data during operation of the one vehicle according to the respective optimal route; and detect the one vehicle has deviated from the respective optimal route based upon the sensor data.

4. The VRA computing device of claim 3, wherein the at least one processor is further programmed to:

further detect, based upon the sensor data, that the one vehicle has become at least partially inoperational.

5. The VRA computing device of claim 3, wherein the at least one processor is further programmed to:

detect, based upon the received sensor data, that the one vehicle requires one or more services; and generate a service schedule for the one vehicle, the service schedule including the required one or more services, a respective service time associated with each service, and a respective service vendor associated with each service.

6. The VRA computing device of claim 5, wherein the at least one processor is further programmed to:

control the one vehicle to travel according to the service schedule in place of the respective optimal route.

7. The VRA computing device of claim 1, wherein the at least one processor is further programmed to:

detect the one vehicle has deviated from the respective optimal route in response to receiving a message from the one vehicle that the one vehicle has become at least partially inoperational.

8. A computer-implemented method for generating a route for each vehicle of a fleet of vehicles, the method implemented using a vehicle routing analytics (VRA) computing device communicatively coupled to the fleet of vehicles, wherein the VRA computing device includes at least one processor in communication with a memory, wherein the method comprises:

controlling each vehicle of the fleet of vehicles to travel along a respective optimal route, the optimal route including a scheduled list of tasks for the vehicle to perform;

detecting one vehicle of the fleet of vehicles has deviated from the respective optimal route;

executing at least one at least one of artificial intelligence and deep learning functionality to assign any remaining tasks assigned to the one vehicle to one or more other vehicles of the fleet of vehicle;

automatically updating each respective optimal route of the one or more other vehicles to generate an updated optimal route including an updated scheduled list of tasks including at least one task previously assigned to the one vehicle; and controlling the one or more vehicles of the fleet of vehicles to travel along the respective updated optimal route according to the updated scheduled list of tasks.

9. The computer-implemented method of claim 8, further comprising retrieving a vehicle definition for each vehicle of the fleet of vehicles, each vehicle definition including availability parameters and delivery preferences associated with the respective vehicle, wherein said executing comprises executing the at least one of artificial intelligence and deep learning functionality with the vehicle definitions as input.

10. The computer-implemented method of claim 8, wherein each vehicle of the fleet of vehicles has a plurality of sensors disposed thereon and configured to collect sensor data during operation of the respective vehicle, the method further comprising receiving, from the one vehicle, sensor data during operation of the one vehicle according to the respective optimal route, wherein said detecting comprises detecting the one vehicle has deviated from the respective optimal route based upon the sensor data.

11. The computer-implemented method of claim 10, wherein said detecting further comprises detecting, based upon the sensor data, that the one vehicle has become at least partially inoperational.

12. The computer-implemented method of claim 10, wherein said detecting further comprises detecting, based upon the received sensor data, that the one vehicle requires one or more services, said method further comprising:

generating a service schedule for the one vehicle, the service schedule including the required one or more services, a respective service time associated with each service, and a respective service vendor associated with each service.

13. The computer-implemented method of claim 12, further comprising controlling the one vehicle to travel according to the service schedule in place of the respective optimal route.

14. The computer-implemented method of claim 8, wherein said detecting comprises detecting the one vehicle has deviated from the respective optimal route in response to receiving a message from the one vehicle that the one vehicle has become at least partially inoperational.

15. At least one non-transitory computer-readable storage medium having stored thereon computer-executable instructions that, when executed by at least one processor of a vehicle routing and analytics (VRA) computing device communicatively coupled to a fleet of vehicles, the computer-executable instructions cause the at least one processor to:

control each vehicle of the fleet of vehicles to travel along a respective optimal route, the optimal route including a scheduled list of tasks for the vehicle to perform;

detect one vehicle of the fleet of vehicles has deviated from the respective optimal route;

execute at least one at least one of artificial intelligence and deep learning functionality to assign any remaining tasks assigned to the one vehicle to one or more other vehicles of the fleet of vehicle;

automatically update each respective optimal route of the one or more other vehicles to generate an updated optimal route including an updated scheduled list of tasks including at least one task previously assigned to the one vehicle; and control the one or more vehicles of the fleet of vehicles to travel along the respective updated optimal route according to the updated scheduled list of tasks.

16. The non-transitory computer-readable storage medium of claim 15, wherein the computer-executable instructions further cause at least one processor to:

retrieve a vehicle definition for each vehicle of the fleet of vehicles, each vehicle definition including availability parameters and delivery preferences associated with the respective vehicle; and execute the at least one of artificial intelligence and deep learning functionality with the vehicle definitions as input.

17. The non-transitory computer-readable storage medium of claim 15, wherein each vehicle of the fleet of vehicles has a plurality of sensors disposed thereon and configured to collect sensor data during operation of the respective vehicle, wherein the computer-executable instructions further cause at least one processor to:

receive, from the one vehicle, sensor data during operation of the one vehicle according to the respective optimal route; and detect the one vehicle has deviated from the respective optimal route based upon the sensor data.

18. The non-transitory computer-readable storage medium of claim 17, wherein the computer-executable instructions further cause at least one processor to:

further detect, based upon the sensor data, that the one vehicle has become at least partially inoperational.

19. The non-transitory computer-readable storage medium of claim 17, wherein the computer-executable instructions further cause at least one processor to:

detect, based upon the received sensor data, that the one vehicle requires one or more services; and generate a service schedule for the one vehicle, the service schedule including the required one or more services, a respective service time associated with each service, and a respective service vendor associated with each service.

20. The non-transitory computer-readable storage medium of claim 15, wherein the computer-executable instructions further cause at least one processor to:

detect the one vehicle has deviated from the respective optimal route in response to receiving a message from the one vehicle that the one vehicle has become at least partially inoperational.

* * * * *